US010395032B2

(12) United States Patent
Keller et al.

(10) Patent No.: US 10,395,032 B2
(45) Date of Patent: Aug. 27, 2019

(54) DETECTION OF MALICIOUS SOFTWARE, FIRMWARE, IP CORES AND CIRCUITRY VIA UNINTENDED EMISSIONS

(71) Applicant: Nokomis, INC., Charleroi, PA (US)

(72) Inventors: Walter John Keller, Bridgeville, PA (US); Bogdan Amaru Pathak, Toledo, OH (US); Andrew Richard Portune, Oakdale, PA (US); Todd Eric Chornenky, Carmichaels, PA (US)

(73) Assignee: NOKOMIS, INC., Charleroi, PA (US)

( * ) Notice: Subject to any disclaimer, the term of this patent is extended or adjusted under 35 U.S.C. 154(b) by 34 days.

(21) Appl. No.: 14/663,156

(22) Filed: Mar. 19, 2015

(65) Prior Publication Data

US 2016/0098561 A1    Apr. 7, 2016

Related U.S. Application Data

(60) Provisional application No. 62/071,795, filed on Oct. 3, 2014.

(51) Int. Cl.
  *G06F 21/00* (2013.01)
  *G06F 21/56* (2013.01)
  (Continued)

(52) U.S. Cl.
  CPC ......... *G06F 21/566* (2013.01); *G01R 31/001* (2013.01); *G06F 21/554* (2013.01); *G06F 21/567* (2013.01); *G06F 2221/033* (2013.01)

(58) Field of Classification Search
  USPC ........................................................ 726/24
  See application file for complete search history.

(56) References Cited

U.S. PATENT DOCUMENTS 5,218,294 A    6/1993   Soiferman
5,227,800 A    7/1993   Huguenin et al.
(Continued)

FOREIGN PATENT DOCUMENTS

JP    06011530    1/1994
JP    2000076387    3/2000
(Continued)

OTHER PUBLICATIONS

William E. Cobb, et al., Intrinsic Physical-Layer Authentication of Integrated Circuits, Leee Transactions on Information Forensics and Security, vol. 7, No. 1, Feb. 2012.
(Continued)

*Primary Examiner* — Harris C Wang
(74) *Attorney, Agent, or Firm* — AP Patents

(57) ABSTRACT

An apparatus for testing, inspecting or screening an electrically powered device for modified or unmodified hardware, firmware or software modifications including Malware, Trojans, adware, improper versioning, worms, or virus and the like, includes an antenna positioned at a distance from the electrically powered device and a signal receiver or sensor for examining a signal from the electrically powered device. The receiver or sensor collects unintended RF energy components emitted by the electrically powered device and includes one or more processors and executable instructions that perform analysis in a response to the acquired signal input while the electrically powered device is active or powered. The characteristics of the collected RF energy may be compared with RF energy characteristics of an unmodified device. The comparison determines one of a modified, unmodified or score of certainty of modified condition of the electrically powered device.

29 Claims, 21 Drawing Sheets

(51) Int. Cl.
*G06F 21/55* (2013.01)
*G01R 31/00* (2006.01)

(56) References Cited

U.S. PATENT DOCUMENTS

| | | |
|---|---|---|
| 5,302,830 A | 4/1994 | Shivanandan |
| 5,424,633 A | 6/1995 | Soiferman |
| 5,517,110 A | 5/1996 | Soiferman |
| 5,668,342 A | 9/1997 | Discher |
| 5,714,888 A | 2/1998 | Naujoks |
| 6,021,315 A * | 2/2000 | Telewski ............... H04W 24/00 343/703 |
| 6,049,301 A | 4/2000 | Weagant |
| 6,057,765 A | 5/2000 | Jones et al. |
| 6,163,259 A | 12/2000 | Barsumian et al. |
| 6,496,703 B1 | 12/2002 | da Silva |
| 6,720,905 B2 | 3/2004 | Levitan et al. |
| 6,759,863 B2 | 7/2004 | Moore |
| 6,765,527 B2 | 7/2004 | Jablonski et al. |
| 6,825,456 B2 | 11/2004 | Chadwick et al. |
| 6,897,777 B2 | 5/2005 | Holmes et al. |
| 6,927,579 B2 | 8/2005 | Blades |
| 6,985,771 B2 | 1/2006 | Fischell et al. |
| 7,130,624 B1 | 10/2006 | Jackson et al. |
| 7,138,936 B2 | 11/2006 | Duff et al. |
| 7,188,037 B2 | 3/2007 | Hidehira |
| 7,391,356 B2 | 6/2008 | Brumley et al. |
| 7,512,511 B1 | 3/2009 | Schultz et al. |
| 7,515,094 B2 | 4/2009 | Keller, III |
| 7,609,199 B2 | 10/2009 | Nishijima et al. |
| 7,639,178 B1 | 12/2009 | Mulbrook et al. |
| 7,777,671 B2 | 8/2010 | Schnitzer et al. |
| 7,777,672 B2 | 8/2010 | Schnitzer et al. |
| 7,844,341 B2 | 11/2010 | Von Arx et al. |
| 8,063,813 B1 | 11/2011 | Keller |
| 8,171,567 B1 * | 5/2012 | Fraser ............... G06T 1/0021 726/32 |
| 9,036,891 B2 * | 5/2015 | Cobb ............... G06K 19/0718 382/100 |
| 2003/0083831 A1 * | 5/2003 | Agrawal ............... G06F 7/50 702/65 |
| 2005/0265124 A1 | 12/2005 | Smith |
| 2006/0152232 A1 | 7/2006 | Shvets et al. |
| 2006/0255998 A1 * | 11/2006 | Hirata ............... G01R 29/0878 342/1 |
| 2007/0027643 A1 | 2/2007 | Lesesky et al. |
| 2007/0229270 A1 | 10/2007 | Rofougaran |
| 2007/0234058 A1 | 10/2007 | White |
| 2007/0279071 A1 | 12/2007 | Orton |
| 2008/0103555 A1 | 5/2008 | Dicks et al. |
| 2008/0111561 A1 | 5/2008 | Kormanyos |
| 2008/0256398 A1 | 10/2008 | Gross et al. |
| 2008/0284609 A1 | 11/2008 | Rofougaran |
| 2009/0099830 A1 | 4/2009 | Gross et al. |
| 2009/0218657 A1 | 9/2009 | Rofougaran |
| 2010/0023282 A1 * | 1/2010 | Lewis ............... G06F 11/3041 702/57 |
| 2010/0033386 A1 | 2/2010 | Lewis et al. |
| 2010/0123453 A1 | 5/2010 | Pauly et al. |
| 2010/0125438 A1 | 5/2010 | Audet |
| 2010/0237854 A1 | 9/2010 | Kumhyr et al. |
| 2010/0241864 A1 | 9/2010 | Kelley et al. |
| 2010/0332199 A1 | 12/2010 | Dhanekula et al. |
| 2011/0320170 A1 | 12/2011 | Pathak et al. |
| 2012/0179812 A1 | 7/2012 | Keller, III |
| 2012/0223403 A1 * | 9/2012 | Keller, III ............. H01L 23/576 257/428 |
| 2012/0226463 A1 * | 9/2012 | Keller, III ............. H01L 23/576 702/117 |
| 2013/0082717 A1 | 4/2013 | Kim et al. |
| 2013/0159722 A1 * | 6/2013 | Goergen ............ H04N 1/32144 713/176 |
| 2013/0162241 A1 | 6/2013 | Jones et al. |
| 2015/0135293 A1 * | 5/2015 | Mookiah ............... H04W 12/12 726/7 |
| 2015/0247892 A1 * | 9/2015 | Robertazzi ......... G01R 31/2607 324/414 |
| 2016/0098561 A1 * | 4/2016 | Keller ................... G06F 21/554 726/24 |

FOREIGN PATENT DOCUMENTS

| | | |
|---|---|---|
| JP | 2003503679 | 1/2003 |
| JP | 2011174709 | 9/2011 |
| JP | 2012026913 | 2/2012 |
| KR | 100946238 | 3/2010 |
| KR | 101077441 | 10/2011 |
| WO | 2009047585 | 4/2009 |
| WO | 2013051852 | 4/2013 |

OTHER PUBLICATIONS

Ashwin Lakshminarasimhan, Electromagnetic Side-Channel Analysis for Hardware and Software Watermarking, Master of Science in Electrical and Computer Engineering; Sep. 2011.

Y.P. Zhang, Duixian Liu, Antenna-on-Chip and Antenna-in-Package Solutions to Highly Integrated Millimeter-Wave Devices for Wireless Communications, 2009, vol. 57 No. 10.

Walter J. Keller and Bogdan A. Pathak; Advanced Detection of Electronic Counterfeit; Apr. 19, 2013; Nokomis, Inc.

* cited by examiner

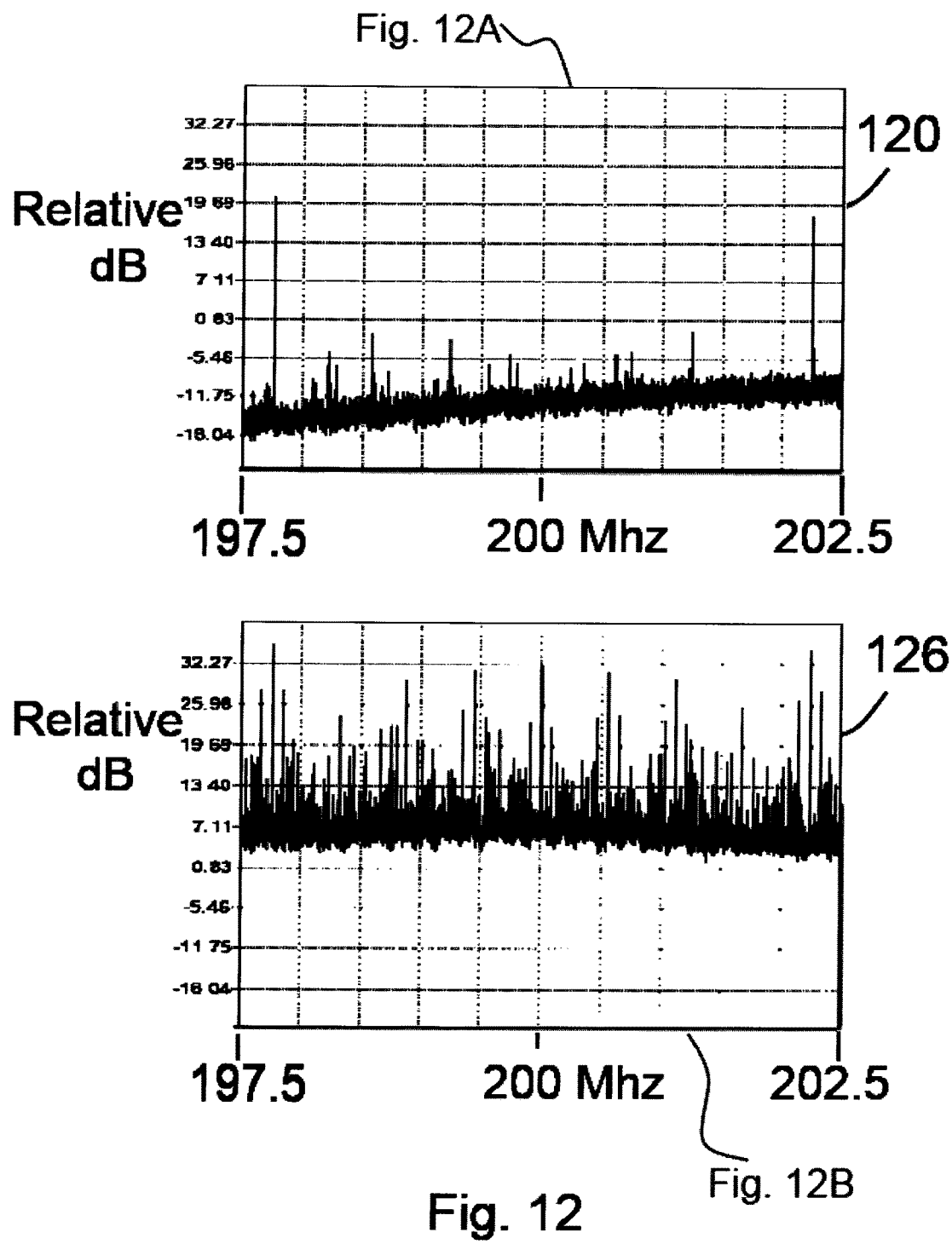

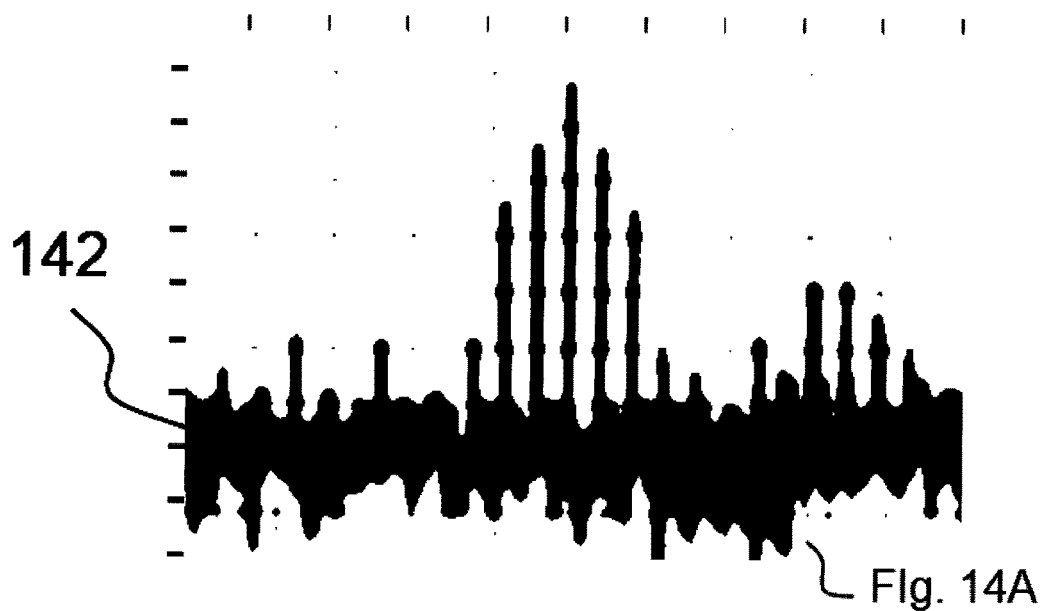
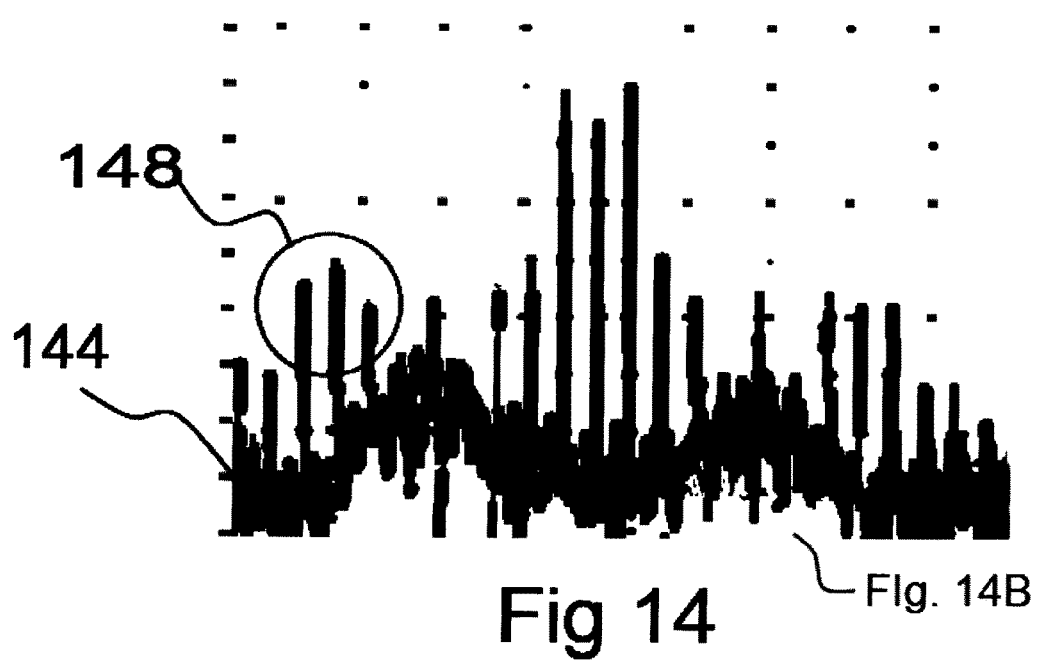
Fig 14

DETECTION OF MALICIOUS SOFTWARE, FIRMWARE, IP CORES AND CIRCUITRY VIA UNINTENDED EMISSIONS

CROSS REFERENCE TO RELATED APPLICATIONS

This patent application is related to and claims priority from U.S. Provisional Patent Application Ser. No. 62/071,795 filed Oct. 3, 2014 and its disclosure is being incorporated into this document by reference thereto.

This document incorporates by reference the disclosures and/or teachings of the following documents: U.S. Pat. No. 7,515,094 ("Advanced electromagnetic location of electronic equipment"); U.S. Pat. No. 8,063,813 entitled "Active improvised explosive device (IED) electronic signature detection"; U.S. Pat. No. 8,537,050 entitled "Identification and analysis of source emissions through harmonic phase comparison"; U.S. Pat. No. 8,643,539 entitled "Advance manufacturing monitoring and diagnostic tool"; U.S. Pat. No. 8,825,823 entitled "System and method for physically detecting, identifying, diagnosing and geolocating electronic devices connectable to a network"; US Pub 20100123453 entitled "ADVANCE MANUFACTURING MONITORING AND DIAGNOSTIC TOOL"; US Pub. 20110320170 entitled "METHOD AND APPARATUS FOR THE DIAGNOSIS AND PROGNOSIS OF ACTIVE IMPLANTS IN OR ATTACHED TO BIOLOGICAL HOSTS OR SYSTEMS"; US Pub. 20120179812 entitled "SYSTEM AND METHOD FOR PHYSICALLY DETECTING, IDENTIFYING, DIAGNOSING AND GEOLOCATING ELECTRONIC DEVICES CONNECTABLE TO A NETWORK"; US Pub. 20120223403 entitled "INTEGRATED CIRCUIT WITH ELECTROMAGNETIC ENERGY ANOMALY DETECTION AND PROCESSING"; US Pub. 20120226463 entitled "SYSTEM AND METHOD FOR PHYSICALLY DETECTING COUNTERFEIT ELECTRONICS"; US Pub. 20130229310 entitled "SYSTEM AND METHOD FOR GEO-LOCATING AND DETECTING SOURCE OF ELECTROMAGNETIC EMISSIONS"; US Pub. 20110095934 entitled "IDENTIFICATION AND ANALYSIS OF SOURCE EMISSIONS THROUGH HARMONIC PHASE COMPARISON"; US Pub. 20130328710, entitled "Method and Apparatus for Detection and Identification of Counterfeit and Substandard Electronics"; U.S. Ser. No. 13/106,412 entitled "Method and Apparatus for the Diagnosis and Prognosis of Active Implants in or Attached to Biological Hosts or Systems"; U.S. Ser. No. 13/344,717 entitled System and Method for physically detecting, identifying, diagnosing and geolocating electronic devices connectable to a network"; U.S. Ser. No. 13/410,586 entitled "System and Method for Geolocating and Detecting Source of Electromagnetic Emissions"; U.S. Ser. No. 13/410,797 entitled "System and Method for Physically Detecting Counterfeit Electronics"; U.S. Ser. No. 13/410,909 entitled "Integrated Circuit with Electromagnetic Energy Anomaly Detection and Processing"; U.S. Ser. No. 13/712,031 entitled "Method and Apparatus for battle damage assessment of electric or electronic devices"); U.S. Ser. No. 14/199,687 entitled "Method and Apparatus for Detection and Identification of Counterfeit and Substandard Electronics", U.S. Ser. No. 14/141,653 entitled "Advance Manufacturing Monitoring and Diagnostic Tool"; PCT/US2015/014765 entitled "METHOD AND APPARATUS FOR DETECTION AND IDENTIFICATION OF COUNTERFEIT AND SUBSTANDARD ELECTRONICS" and U.S. Ser. No. 14/329,160 entitled "System and Method for Physically Detecting, Identifying, Diagnosing and Geolocating Electronic Devices Connectable to a network".

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

BACKGROUND

1. Technical Field

The subject matter relates, in general, to a system and method for detecting a modification of the electrically powered devices and/or a modification of the results generated by electrically powered devices due to an effect of malicious software, malware, software, software updates, hardware, viruses, Trojan horses, Rootkits, spyware, adware, scareware, worms, zombie computers, privacy-invasive software, backdoors, Rowhammer exploits, or firmware. The subject matter recognizes abnormal or unexpected changes, patterns or characteristics in the intended or unintended electromagnetic emissions given off by the electrically powered devices due to such effect.

2. Description of Related Art

Conventionally, employed solutions to the problem of unwanted, dangerous, intrusive or malicious software, firmware or hardware changes typically utilize methods which intrusively examine digital data or digital operations within a device, subsystem or system. This typically requires system time and system resources to perform. Alternative methods typically use a system's own existing system hardware and/or software resources to examine digital data going into a system for known malicious patterns. This again typically requires additional system processing time and resources. The above methods do not address changes already placed in firmware or hardware circuitry. Further, the above changes require an intrusive means, modifying system operation to accomplish their goal. The above changes cannot be performed undetected and/or at a distance from a questionable device. More so, to the best understanding of the Inventors, conventionally solutions, employed to address the above described issues, are associated with many disadvantages. As for some examples, the conventional solutions cannot well detect deliberately concealed temporarily inactive malicious hardware or firmware modifications lurking in an infected system and waiting to be automatically invoked or unleashed when triggered by a condition, signal combination or status change. The conventional solutions cannot be implemented in a separate, portable, unobtrusive, non-contact, and attachment-not-needed handheld device for inspection of suspected equipment. The conventional solutions cannot function without modification of or addition to the aggregate digital signaling to or within, digital processing, or logical operations of the system under test. The conventional solutions cannot acquire a baseline of operations, baseline characteristics, or baseline behavior, without a period of intrusive changes such as data acquisition periods and execution to the known-good system and cannot do this at a distance. The conventional solutions cannot geolocate or locate an electronic device associated with a source of emissions indicating the presence of such undesired modifications or lack of modifications in software or firmware. The conventional solutions cannot invoke state changes which selectively activate, modify or inhibit such malware software activity or malware software activity results from a distance by active Radio Frequency (RF) illumination. The conventional solutions cannot determine if active RF illumination has succeeded in a desired malware mitigation state change from a distance.

Conventional test methodologies, to best knowledge of the Inventors, are incapable of unobtrusively detecting malicious malware in hardware components or software subsystems. Unit tests run on individual components or regression tests performed are only capable of assessing presence or absence of functionality, as for example described in specifications. Malware is easily hidden and its detection is thus difficult or virtually impossible using current methods, and not facilitated by these specifications, and therefore are out of the reach of currently employed assessment methods. Many Malware instantiations are triggered by very explicit patterns and/or event sequences that are nearly impossible to detect from analysis of provided code or assessment of the operating parameters of functional bitstream tests. Further complicating matters, third party software vendors often withhold critical information due to intellectual property concerns, making independent verification impossible using standard test methods. Sophisticated attacks such as control of assets, denial of service, altered or disabled functionality, and information leakage can be accomplished by malicious actors with smaller skillsets due to advances in automated tools. As the sophistication of cyber-security threats continues to evolve, the need for advanced tools for detecting malware becomes ever more apparent.

System on a Chip (SOC) produced by major device manufacturers such as Intel, Qualcomm, Nvidia, Texas Instruments, Samsung, and others are vulnerable to hardware Trojans as they integrate multiple IP core components from third party vendors. Malicious circuitry in the form of Hardware Trojans in any IP core can compromise the operability and security of the entire system, removing or altering core functionality or leaking sensitive information. A DARPA study assessing the level of trust associated with each stage of modern Integrated Circuit (IC) life cycle identified multiple untrusted steps at which malicious Trojans could be easily inserted into the IC. The vulnerability associated with this process poses an immense threat.

There exists a compelling need to screen, detect, and disqualify third party software and firmware IP cores with software or hardware Trojans to protect the integrity of critical systems which rely on complex ICs. These include FPGAs, CPLDs, microprocessors, microcontrollers, Digital Signal Processing (DSP) chips, Power PCs, and SoC architectures.

Conventional test methodologies are incapable of detecting malicious circuitry in VLSI/FPGA components. Unit tests run on individual components or regression tests performed on chip designs are only capable of assessing functionality described in part specifications. Trojans or other malicious circuitry are generally not included in these specifications, and therefore are out of the reach of currently employed assessment methods. Many Trojans are triggered by very explicit patterns or event sequences that are nearly impossible to detect from analysis of provided netlist. Further complicating matters, third party vendors often withhold critical information due to intellectual property concerns, making independent verification impossible using standard test methods.

Therefore, there is a need to mitigate or overcome the limitations of test intrusiveness, the limitations of acquiring or testing for malware by requiring modification of device operation, and the limitations of inability to test for firmware or hardware changes with conventional methods and/or techniques.

Further, there is also a need for a separate, isolated, portable, unobtrusive, non-contact, and/or attachment-free and even handheld apparatus or device for inspection of suspected equipment or electrically powered devices.

Modern industries from telecommunications to medical equipment are integrally reliant on embedded Integrated Circuits (ICs) and System-on-a-Chip (SOC) architectures to drive primary system functionality. Malicious software and circuitry in a modern device can subvert its functionality, enabling theft of Intellectual Property (IP), critical financial information and providing a backdoor into closed systems. Of additional concern is the use of third-party IP cores in programmable logic devices such as Very Large Scale Integration (VLSI) and/or Field Programmable Gate Arrays (FPGA) devices or third party software. For programmable logic, instantiation of tainted or malicious code results in creation of malicious circuitry that can compromise entire systems. Complex ICs are currently integrated into the smart grid, used in routine surgeries, and data servers that power the information economy. Firmware and software used to control these critical assets can be used to exert control, extract information from, disable functionality under specific conditions, or cause malfunction.

Users of modern electronic devices face a wide variety of threats. For example, innocent-looking websites can surreptitiously hide malicious software (malware) such as computer viruses, worms, Trojan horse programs, spyware, adware, and crimeware in files downloaded from the websites. The malware can capture important information such as logins, passwords, bank account identifiers, and credit card numbers. Similarly, malware can provide hidden interfaces that allow the attacker to access and control the compromised device, or that cause the compromised device to malfunction.

Malicious circuitry can compromise security by providing a backdoor into crucial assets through the functioning of said or separate malicious circuitry or signaling, enabling subversive and criminal actions such as IP or identity theft, denial of service, or terrorist activity. The same can be said for software that uses this circuitry and in some cases the malicious firmware and software can be used cooperatively to inflict the most damage or exert maximum influence over a system. For example, subversion of the smart grid in California during summer months would cause many deaths and immense economic loss. Gate level modifications performed by state actors, criminal elements, or terrorist groups can alter the functionality of the ICs that work as the brains of communication security, financial systems, smart-grid technology, etc. Currently employed test methodologies are incapable of performing routine screening of complex Integrated Circuits (ICs) to detect and disqualify backdoor or malicious circuitry, also referred to as Hardware Trojans. The threat posed by hardware Trojans has been recognized across the domestic technology industry, including alarming reports concerning 'undetectable' malicious modifications to Intel microprocessors, Dell servers, and Google platforms.

Google's Kurt Rosenfeld has stated publicly that "Vulnerabilities in the current integrated circuit development process have raised serious concerns about possible threats from hardware Trojans to military, financial, transportation, and other critical systems". The potential insertion of hardware Trojans into modern SOC/VLSI/FPGA devices through third-party IP cores is a growing concern throughout the domestic technology industry, posing a threat to telecommunications, medical equipment, financial systems, computer networks, and mobile devices. Hardware Trojans pose an insidious threat, jeopardizing intellectual property, proper system functionality, and the ingenuity of the nation. For the foreseeable future there will be a compelling need to have a robust capability to detect hardware Trojans and other kinds of malicious circuitry modifications in modern ICs. Multiple markets have this need, including device manufacturers, electronics integrators, and certified test laboratories.

Current approaches may use software security programs to search the binary data representation in computer memory of wanted or necessary software, firmware or hardware to find digital patterns associated with "potentially unwanted software, malware or programs" by programmatically scanning static memory patterns on fixed memory media for unexpected or known undesired patterns by doing a software file, ram, rom or memory scan. Alternatively, current approaches may examine incoming digital transmissions of software or raw digital data for specific patterns which are known to be unwanted or which deviate from the expected pattern or intermediate checksum results of the wanted software.

Third-party IP core designs typically supply at most a pre-synthesized netlist representation of the IP core design, with a VHSIC (Very High Speed Integrated Circuit) Hardware Description Language (VHDL) entity or Verilog module component solely for the purpose of design instantiation. As the VHDL or Verilog source code is not usually available, there is the risk of unknown, malicious circuitry being introduced into the overall design. Even in instances where the VHDL or Verilog source code for the IP is procured in addition to the netlist, these files are often developed using coding techniques and standards unfamiliar to the recipient, rendering source code analysis extremely difficult. The risks of malicious circuitry introduction are significantly increased when one considers the global nature of technological advancement, as it is entirely possible for a third-party supplier to sell an IP core through a US-based subsidiary, which may have been designed by engineers based in India, China, Korea, and numerous other countries.

SUMMARY OF THE INVENTION

In one aspect, a non-destructive assessment of the internal circuitry of complex ICs is achieved through analysis of their Unintended radiated emissions, providing sensitivity to minute alterations inside complex devices such, for example as modern VLSI and FPGAs.

In another aspect, analysis of Unintended radiated emissions results in detection and classification of malicious circuit modification resulting from hardware, firmware, simple software and/or software (IP core) changes, tampering or introduction from third party sources.

In another aspect, analysis of Unintended radiated emissions results in the automated detection, locating, disqualification and even temporary or permanent disablement of compromised devices prior to, during testing, or after their integration into critical systems.

therein is provided an apparatus, system and method for screening and inspecting electronics for malicious changes in electrical and electronic based components, boards, devices, and systems. The apparatus includes a sensitive Unintended electromagnetic energy collection device, a controller with one or more processors processing algorithms or executable instructions to compare signature of the collected energy to a known standard, standard of comparison, or to a predetermined understanding of expected emissions of the inspected object and at least one specifically created algorithm or executable instructions for automatically determining if the signature of the collected electromagnetic energy matches the standard, which may define presence of a malicious circuit modification.

Other aspects of the invention will become apparent by consideration of the detailed description and accompanying drawings.

BRIEF DESCRIPTION OF THE DRAWINGS

FIG. 2A illustrates an enlarged partial view of apparatus of FIG. 2;

FIGS. 12A-12B illustrate exemplary spectra of programmed and unprogrammed FPGA emissions;

FIGS. 14A-14B illustrate exemplary spectra of programmed and unprogrammed FPGA emissions;

DETAILED DESCRIPTION OF EXEMPLARY EMBODIMENTS

Figure 1:
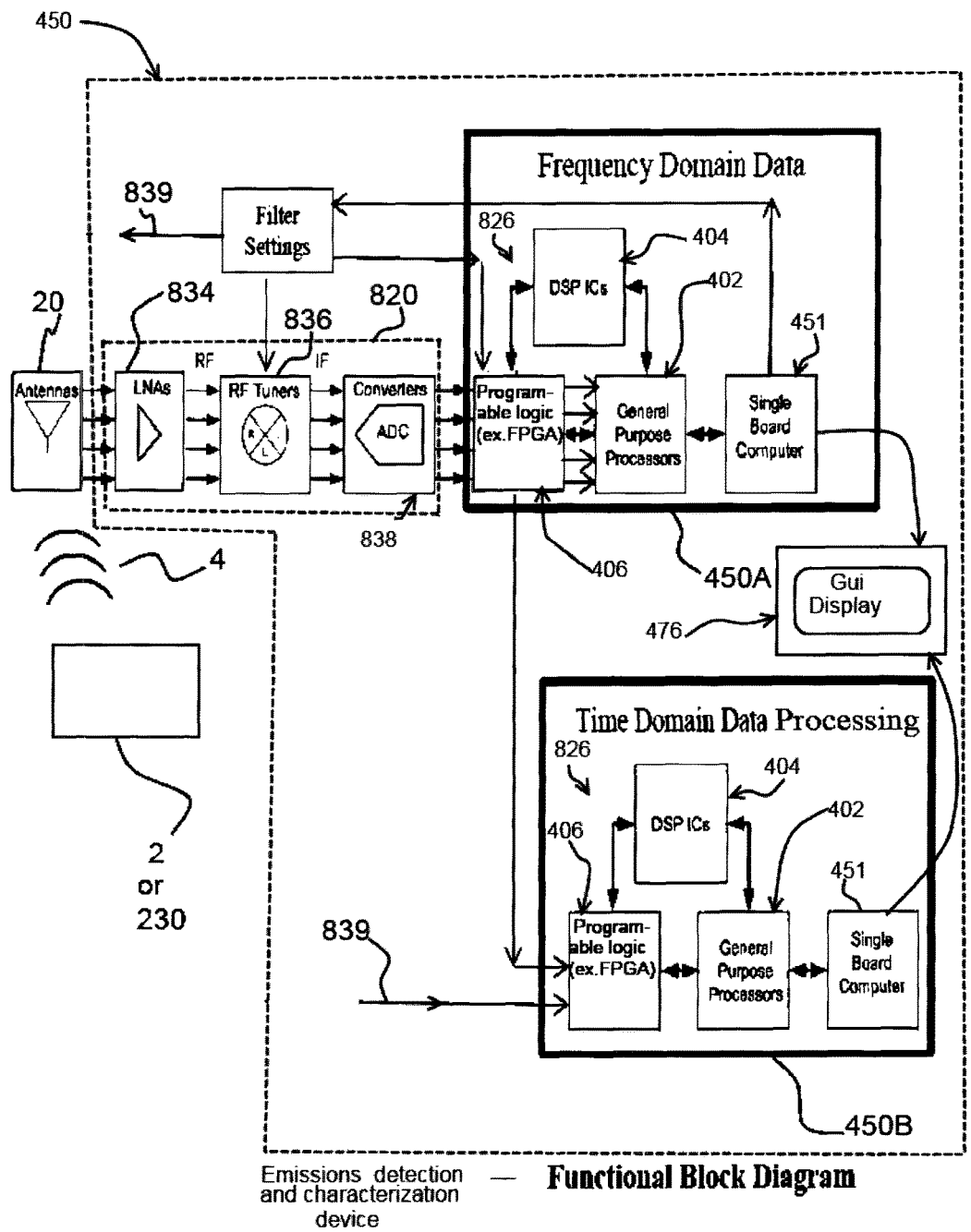
FIG. 1 is a schematic block diagram of an exemplary apparatus for inspecting or screening electrically powered and/or electronic devices in the time domain and/or the frequency domain.

Prior to proceeding to the more detailed description of the claimed subject matter it should be noted that, for the sake of clarity and understanding, identical components which have identical functions have been identified with identical reference numerals throughout the several views illustrated in the drawing figures.

The following detailed description is merely exemplary in nature and is not intended to limit the described examples or the application and uses of the described examples. As used herein, the words "example", "exemplary" or "illustrative" means "serving as an example, instance, or illustration." Any implementation described herein as "example", "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," "exterior," "interior," and derivatives thereof shall relate to the invention as oriented in the Figures. Furthermore, there is no intention to be bound by any expressed or implied theory presented in the preceding technical field, background, or the following detailed description. It is also to be understood that the specific devices and processes illustrated in the attached drawings, and described in the following specification, are simply examples of the inventive concepts defined in the appended claims. Hence, specific dimensions and other physical characteristics relating to the examples disclosed herein are not to be considered as limiting, unless the claims expressly state otherwise.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a circuit board" includes reference to one or more of such circuit board.

It is to be understood that a detectably modifiable electronic part (DMEP) may be, but is not limited to an IC chip, FPGA, ASIC, board, partially assembled board, sub-system, complete computer system, computer peripheral or considered to be a pattern in computer memory. It is further to be understood that a good DMEP can be a known good part, or can be a DMEP containing known good software, firmware or hardware. Further, it is to be understood that a candidate DMEP is a DMEP with unknown software, firmware or hardware. Finally a bad DMEP can be a DMEP with deliberately modified software, firmware or hardware or is a DMEP with an anomalous and/or a malicious software, such as an improper software version, improperly written software with bit or byte changes errors, software running under incorrect or undesired parameters, software running in an incorrect or undesired state, software with undesired bugs, malware, worms, Trojans, virus, incorrect software, exploits, SQL injection attacks or deliberately or Unintendedly modified software behaving contrary to its expected or intended function or purpose. The DMEP software may include additional functionality, disabled desirable functionality or be lacking desired functionality. Software may be considered to be a bit pattern which modifies operation of hardware. This definition also includes accidently or deliberately modified hardware. This definition is further directed applies to parts, components, devices, apparatuses, subsystems or systems whose operation has been modified for malicious purpose while hiding its intent to deceive as to the intended modified function.

These software execution signature definitions, with particular direction to improper-software can be received from all parts to include, but not limited to active and passive circuit board parts, semiconductor devices and integrated circuits. Identical definitions apply to a board, circuit board, circuit board assembly, assemblies, devices, apparatuses subsystems, systems or products.

It is to be understood that a modified or unmodified device refers to a device which has or has not been modified from its original intent in bit, byte or word patterns in software, firmware, or programmable hardware, or by other changes such as FIB ion beam circuit editing to determine knowledge of the devices' status. The detection of the unmodified nature of an unmodified device may be recognized as important in the cases where an upgrade is expected to be in place, wherein the upgrade's purpose is typically to eliminate specific software or firmware security vulnerabilities, and unmodified software, firmware or hardware represents an entity with a known exploitable vulnerability which was believed to have been patched or repaired previously.

The forgoing description will be focused on emission of unintended electromagnetic energy and, more particularly, the emission of unintended electromagnetic energy being in a Radio Frequency (RF) spectrum, which is typically referred to in the art as frequencies below 300 GHZ, although infrared, infrasonic and other emissions are also contemplated by the exemplary embodiments.

Some exemplary embodiments are illustrated and described in a combination with an integrated circuit (IC), electrical component, or a semiconductor, although it will be apparent to those skilled in the relevant art that the instant invention may be applied to other electrical or electronic devices such as boards, multi-chip modules, systems, subsystems, peripherals and the like and as such should not be interpreted as a limiting factor of the instant invention.

Every electronic device gives off electromagnetic emissions when operating. Many exemplary embodiments operate by analyzing the unintended or intended emissions of a microelectronic device, phenomenology that is causally dependent on its internal circuitry and programming. Malicious circuitry resulting from hardware or software modifications such as hardware Trojans emit well-defined signatures that are detected by identifying characteristic signature elements associated with altered or additional functionality inserted into the IC. This approach can bear several potential advantages, namely passive, non-contact scan of the device under test, completely non-destructive and poses no hazard to operators or environment, rapid test approach enables screening of 100% of IP cores intended for devices in critical applications, can scan the hardware or instantiated software prior to test integration, preventing any possible contamination of the larger system, can continuously monitor and test a system while its usefully and functionally operating, without interfering in any way with the normal operation. This enables a system which can virtually immediately detect a malicious injection attempt before it becomes operational, while it is being altered, is fully operational, or before it can cause loss or damage. Supervisory systems, circuitry and/or software, upon detection, can be notified of a new, attempted, ongoing or sudden malware presence or partial presence and thus allow action to be taken such as a switchover to an isolated redundant backup system, disconnection from a network providing the injection of malware, placing the system in a non-operational state to prevent damage of other equipment or other loss including data loss, quarantine of the system to prevent spread of the malware, disabling external access to the system to prevent unwanted external access to a compromised system, and/or other appropriate, necessary or desirable actions. A signal, voltage state value, watchdog periodic signal, or the like can be transmitted to notify external equipment or personnel of the continuous, periodic, sporadic or occasional monitored equipment status. Further, the RF transmission can be transmitted to disrupt, disable or permanently damage a device infected with undesired software, also there is a capability of determining if the infected device has been appropriately disrupted, disabled or damaged as a result of manual or automatic disruption efforts.

It should be noted that although the emission acquisition means is typically an antenna and specifically a wideband antenna, emission features or emissions especially in the RF range coupled into the devices' normal signal line circuitry may be similarly acquired thru appropriate capacitive, inductive or direct coupling means to I/O lines without interfering in any way with normal operation. Further, although the intended signal characteristics analog interpretation may at worst be only slightly modified, the intended digital data and its binary representation and interpretation remains unchanged. The possibly slightly modified specified voltage and data eye diagram characteristics ranges remaining still well within acceptable analog tolerances for proper digital interpretation by hardware circuitry. Said analog emission features embedded and carrying the digital data are Unintended by the designers or manufacturers, but may subtly ride or be associated with the intended data features or emissions. These features would typically not be sensed or in any way effect the normal operation of the device. Typically these features arise unexpectedly and are within design tolerances of the devices, and such features also typically interact with other features of the system, and other devices, subsystems, board traces or physical layout in unexpected fashions. While the system operates nominally correct from the designer's point of view, a vast array of very small and complex interactions, seen at a higher signal resolution in the time domain, but especially in the frequency domain, arise which the exemplary embodiment(s) can exploit to semi-uniquely identify correct configuration and operation of the device. A simple example would be the time domain and/or frequency domain characteristics of digital signal rise times, fall times, 0 states or 1 state. Such undesigned, unintended, unexpected and unanticipated subtle minor analog characteristics can widely vary due to minor configuration differences (part placement location change, part tolerances, and functionally equivalent parts) while still conveying the same expected and intended digital data between parts or to external systems. Further, malware in firmware or hardware which is configured to subtly and deliberately modulate these unintended emissions for the purpose of clandestine unwanted transmission of data can be detected. Typically the designer has no reason to study in depth these complex, difficult to predict features which arise within his resulting system, chip, ASIC, subsystem or component. Further it would be very difficult and time consuming for him to do so, with little or no benefit at the time. As these parts' unintended features later combine in an unpredictable manner in unpredictable configurations with other parts' features in the context of a completed circuit board or system, the combinatorial complexity explodes virtually exponentially. The designers of the individual components or subsystems typically have no foreknowledge of the final configuration their parts will be placed in, and alongside which other components and subsystems in the overall system context. Likewise, the overall system designer typically has no knowledge of the detailed unexpected characteristics which arise within each individual part. Only after the resulting design is embodied and substantiated, then tested can all the complex interactions be more fully ascertained through its unintended interactions creating unintended emissions. Although most of this resulting detailed subtle analog complexity is unpredictable; the correct digital logical functional results and operation of the device is quite predictable if the specified tolerances are adhered to. Therefore while the digital resulting functionality is assured, many low-level unintended highly complex, highly specific minor emissions which designers often view as 'noise' are not economically pre-knowable, or predictable with a high degree of accuracy or pre-known. Further, as the frequency and voltage resolution increases, the more detailed and complex useful features, patterns, signatures, and signature elements are usefully leverageable. There is no theoretical limit to the amount of specific detailed characteristic fingerprint features which can be acquired with more and more powerful and sensitive equipment and lower RBWs or coherent and/or non-coherent integration means. These are exploited for authentication, verification, validation, diagnostic, and/or identification purposes in both passive emission acquisition mode and active signal injection mode. Active signal injection may be in the form of a clock signal directly connected to an isolated device under test, a signal transmitted by RF and coupled into an operational system, or a signal added to the signal lines of an operational system by means such as capacitive coupling. Active signal injection may be configured by voltage amplitude, frequency, waveform characteristics, or timing characteristics to not influence the intended digital operation of the device, influence it slightly, influence it periodically, sporadically, occasionally, or continuously, disable operation of a portion or whole of the device, or permanently disable the device.

Another means of receiving the unintended emissions arising inside circuitry running software, malware, firmware and other digital operations is thus by unobtrusively coupling to one or more of the PCB traces, where PCB traces act as the only antennas or an additional antenna to comprise or supplement a dedicated antenna receiver element.

Stated a different way, there are an infinite number of different rise time possibilities and configurations, all which are sensitive to slight internal changes in the design and fabrication process, yet all these configurations can be within and maintain integrity with respect to the specified digital overall rise time result required, and hence represent the same digital data. Changes in the physical device structure or logic, for example a longer internal route length inside an FPGA, can typically cause different rise time or fall time characteristics, which in turn are emitted and are indicative of a possible modification.

In one exemplary embodiment, discern of a distinction between devices with and without hardware or software Trojans or malware from multiple categories is based solely on unintended emission signatures and identified characteristic signature elements associated with different categories of hardware Trojans and algorithmic method for detecting Trojan-specific phenomenology in emission signatures for a relevant SOC device, as has been established.

Some exemplary embodiments provide a description for automatically detecting and classifying software, firmware and hardware instantiated Trojans in IP cores through unintended emissions. Characteristic emission signature elements associated with different hardware Trojan categories have been identified using this at least an algorithmic methodology for detecting these elements developed. Algorithms targeting Trojan-specific phenomenology can be embedded within the electronic assessment sensing technologies for the purpose of an exemplar embodiment though other embodiments are clearly possible. Automated detection of Malware and Trojans in SOC/VLSI/FPGA devices based on unintended emission phenomenology is an exemplar embodiment. Automated part handling can be readily be integrated with Malware detection capabilities for full automation of the technology, reducing operating expenses by minimizing labor hours needed to perform screening and has been clearly envisioned and contemplated herewithin. The capabilities disclosed herein have a broad impact across domestic industries in securing supply chains for complex ICs and their operations by enabling rapid detection of hardware Trojans in IP core and for technology users to be able to validate the technology that is used on a day to day basis.

Many embodiments provide a disruptive technological capability in preventing the introduction of Trojans, greatly increasing critical system security and intellectual property integrity.

Some embodiments provide a screening tool for detecting hardware Trojans. This screening tool can be applied at multiple stages of electronics lifecycle, from device design and fabrication through board level integration and following routine maintenance. The screening tool is automated such that an untrained technician can successfully screen for hardware Trojans.

The described methodology and hardware/firmware test system detects malicious circuitry or software in third party IP cores, offering sensitivity to minor circuitry additions or modifications (software or firmware), lack of dependence on known specifications (third parties often do not provide base code for IP cores), scalability up to perform 100% inspection for critical applications, and real world applicability and a rapid, non-destructive test method that can be fully automated for routine detection and disqualification of compromised third party IP cores.

In one exemplary embodiment, therein is provided a rapid, non-destructive test method that can be fully automated for routine detection and disqualification of compromised third party IP cores.

All aspects of a circuit affect the waveform emitted as power percolates through active and inactive sections of the IC. The resulting emission spectrum serves as a fingerprint that can be used for authentication and IC diagnostics. Incorrect circuitry, an unexpected quantity of unused or inactive gates, or additional components attached to expected circuitry manifest in the measured emission spectrum. This phenomenology is used to screen software, firmware or hardware components of systems differentiating proper ones from inauthentic, undesired or infected ones in a rapid test typically requiring approximately 3 seconds per system on average. The algorithmic approach leverages this phenomenology to determine whether malicious circuitry elements, malicious or improper software, or software elements are present in the SOC/VLSI/FPGA device or if similar instantiations initiated via malware are present.

In one exemplary embodiment, therein is provided a novel means for rapidly and reliably detecting software contaminants and software initiated hardware Trojans or physical hardware Trojans in third party IP core. Trojans are typically illegal software modifications and their detection will invoke appropriate corrective measures.

Analysis of unintended emissions may provide an indirect and potentially non-contact method for examining the inner workings of an IC without the need for destructive or costly full electrical test techniques. Changes to the internal circuitry of the IC affect current flow when powered and thereby alter the emitted waveform. This phenomenological relationship can be used to detect these changes and identify whether a received third party IP core is clean or whether malicious circuitry exists.

Many exemplary embodiment variations can typically operate by supplying power, ground, and clock to a device, subsystem or system under test, capturing the resulting unintended emissions, and algorithmically analyzing the spectrum to identify characteristic signature elements. Alternatively, many exemplary embodiment variations can capture the emissions of a self-contained system in-situ, already powered and operational. During operation, the electronic component, system or sub-system can typically be more optimally placed into an enclosure which isolates device emissions from radiative environmental sources (>80 dB isolation and typically with a sensitivity greater than −150 dBm) with example embodiments providing sensitivity of −160 dBm, −170 dBm and −172 dBm. The Emission phenomenology used has a thoroughly established foundation in electrodynamics. Current flow through internal circuitry, specifically changes in electron current in conductors produce radiated emissions that are dependent upon path length, geometry, and the electrical properties of the circuitry used (trace resistivity, dopant levels, etc.). Software algorithms and/or executable instructions perform an algorithmic analysis on emission signatures to automatically identify key signature elements acquired which then are analyzed or automatically compared to assess the internal circuitry of the device being tested.

Some embodiments can acquire and analyze emission signature elements characteristic of maliciously altered electronic devices and signature content that manifests due to the presence of hardware Trojans. Algorithms and/or instructions are executed by one or more processors to extract signature elements in locations that are specifically associated with malicious circuits, flagging the IP core as subversive and/or identifying the type of hardware Trojan present. The tainted IP core can then be manually or automatically quarantined prior to any contact with sensitive systems, ensuring their integrity.

Hardware Trojans Taxonomy and Emission Manifestation—Hardware Trojans occupy a finite category space of circuitry modifications to IP core in SOC/VLSI/FPGA devices. Trojans can be categorized based on different aspects of their design, implementation, activation, intended effect, location, and physical characteristics. All Trojans involve malicious alteration to the circuitry of the IP core, whether through inclusion of additional logic or the modification of existing circuits. As such, Trojans from all categories of the taxonomy tree are detectable through detailed analysis of unintended emission signatures. Individual Trojans sharing categories in the taxonomy involve similar modifications to the IP core. All Trojans within a category manifest in the emission signature in a similar way, providing one of the means by which to detect and identify malicious circuitry.

Figure 16:
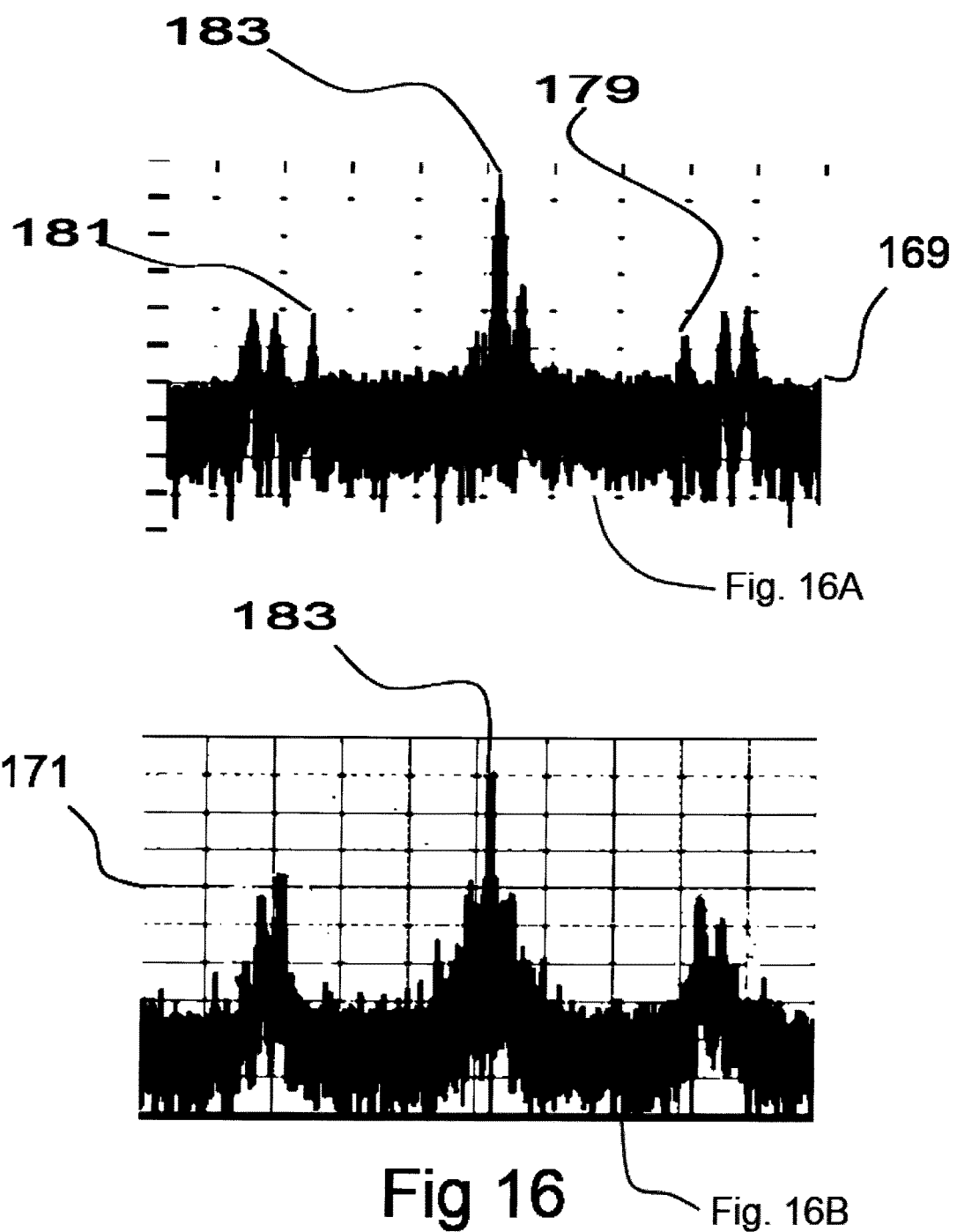
FIGS. 16A-16B show the exemplary spectra representative of an FPGA module-removal modification.
Figure 17:
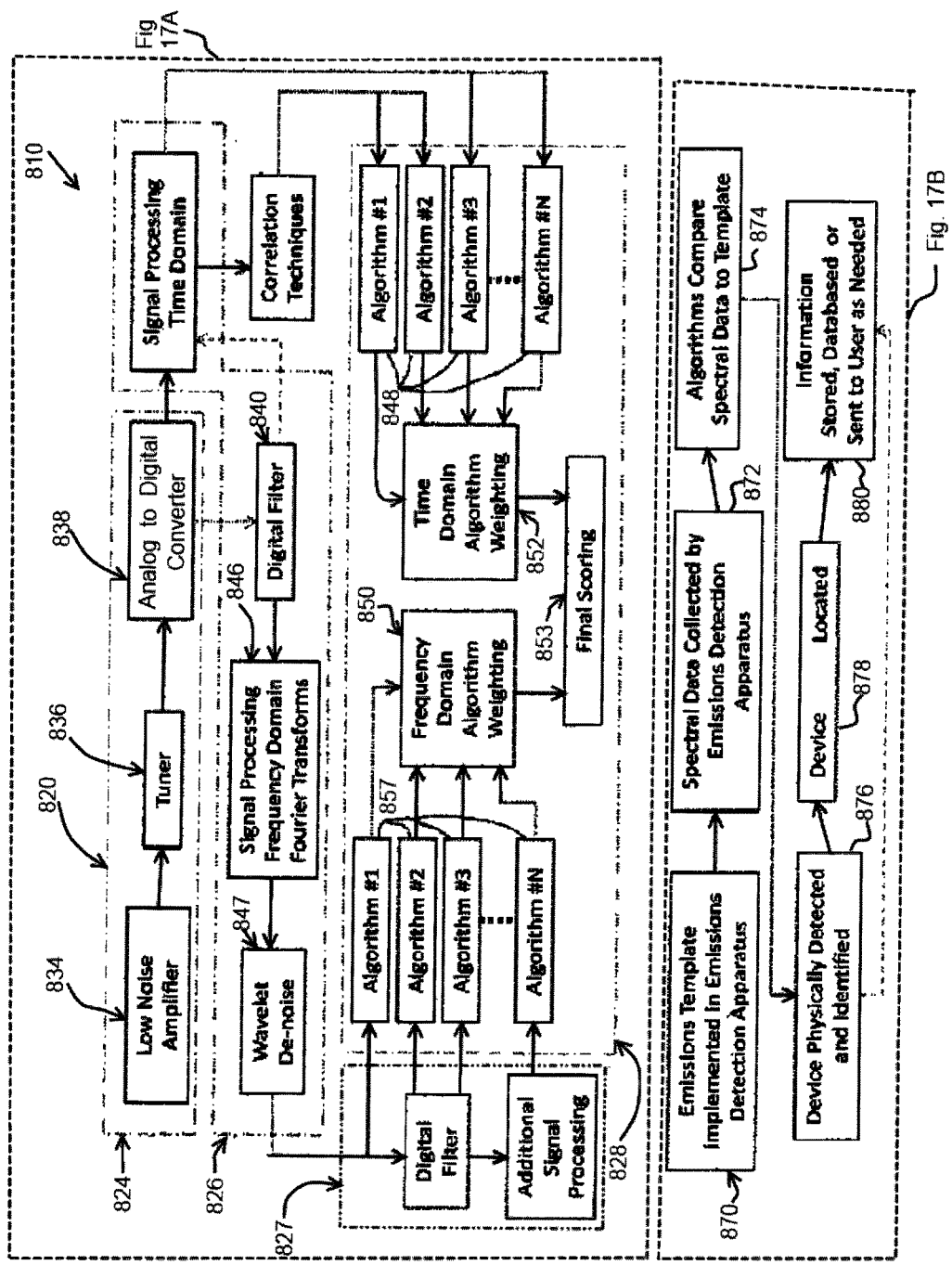
FIG. 17 shows detailed software and hardware components of apparatus in FIG. 1.

Trojans that require additional logic, for example by adding unwanted functionality, will alter the quantity of unused or inactive circuitry within the SOC, VLSI or FPGA device as seen in FIGS. 13, 14 and 16. Inactive circuitry within the IC affects the emitted waveform by contributing to phase noise. Emissions from active pathways are coupled to these inactive pathways, causing them to contribute to the aggregate signature. Altering the percentage of inactive circuitry within an FPGA may manifest in phase noise and noise floor levels received. Emission power based on unused circuitry can be calculated using an equation for phase noise seen below, which typically calculates phase noise contributions to the emitted waveform, given consideration of electron velocity within the integrated circuit. Measurement of phase noise thereby provides a direct means for detecting Trojans. Malware, modified or unmodified software that effects circuit functionality in a similar manner is likewise detected in this manner. Removing an entire module from an FPGA device broadens phase noise and alters the noise floor. Such a change would be expected for hardware Trojans that leak information or cause denial of service.

$$P_{SBC}(\Delta \omega) \approx 10\log\left(\frac{\frac{\overline{i_n^2}}{\Delta f}\Sigma_{m=0}^{\infty}c_m^2}{4q_{max\Delta\omega}^2}\right)$$

The sensitive unintended electromagnetic energy collection apparatus could be any means known in the art for collecting electromagnetic energy.

In one embodiment, a highly sensitive Radio Frequency (RF) energy collection apparatus and a signature measurement comparison means is used for comparing the collected energy to a known standard and where RF is defined as covering the frequency range from about 3 KHz to about 300 GHz.

Some embodiments focus on the RF frequency range described, though the same techniques can clearly apply to higher frequency or shorter wavelength emissions such as infrared spectrum analysis. As an example, some malware may unduly exercise I/O operations causing more energy and heat to be radiated from that portion of a circuit or chip. Alternatively, internal CPU clock speed may be reduced as a result of malware causing less needed security operations and overall security supervisory activity. This reduced clock speed causes a reduced frequency emission from the CPU. Alternatively, a magnetic or electrostatic sensor may be employed to detect changes in current draw or operational voltage level into the device caused by malware at relatively low frequencies.

One exemplary embodiment specifically targets unintended radiated emission phenomenology for malicious code such as malware, viruses, circuitry resulting from hardware or software modifications in complex ICs and programmable logic devices. As specific types of circuit modifications result in predictable kinds of phenomenology, prior knowledge of IP core specification is unnecessary in detecting devices with hardware Trojans. Radiated emissions, may be targeted in a non-contact, non-destructive, and fast enough manner enabling the inspection of all material (100% screening) intended for critical applications.

Removing an entire module from an FPGA device typically broadens phase noise and alters the noise floor. Such a change would be expected for hardware Trojans that leak information or cause denial of service.

Hardware Trojans that alter existing circuitry will similarly modify the emission signature in predictable and characteristic ways. Altering circuitry changes the path length and typically introduces additional pathways through which power will percolate. Weak emission signals will thereby be altered in amplitude and frequency even when Trojan-specific circuitry is not active. Coupling of weaker internally emitted signals within the device results in characteristic signature elements readily described by established mathematical relationships. The inventors have derived an approach to predicting these relationships for instantiation in automated algorithms. The amplitude, phase, and envelope are modeled by the modulation index β of the Bessel function of the first kind as seen in the equation below, which for illustrative purposes shows a Bessel function of the first kind; wherein n is the cross modulation peak index, and β is the modulation index.

$$J_{(n)(\beta)} = \sum_{k=0}^{\infty} \frac{-1^k \left(\frac{\beta}{2}\right)^{(n+2k)}}{k!\,(n+k)!}$$

On exemplary embodiment uses the alteration of individual gates within a part manifesting itself as changes in emission signature elements. This type of phenomenology is characteristic to different types of malicious circuitry within third party IP core, enabling the detection and identification of Trojan presence and classification through algorithmic assessment.

By using a Laplace Transform as seen below certain additional characteristics can be ascertained such as time-variant decay curves emitted in a signature containing time-variant elements. These elements may be typically derived from or contributed to by discrete capacitive, inductive and/or resistive circuit elements in the device under test, especially when employed in very inexpensive and cost sensitive hybrid analog-and-digital circuitry.

$$\text{Laplace}\{E(t)\} = \text{Laplace}\left\{Ri(t) + L\frac{di(t)}{dt}\right\}$$

$$E(s) = R \cdot I(s) + L(s \cdot I(s) + i(t_0))$$

$$E(s) = L\{E(t)\} = L\{E_X \cdot 1(t)\} = \frac{E_X}{s}$$

$$I(s) = \frac{E_X}{s} \cdot \frac{1}{R} \cdot \frac{1}{1+\frac{L}{R}s} + i(t_0)\frac{L}{R} \cdot \frac{1}{1+\frac{L}{R}s}$$

$$\text{Laplace}^{-1}\{I(s)\} = i(t) = \frac{E_X}{R}\left(1 - e^{-\frac{R}{L}i}\right) + i(t_0) \cdot e^{-\frac{R}{L}i}$$

One exemplary embodiment can screen, detect, and disqualify third party software and firmware IP cores containing software or hardware Trojans to protect the integrity of critical systems which rely on complex ICs. These include FPGAs, CPLDs, microprocessors, microcontrollers, Digital Signal Processing (DSP) chips, Power PCs, System on a Chip (SoC) architectures, etc. Automated algorithmic assessment and signature comparisons of unintended emissions from these devices as well as fully integrated boards, systems or computer assets that contain these components is carried out. Comparisons with previously acquired known good emissions from known good software, firmware or devices operating in known good hardware are typically employed.

Typical useful testing points in the IC device life cycle and vulnerable stages for malware insertion or malware part replacement insertion include after specification and design but before Fab interface, Mask generation, wafer Fabrication, wafer probe testing, and die cutting and packaging. Similarly a second and third useful test point and vulnerable stage is between packaging and package test or between package test and package deployment to distributors.

An exemplary embodiment provides a means for automatically detecting and classifying software, firmware and hardware instantiated Trojans in IP cores through unintended emissions. Characteristic emission signature elements associated with different hardware Trojan categories are identified and an algorithmic methodology for detecting these elements is used. Algorithms targeting Trojan-specific phenomenology are provided in one exemplar embodiment. Automated detection of Malware and Trojans in SOC/VLSI/FPGA devices based on unintended emission phenomenology is an exemplar embodiment.

Automated part handling can readily be integrated with the detection capabilities for full automation of the technology, reducing operating expenses by minimizing labor hours needed to perform screening manually and has been clearly envisioned and contemplated herewithin. The capabilities developed have a broad impact across domestic industries in securing supply chains for complex ICs and their operations by enabling rapid detection of hardware Trojans in IP core and for technology users to be able to validate the technology that is used on a day to day basis. An exemplary embodiment employs an automated part handling apparatus.

The use of emission phenomenology to exploit incrementally, in subdivided chunks of the entirety of Malware and Trojan taxonomy is another exemplar object.

Register Transfer Level (RTL) based programmable logic hardware provides multiple advantages for test and diagnostic purposes in employing at least some exemplary embodiments. First, the separate testing of RTL based Trojan examples allow for the generation of netlists and programming files using available synthesis and layout tools, as use of direct netlist files are typically in vendor-specific formats. Second, utilization of RTL based examples provides the option to analyze the Trojan element as an isolated, independently synthesized, and characterized entity for separate analysis, performed within a specifically designed hardware test fixture as a functional part of an embodiment.

Stationary or interchangeable test boards suitable for providing a platform for the testing of malware, viruses, Trojans or other anomalous software or IP core samples within an isolated suspect IC emplaced into the test board's socket are used in several exemplary embodiments. An exemplar test board along with its basic architecture is shown in in FIG. 9. The use of such a test board allows for a consistent hardware environment for instantiation of all benchmark hardware Trojan examples. Multiple boards which facilitate testing of multiple technologies though a universal fixture is provided in an embodiment that allows for only one board to test all technologies or similarly, in one embodiment the computer asset, software, or firmware etc. is exercised without requiring an isolated or dedicated board for testing. In some cases, the fixture may be substituted with a card edge connector for similarly providing useful power and clock signals as well as control signals to a semi-populated or fully populated PCB board for testing. In addition an exemplar embodiment allows the parts, boards, systems or networks to be tested in situ in the hardware that they are intended to operate in. Finally, variations on these exemplary embodiments typically have ZIF sockets, multiple selectable sockets to test multiple devices simultaneously, sequentially, and/or in a binary search fashion to find the devices emitting the unexpected unintended signature.

There are typically at least several modes of operation. In the signature acquisition mode the characteristics of frequency regions containing features specific to a known good software, firmware or hardware operating in a system or a device may be found and acquired. Alternatively, in the same basic signature acquisition mode, the characteristics of frequency regions apparently containing features specific to a known malware software operating in a system or a device may be found and acquired. The signature acquisition mode can search for and find all candidate signature regions which exhibit a characteristic group of complex peak structures significantly above the noise floor. These candidate signature regions can later be compared with candidate signature regions emitted from known uninfected, good software running in the hardware configuration or alternatively unknown or Malware indicative candidate signature regions. The comparison yields signature regions which are common to both and also those which indicate nothing relevant to malware execution and also signature regions which are present, absent or modified in only the uninfected or infected devices and indicative of a basis for comparison and discriminating factor which can be used to weigh or identify malware infected hardware from its RF emissions.

In one embodiment, the signature acquisition mode can obtain signature frequency regions from an antenna located in an anechoic RF isolating chamber, an antenna located on or near a board under test being assembled, or an antenna located outside or inside a complete system under test such as a PC. Further, signature acquisition modes can include a means to acquire the exemplary signatures for a device, chip or subsystem by simply powering it and allowing an onboard built-in clock within the device to run the device, generating the characteristic RF signatures within the exhibiting frequency regions.

Alternatively, the signature acquisition mode can include a means to induce generation of the exemplary signatures for a device, chip or subsystem by providing it both an external clock and a power source while the characteristic signature feature search and acquisition is occurring. In one exemplary embodiment, there may be incorporate a means to power and generate appropriate signals including clock signal within an anechoic chamber (not shown). In one exemplary embodiment, there may be a means to deliberately load known malware, bad software, or software of a known specific exemplary configuration into the device, chip or board under test to acquire the exemplary bad signature after the software is loaded and is executing or while the software is loading and typically before it is complete. In one exemplary embodiment, there may be a means to exercise the board under test using driven controlled outputs for use as device or board's inputs to invoke a state which triggers or better invokes, exhibits or exercises the software's or firmware's signature characteristics. The software may only exhibit highly recognizable signature behavior patterns periodically, sporadically, occasionally and therefore a means to trigger such behavior, such as deliberately running a program in the system or device, or performing an internet webpage access, other I/O operation, or file download may be contemplated herewithin.

Malware and Trojan example synthesis, layout, and test device programming can be performed separately from the device test location, while maintaining the software and hardware status of each test device examined to ensure that each signature data collection has known associated characteristics and configuration. Software configurations typically include malware version. Use of standardized test hardware, for example antennas with known shape, gain profile, and frequency responses as well as test fixtures of a specified known configuration, device input voltage settings, device input clock frequency settings, and operational placement processes facilitate a consistent baseline system with consistent responses for identification of signature elements characteristic of the benchmark malware, viruses and Trojans. One example would include test boards with traces of known and proper characteristics and frequency responses to transmit high frequency features with minimal attenuation.

The signature comparison mode may search for and obtain signature frequency regions from an antenna located in virtually unlimited possible number of antenna configurations and compares the signatures acquired with the characteristics of known good or bad software implementations running in the hardware under test.

In one embodiment therein is incorporated a hardware and/or software means to perform multiple possible actions based on the results of the signature comparison made including device disablement, user alarm, redundant device switchover, device marking, device disablement via deliberate application of excessive current, device placement in a predesignated bin category, software reload with known good software or the like.

Characterization in one embodiment is performed over the 1 MHz-3 GHz frequency range with high spectral resolution (LOW resolution bandwidth or RBW) to maximize Signal to Noise Ratio (SNR). Other embodiments allow measurements from 1 GHz to 10 GHz, 10 GHz to 100 GHz, 100 GHz to 300 GHZ, 1 kHz to 1 MHz or the complete range from 1 KHz through 300 GHz most of which is often defined as the Radio Frequency (RF) band. Data acquisition is controlled via the software, enabling full capture of broadband signal information in a reasonable time frame. Specific regions of interest as candidate signature regions identified in broadband sweeps are closely examined using software algorithms for the presence of peaks and especially peaks indicating intermodulation components. Real-time assessment enables capture of multiple looks to identify any variability in signature due to random noise fluctuations and is critical in capturing time-varying content within signatures.

Emission signatures are analyzed to identify signature elements characteristic to different malware, virus or hardware Trojan categories such as added gates or removed gates as typically indicated by one means as an increase or decrease in noise floor emitted or in phase noise of emitted peaks. Signatures for unaltered or known uninfected boards provide a baseline to expedite comparison with known infected boards and identification of Trojan-specific signature characteristics.

The presence of the hardware Trojan on the development board manifests in the emission signature in at least one of alteration of signature elements when compared with an associated unaltered board, inclusion of additional signature elements and removal of signature elements seen in the baseline. Signature elements examined include, but are not limited to, spontaneous emission phenomenology, non-linear mixing products, phase noise, signal to noise ratio, and noise level.

Each Trojan category exhibits characteristic signature elements which are identified with the specific way that each alters the IP core circuitry. Each malware category exhibits characteristic signature elements which are identified with the specific way that each alters function of the IC core circuitry. Each virus category exhibits characteristic signature elements which are identified with the specific way that each alters function of the IC core circuitry, subsystem circuitry or board level circuitry. These elements may be uniquely identified with one category or have application across multiple categories. Results from signature assessment populate a database with the characteristic signature elements associated with each individual category. Signature elements common across multiple Malware or Trojan categories of each category are identified and implemented into the database under which one assesses the signatures.

Another embodiment is to associate the signature change with the amount of circuitry that is functionalized by a software program. This can be measured as the aggregate energy or as frequency relationships such as harmonics or intermodulation products and can be applied over narrow bandwidths or wide bandwidths as the circuitry and software characteristics combine to offer useful features within those regions. Dimensional transformations such as Principal Component Analysis (PCA) are used to more clearly denote differences in observed phenomenology for each category. Results of PCA can further discern clusters of malware taxonomy including a cluster region associated with a specific range of values of a $1^{st}$ and $2^{nd}$ principal component axes such as dB change in noise floor vs. phase noise distribution in dB/(Hz*degrees). The cluster regions include a denial of service region, an information leak cluster, a performance degradation cluster, and a change in functionality cluster.

Detection algorithms facilitate detection of malicious code, firmware or malicious circuitry and such detection is accomplished in one exemplary embodiment through algorithms that target emission signature elements identified to be of significance. The algorithms or instructions execute dby one or more processors may encompass multiple stages, starting for example with raw time-domain emission data and ending with an assessment of whether a Trojan, Malware, virus of other contaminant is present in the device under test, inspection and/or examination.

Time-domain emission data is transformed to the frequency domain by means of a Fast Fourier Transform (FFT). Signature elements and signature region 2-D patterns for comparison purposes are extracted across a wide frequency band via quantitative analysis. Such quantitative analysis elements may include averaged or statistical quantities representing measurements including the noise floor level, phase noise distribution, absolute and relative peak locations to other peaks, non-linear product peak envelope shape, and the structure of identified peaks. A dataset is populated with results for each signature element which represents the characteristic behavior of the IP core.

The signature library may be loaded or programmed with datasets for known malware or Trojan behavior. The measured dataset are located within a 2-D or possibly the multi-dimensional signature element space. This location is transformed to a two or three-dimensional space using Principal Component Analysis (PCA), after which the distance between the device under test and cluster centers for each Trojan category will be determined. If the measured dataset falls within threshold of a known Trojan cluster, the algorithm declares the device to have a malware or Trojan of that category. If the measured dataset falls outside the bounds of known Trojan behavior, the device will be declared to be free of malicious circuitry, software contaminants, malicious software etc.

Figure 9:
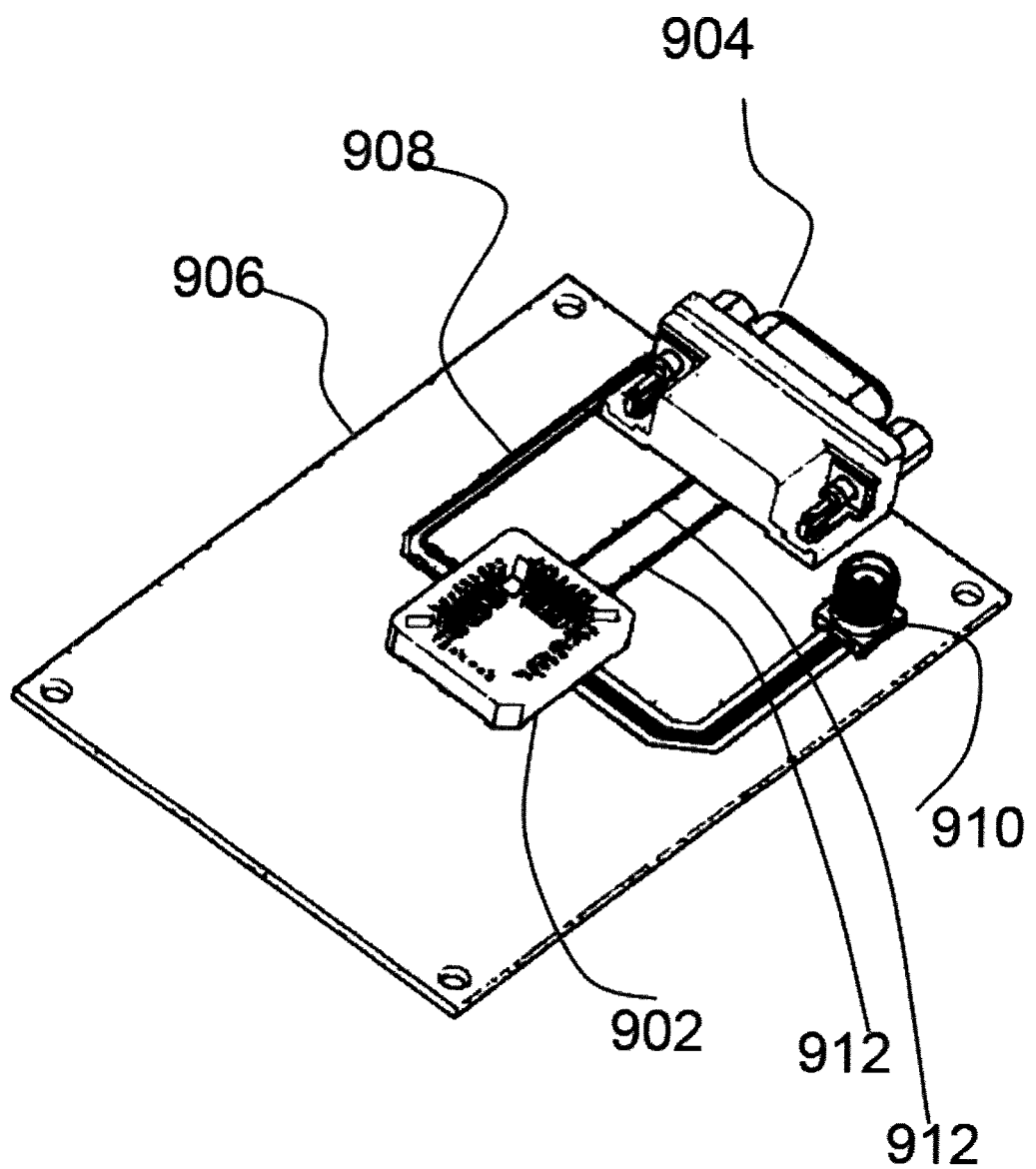
FIG. 9 illustrates an exemplary physical test board along with its basic physical construction and components.

Open source online literature has libraries of hundreds of different malware and Trojan benchmarks which are available for use in the research and development of new technologies and methodologies intended to detect and combat the effects of malware, software and hardware Trojans. As an example of use, a specifically chosen malware item may be deliberately downloaded into a candidate device, the device placed in a suitable environment such as a test fixture such as is shown in FIG. 9, the device is energized with power and clock, then the device's resultant emissions and emission signatures may be acquired, characterized and analyzed as a baseline for comparison with other devices of unknown origin or malware status. Other representative examples of software, bitstream, VHDL, firmware and hardware modifications may simulate contaminated computer assets and or the building blocks of software, firmware or hardware changes that are needed to introduce contamination into computer assets. These benchmarks typically provide both the original unadulterated IP core, as well as the hardware Trojan infected IP core for testing purposes. Instances of these types of exemplar malware and Trojan threats have been used for validation of the described techniques. At a minimum, measured and detected signature changes from the expected signature of a baseline unprogrammed device are indicative of the possible or probability of introduction of unexpected or undesired programming or direct hardware modification by Focused Ion Beam into a device which is expected to unprogrammed and an original direct from factory part.

The use of emission phenomenology to exploit incrementally, in subdivided chunks of the entirety of Malware and Trojan taxonomy is another example. Although the specific frequency location, peak envelope, intermodulation peaks location from the highest peak in a frequency region, added phase noise, and etc. varies greatly from device to device and malware to malware, the method embodiments and embodiments described herein accurately characterize and subsequently identify devices containing malware, modified software, Trojans, unmodified software, viruses, and the like.

Malware and Trojan example FPGA logic synthesis, subsequent layout, and test device programming performed systematically followed by signal acquisition and analysis from said programmed devices can sufficiently maintain the status and signature of representative devices examined to ensure that each data collection has known programmatically recognizable and discernable characteristics. For example, correlation of known programmable device part number, part batch number, and synthesis gate instantiation processes facilitate identification of signature elements characteristic of the specific benchmark malware, viruses and Trojans across a range of subsequently correlated devices which can support such malware, viruses, Trojans and the like.

The detection algorithms can function offline on raw time domain or frequency domain data acquired elsewhere and/or previously using the system or in a fully automated manner. Automation of the test algorithm and integration within the embedded software architecture is accomplished to fully automate screening of malware or IP core for hardware Trojans. It is further envisioned an exemplary embodiment employing elements separated by significant geographical distances may be configured for the purpose of maintaining security or reducing purchase costs. Thus a system which transmits sampled time domain emission data over the internet to a central spectral signature analysis location may thus offer cost, security and/or ease of maintenance and update advantages.

The characteristic signature regions for a testing board with a hardware Trojan is measured. The detection algorithms detect signature elements associated with the Malware or Trojan. Algorithm results are used to determine what should be disqualified and/or quarantined.

A secondary feature may determine locations of software or hardware component RF emissions within a system, a test board containing one or a plurality of emitters, or of a system located amongst many similar systems, while frequency analysis may concentrate on finding a specific anomalous software by characterizing the signatures of a type and/or class of devices, based on their intended and unintended radio emissions. As devices are being characterized, selectively included unintended emissions or collateral signals from other functions or internal simulators and spurious or unintended signals would be typically included as useful identifying signature features.

Examples of measurable firmware induced variations creating emission artifacts for use by signature search and analysis include timing patterns or pattern changes, clocking patterns or pattern changes, bitstream patterns or pattern changes, hardware instantiated oscillators or changes therein, ring oscillators or changes therein, frequency of the beat frequency oscillator or changes therein, local oscillators or changes therein, up and down conversion operations in a typical IC (such as A/D, D/A, encoding, decoding, compressing, unzipping, voltage regulation), change in current drawn, patterns of changes in current drawn, Phase Locked Loops or changes therein, and automatic gain control or changes therein.

In comparison with unprogrammed devices 2 as seen in spectrum 120 of FIG. 12A, programmed devices 2 show a richer spectral content with additional signature elements as seen in spectrum 126 of FIG. 12B. Furthermore, the noise floor is raised in FIG. 12B, that may be another indication of the programmed device 2. The primary signature peaks which are also present in unprogrammed devices 2 are larger in amplitude than in the programmed devices 2. In addition to the primary signature peak 104, several peaks 106 arising from products of pre-placed pre-existing malware such as by an FIB modification arise as seen in a spectrum 102 of FIGS. 10A-10E.

FIGS. 10A-10E show exemplary spectrum regions of typical changes associated with hardware malware or firmware malware typically occurring in a logic device or programmable logic device such as an FPGA. For example, the apparatus in any of the described exemplary embodiments may consistently acquire the spectrum region shown in FIG. 10A from a known good device, whereas the same spectrum region frequency, frequency span and resolution bandwidth shown in FIG. 10B consistently acquired from an unknown device would be an indication it contained malware. The difference between FIG. 10A and FIG. 10B are indicative of a new peak or peaks 104, 106 appearing in a malware infected device and a consistent presence of said peaks is a malware indicator. Further, if the known good device emitted the spectral region shown in FIG. 10B and the unknown device emitted the spectral region shown in FIG. 10A, the substantial consistent difference between sampled regions would again indicate a malware presence by absence of peaks 106 in FIG. 10A. A key consideration by the software may not be a presence of features, but a consistent evident change in features in the same frequency region for each device.

Figure 10:
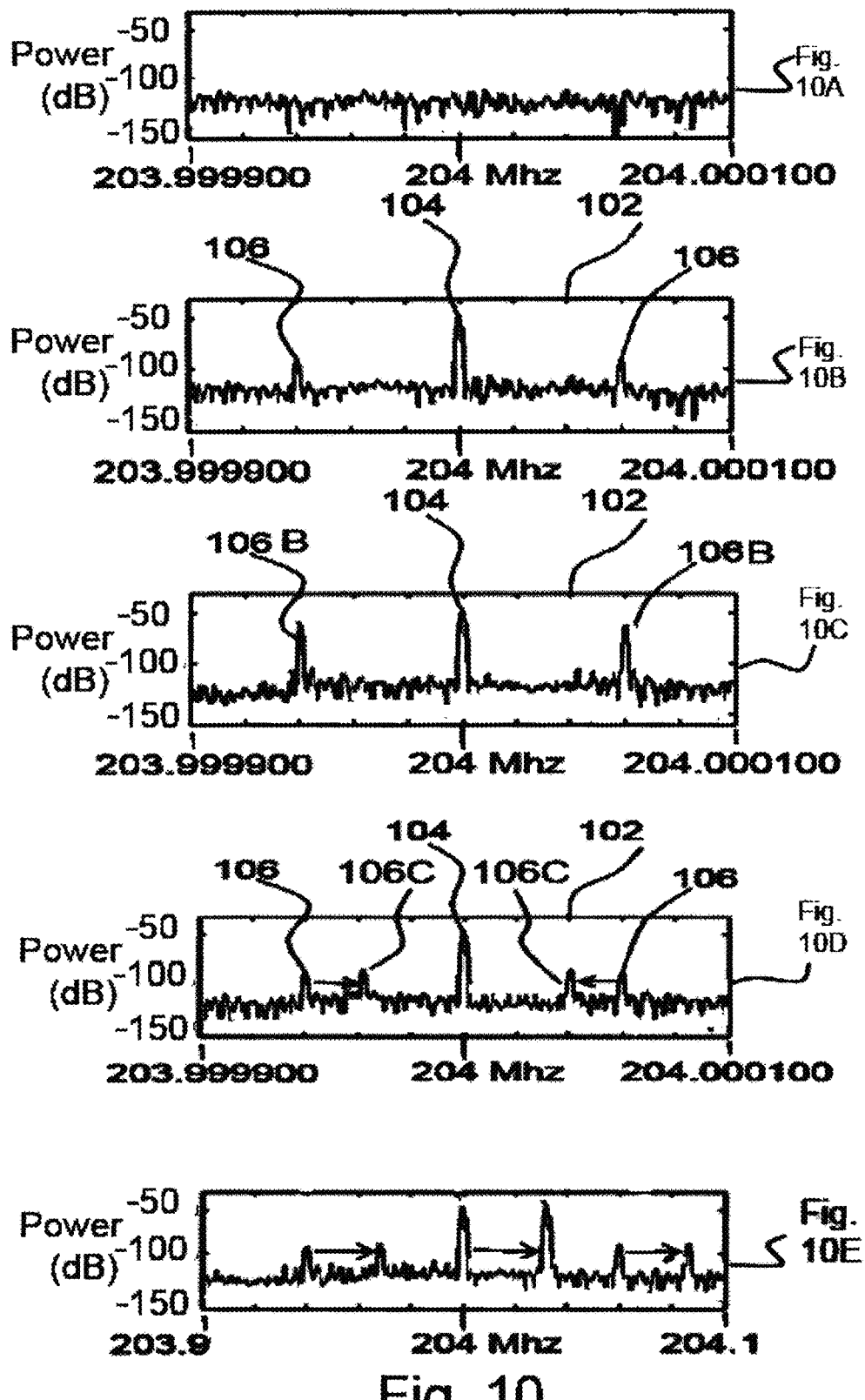
FIGS. 10A-10E illustrate exemplary spectrum regions containing features representative to emissions from hardware malware and/or firmware malware.

Similarly, a consistent difference in acquired spectrum at the same frequency, span and RBW between a good device and an unknown device shown as FIG. 10B and FIG. 10C, that is a change in height between peaks 106 in FIG. 10B and peaks 106B in FIG. 10C may lend evidence towards a malware infection in the unknown device. This same principle may apply to a comparison between FIG. 10C and FIG. 10D, or any two figures illustrating evident differences shown in FIG. 10. Therefore a change illustrated in between FIG. 10C and FIG. 10D or a shift in relative location of peaks 106 to 106C, especially a symmetrical shift towards or away from a central peak 104, lends evidence towards a malware infected device. A change illustrated in FIG. 10E shows a shift in frequency of a set of peaks 104 and 106 similarly showing evidence of a malware infection. More than one change between devices may be consistently seen, such as a reduction in peak height and a shift in relative peak locations, such as seen between FIGS. 10B and 10D, giving stronger indication of a malware presence.

The acquired verification of presence of multiple pattern changes as those detailed in the above description and shown in FIGS. 10A-10E may accumulate stronger and stronger certainty towards the indication of a hardware malware presence. Similarly, a spectrum feature change between a known good device and an unknown device wherein the spectrum samples for each are taken at the same time intervals but the acquired spectrum difference between the devices at the time intervals is consistently different across many spectrum regions indicates the execution and/or presence of a software malware. As before, the greater the number of observed differences between the two devices, this time across both time and frequency regions or domains, the greater indication of a software malware presence. It would be understood that task switching and multiprocessing or multiprogramming would need to be taken into account and filtered out in more complex systems before such indications could be accurately observed.

It has been found that even a single gate change in a complex IC can substantially impact the content emitted by the device. Thus, the subject matter contemplates an FPGA instantiated firmware architecture consisting of multiple copies of several basic data processing elements. The baseline design and subsequent netlist was modified to inject a single-gate modification which altered the periodicity of a single pulse generating module. FIGS. 16A-16B show one example with the before spectrum 169 and after spectrum 171 of an FPGA module-removal modification, with a center peak 183 exhibited in both spectrum 169 and 171 of FIG. 16. Spectrum 169 shows the resulting spectrum of unmodified firmware, wherein peaks 181 and 179 characteristic of the module before removal are visible. FIGS. 16A-16B also illustrate the resulting EM spectrum changes and signature changes detected by the disclosed RF sensor technology wherein the single bit register removal manifested as the loss of one of the three distinct peaks on each side of the primary peak.

Figure 13A:
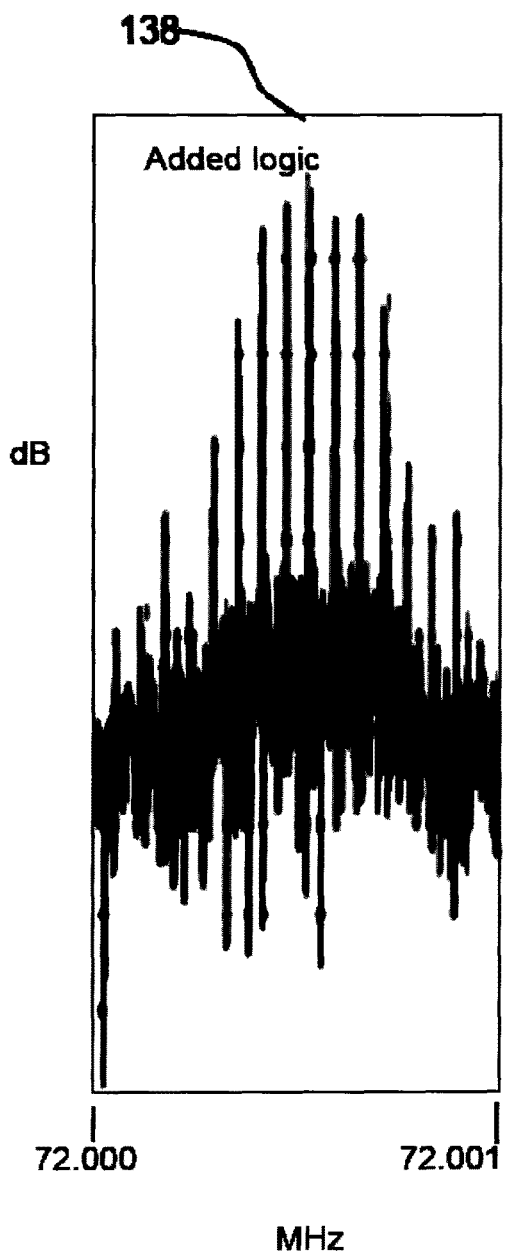
FIGS. 13A-13B illustrate exemplary emission spectra for anomalous and standard devices.
Figure 13B:
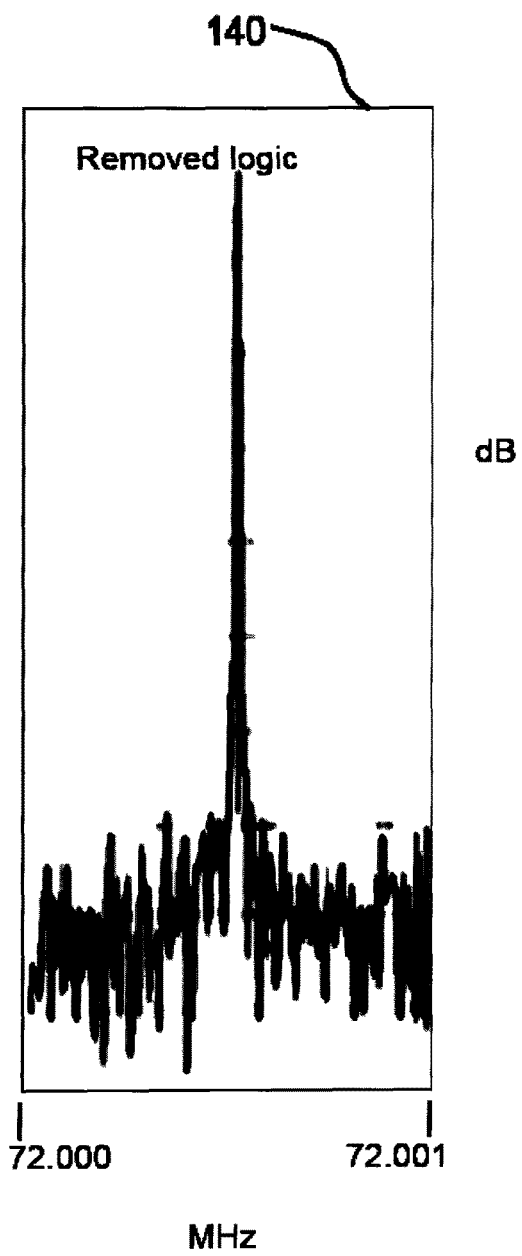
Figure 18A:
FIGS. 18A-18B illustrate an exemplary unintended spectrum of modified and unmodified FPGA emissions.
Figure 18B:
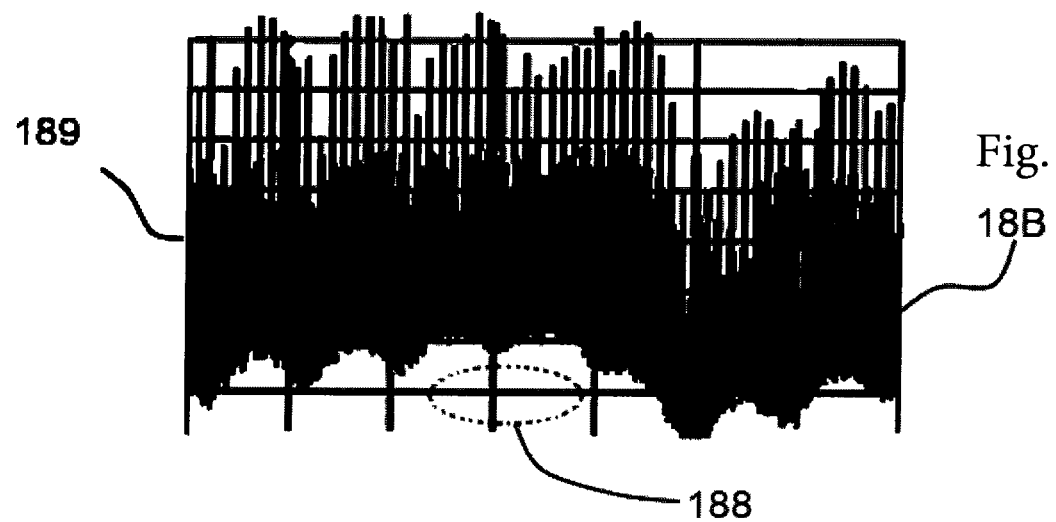

FIGS. 18A-18B also show an exemplary spectrum of a FPGA before and after, that is unmodified and modified. The spectrum 191 is unmodified and has been found as generating a visibly and characteristically different signature envelope from the spectrum 189 which is of a modified FPGA. Clearly discernable, is the higher dB signal region of the spectrum 189 in the substantially left hand side of the spectrum and raise noise floor level 188 in FIG. 18B. FIGS. 14A-14B also show changes due to FPGA modification, spectrum 142 is generated from an unmodified FPGA and Spectrum 144 is generated from a modified FPGA, clearly evident is the higher peak region 148 associated with added functionality. FIGS. 13A-13B show exemplary spectrum changes resulting from a substantial addition of malware functionality to an FPGA, wherein spectrum 138 in FIG. 13A shows added logic and spectrum 140 in FIG. 13B shows the spectrum before additional logic. Typical frequency spans in FIGS. 13A-13B, FIGS. 14A-14B, FIGS. 16A-16B, and FIGS. 18A-18B may be from about 1 kHz to about 20 kHz, typical center frequencies may range from about 70 MHz to about 800 MHz and typical RBWs used to acquire these spectra may be from about 1 Hz to about 10 Hz RBW with typical dB spans on the Y-axis being from about −150 dB to about −50 db.

Upon analyzing the correlation between observed, measured phenomena arising from the types of IC changing edits, it is seen that small changes in the IC hardware or software result in distinct changes in the resulting signature when running. Simply rerouting a signal to an I/O pad does not typically cause the same type nor degree of changes that would produce a recognizable signal as seen by exposing underlying circuitry by means such as decapsulation. However, reroute modifications showed that the addition of circuitry changes did not decrease the changes in signatures observed with exposure. This shows that surreptitious changes in an IC are represented in the emissions signature.

The employed signal processing software algorithms (executable instructions) as well as HDL based topologies allowing low RBW and large number of FFT points being acquired simultaneously further enhance these capabilities. Some exemplary embodiments use software configurable RF tuner boards, Software Reconfigurable Radio (SRR) boards, Radio Frequency (RF) processing boards as well as a single board computer. In one exemplary embodiment, each SRR board includes a General Purpose Processor (GPP), Field Programmable Gate Array (FPGA) chips typically used for down converting and FFT generation, Digital Signal Processor (DSP) chips, high speed Analog to Digital Converters (ADC) and high speed Digital to Analog Converters (DAC). In another exemplary embodiment the GPP, FPGA and DSP applications are encompassed in a System on a Chip (SoC) while the ADC is external to the SOC. In another exemplary embodiment all of these subcomponents are integrated into a single SoC including the RF tuners. The SRR boards effect real time digital signal processing of Intermediate Frequency (IF) signals from the RF tuner board. Some exemplary embodiments employ at least one of Baseband demodulation, decimation, filtering, automated windowing, automatic gain control, Fourier Transforms, Wavelet Transforms, Laplace Transforms, Artificial Intelligence (AI), Artificial Neural Networks (ANN), detection and signal identification algorithms and reconfigurable hardware (FPGA) topologies implementing advanced processing are all located on this programmable hardware. Human interface and networking to external systems are provided through the single board computer in one example and an external computer in another example.

The employed hardware components provide sufficient speed of data collection processing and throughput to extract significant information from the computer asset, device under test, and/or software under test, to be tested. For example, emissions from the data and/or address lines associated with memory reads or writes can be exploited for detection of software contaminants. Additionally, while DRAM memory is operating, each memory cell must be refreshed repetitively, within the maximum interval between refreshes specified by the manufacturer, which is usually in the millisecond region. Refreshing does not employ the normal memory operations (read and write cycles) used to access data, but specialized cycles called refresh cycles which are generated by separate counter circuits in the memory circuitry and interspersed between normal memory accesses. These operations or cycles create unique unintended emissions signatures that can be readily received and exploited for signature recognition in like manner to the recognition of unintended emissions of hardware and software components taught herein.

The storage cells on a memory chip may be laid out in a rectangular array of rows and columns. The read process in DRAM is destructive and removes the charge on the memory cells in an entire row, so there is a row of specialized latches on the chip called sense amplifiers, one for each column of memory cells, to temporarily hold the data. During a normal read operation the sense amplifiers, after reading and latching the data, rewrite the data in the accessed row before sending the bit from a single column to output. The normal read electronics on the chip has the ability to refresh an entire row of memory in parallel, significantly speeding up the refresh process. The refresh circuitry must perform a refresh cycle on each of the rows on the chip within the refresh time interval, to make sure that each cell gets refreshed. A normal read or write cycle refreshes a row of memory, but normal memory accesses cannot be relied on to hit all the rows within the necessary time, necessitating a separate refresh process. Rather than use the normal read cycle in the refresh process, to save time an abbreviated cycle called a refresh cycle is used. The refresh cycle is similar to the read cycle, but executes faster for two reasons; for a refresh, only the row address is needed, so a column address doesn't have to be applied to the chip address circuits, and data read from the cells does not need to be fed into the output buffers or the data bus to send to the CPU. These refresh patterns create unintended emissions from DRAM chips and associated circuitry which can also be recognized and discriminated.

Because Dram memory is accessed, it generates unintended emissions when the data lines change state and are rewritten. Although many bits are read and rewritten simultaneously, aggregate Unintended emissions contain useable pattern content sufficient to create a useful discrimination especially if additional or less memory used by the added malware contains unmodified or modified data, and not a pattern of all 0's. Also, each cell contributes its '1' or '0' value to the overall simultaneous refresh operations. This timing difference between cells, coupled with the measured aggregated 1/0 state value of the cells enable the detection of a change of software bit code patterns in DRAM memory at an aggregate level which then invoke additional scrutiny to differentiate between authentic and inauthentic (malware) software in a modified system. Thus a measurable difference in unintended emissions occurs if the program stored as data within the device is changed. This change will be more pronounced if the additional malware data code causes more total Dram memory to be used, as opposed to existing only as modifications of existing data bits of the program code, which is often the case. A difference in emissions that result will also be measurably evident in signature frequency regions when the program execution causes a modification in the sequence of Dram memory accesses to the code by the CPU when the code is executed and when the memory contents written differ from the compared baseline memory contents written.

Some exemplary embodiments provides configurations to acquire emissions from Dram memory containing modified or unmodified bit patterns representative of Trojans, malware, software modifications and the like, create signatures based on those emissions, compare signatures from modified and unmodified Dram contents and determine which form of software is executing, modified and unmodified. Further, at least one embodiment is operable for acquiring emissions from the data or address bus lines of Dram memory while the software, or portions or routines of the software is being read from or written to Dram, while initially being written, swapped in or out, or accessed during execution, and containing candidate software to be tested, and based on the emissions determine which form of software is executing, modified or unmodified.

In examining the characteristics of emissions from hardware caused by software and changes in software indicative of a new presence of malware, a software upgrade, a software upgrade rollback, or more generally a comparison between emissions from modified and unmodified software, an analog time domain of received RF emission can be translated into a unique or distinct frequency domain pattern and likewise a unique frequency domain pattern can also be converted into a unique analog time domain RF emission using an FFT or inverse FFT. The measurable frequency domain characteristics of hardware emissions while executing a piece of or a completed whole of a software section, subroutine, program, routine, driver or library component in the time domain are characteristic and unique to the software instructions and data, creating hardware address and data bit patterns and subsequently emitted by the hardware. AT least one exemplary embodiment is operable to acquire and recognize or match characteristic software emissions signatures with the corresponding modified or unmodified typically previously known software patterns residing in memory and being executed by the processor.

Further, by controlling the RBW used to acquire the emission corresponding to software component execution, there may be acquired a small piece or portion of the possible software execution duration or a sequential set of such executions, with a lower RBW or longer acquisition dwell time acquiring a larger portion of software execution, translating to more total instructions executed. A large enough dwell time is capable of acquiring the emission pattern from a complete software execution from beginning of program, routine, subroutine or driver I/O operation to the end. There are advantages of a shorter acquisition in a multiprocessing or multiprogramming system where multiple softwares are running simultaneously or near simultaneously in a preemptive multitasking interleaved pattern. A shorter acquisition has a better chance of capturing a recognizable unique emission pattern associated with a piece of software execution with less noise from other unrelated software executing before and/or after and/or during the targeted software was executed. A longer acquisition has a capability of distinguishing with higher probability and a more detailed signature a recognizable unique emission pattern associated with a piece of software execution if there is little or no other noise associated with unrelated software executing during that acquisition. A combination of preferably processing smaller duration pieces of acquisition and larger longer duration pieces simultaneously is indicated as a means to more reliably detect the presence of changed corresponding modified or unmodified software. It can thus now be further recognized by one of ordinary skill in the art the advantages of analyzing the same duration of time domain emission in many different time domain durations with separately starting and ending time domain sections and RBWs within the acquired time domain data simultaneously, using portions or the whole of its contents analyzed by for example by separate simultaneously executing FPGAs or FPGA time domain to frequency domain conversion elements detailed in matter detailed herein or incorporated by reference herein and their associated signature pattern analysis processing components. In this manner, a section of software, no matter whether executed in one single time-continuous portion or in separated interrupted sections or any combinations thereof can be detected with a higher degree of probability, even with the influence of unrelated emissions due to unrelated software being executed in an interleaved manner or before, during or after the targeted software and its emissions occur in the time domain sample being converted to a frequency domain spectrum, said frequency domain spectrum being converted to a signature for the further analysis and discrimination.

It can be further recognized that continuously and/or commonly appearing peaks or characteristic features evident in the frequency domain can be acquired and subtracted out as a preprocessing step to further enhance and better reduce the influence of constant unrelated signals when creating or comparing signatures. Additionally, the use of non-coherent integration can reduce the unwanted noise present and enhance the features' characteristics and pattern resolution.

Non-coherent integration can be applied to malware detection in the following manner. In the processing of Unintended emissions induced from malware infected devices, ultra-low level signal artifacts below the noise floor can be enhanced, seen and processed when employing non-coherent integration, especially when 3 or more spectrum samples of the same region and RBW are acquired. The more samples the better. There are several advantages of non-coherent integration across multiple spectrum acquisitions on the same channel or from different channels over Coherent integration, the key one is the greater hardware and software simplicity translating to a virtually unlimited number of samples being integrated together. Coherent integration length is far more limited by the hardware capabilities, ie. FPGA blocks available. There is no theoretical limit to the depth and resolution of features which may be extracted using non-coherent integration. Practical factors limiting or reducing effectiveness however occur in the signal acquisition hardware and include; drift due to clock inaccuracy (essentially mitigated or eliminated using a Rubidium or Cesium clock source, over the short term the drift is negligible, processing noise reduction, this noise source can also be reduced using non-coherent integration, but a high processing noise will increase the number of sample acquisitions needed to reduce noise to a given level, reduction of rounding or truncating noise as part of processing noise, especially when using integer operations inside the FPGA, A/D number of bits resolution, the matching of A/D input dynamic range to maximum input signal strength as much as possible.

It can be further recognized that instead of performing a single long large time acquisition of signal containing potential malware, modified, or unmodified software content, a sequential series of smaller shorter acquisitions can be performed wherein the frequency domain spectrum varies in a recognizable pattern with time creating a series of separate signatures to be matched. Thus, a 3-dimensional signature can be effectively or virtually created using a series of 2-dimensional signatures of frequency vs. dB level, the $3^{rd}$ dimension being the relative time of the signature being taken. Further, this 3-D signature can be effectively matched with subsequent 3-D signatures acquired in the same RBW to determine a matching condition indicative of the presence of containing potential malware, modified, or unmodified software. In the case of interrupted and resumed malware software execution, the relative acquisition start time of specific 2-D signature segments within the 3-D signature may be delayed and hence not match until sections containing unrelated software execution emissions are discarded from the 3-D acquisition set. A trial and error approach may thus be used in matching 2-D signature elements of the known basis signature with recently acquired spectrum to more definitively determine and better or best match software emission spectrum acquired from a system where software interruption may be or has been executed.

The described exemplary embodiments take advantage of the fact that all electrical components, when powered, give off electromagnetic emissions. The emissions are defined by the radiating structures that are doing the emissions. There must be a source of energy that energizes the electronic component, board, system or subsystem to be tested. The mechanism of energizing can be simply powering the device, inputting an oscillating signal into the device or illuminating the device with unintended electromagnetic energy. The directly injected or connected oscillating input and illumination source can be a single tone, multiple tones or multiple frequencies or complex with modulation and or timing parameters applied.

Any physical electrical or electronic device that is powered will give off intended or unintended emissions of the electromagnetic energy. Each and every physical component that makes up an electronic device contributes directly or indirectly to the characteristics of the unintended emissions that are given off by the device. Not only can the emissions be detected, but their signatures are characteristic depending on the device makeup that is doing the emissions. FCC Part15 and CISPR22 govern the amount of unintended emissions that are given off by any electronic product that is sold commercially. Even devices that meet the statutory requirements give off these emissions. Particular exemplary embodiments disclose use of dedicated algorithms which automatically match an expected emission characteristic to a specific make or model of a device to detect and identify the device. Alternatively or further, the dedicated algorithms can be tailored to detect the causally related minute hardware changes, firmware changes, deviations from the expected emissions, or even higher level software changes. When the sensor or receiver has appropriate state-of-the-art sensitivity these emissions can be detected at range suitable for detecting malicious software, software changes, firmware or even malicious circuitry within an IC. Components that give off emissions in an accidental way are tied to the bulk components on a board such as clocks, processors, power supplies, power converters, oscillators, resonators, or to the internal circuits that make up integrated circuits which are composed of much smaller instantiations of these same types of electrical functions that make up an IC device. Characteristic information about these same components, whether bulk components on a board or components internal to an IC can be ascertained through the collection of unintended emissions using the described exemplary embodiments. Highly detailed analysis of the emissions can be performed to discern between individual devices which have been modified in software or hardware aspects.

There can be several identifying emission features that particular exemplary embodiments can identify about a device that is part of any network, circuit board or integrated circuit. That these in-device created features can identify or specify characteristics of the device which can constitute fingerprints and such fingerprinting has been demonstrated by the inventor to enable the ability to identify, quantify, quantify probability of, and characterize the anticipated characteristics of a device that is part of a network, computational asset, communication asset, circuit board, or IC, and now determine that they may have been undesirably modified. These discerned unintended artifacts, essentially fingerprints, take many forms from discrete snapshots in the time domain or frequency domain, to time varying characteristics that evolve and repeat over time.

The particular exemplary embodiments analyze these characteristics which conceptually provide a fingerprint or fingerprints of what is anticipated and hence form a pattern or patterns. These patterns can be tracked, monitored and verified to be certain to a degree of probability or alternatively a quantified score that the hardware, firmware or software is not substantially different or modified and is only doing what was originally intended to be accomplished and that added, disabled or modified circuitry, code or algorithms have not been implemented and are not doing something unwanted behind the scenes.

The subject matter differs from conventional approaches by way of a scan method since the approach taught herein uses carefully sought often subtle emissions or changes in subtle emissions derived from the interactions of the software with the physical electronics while the electronics is functionally executing the modified software, signals, firmware or hardware, said emissions being detectably modified by the malware or computer virus, et al. The Malware or Virus can potentially reproduce itself or alternatively is not self-reproducing.

The energized item that is being tested, inspected and/or interrogated directly or indirectly may provide a mechanism for transmission of the energy that is being radiated which is governed by the internal design of the item being inspected. Typically, the source that powers the device is the energy which powers the electronics though as noted it can be an oscillating signal such as a clock, clock signal, signal, frequency input, frequency reference, signal generator, frequency generator or other oscillating sources that are known in the art. A mechanism that transfers the energy to a radiating element within the item being tested, inspected and/or interrogated are integrated circuit dies, wire bonds, semiconductor traces, board traces, wires, cables or structural capacitive or inductive coupling. The radiating element may be an intendedly radiating antenna or an unintended antenna that due to physical dimensions acts as a reasonable antenna. If the internal parts of the electronic devices whether it be a discrete semiconductor, integrated circuit, printed circuit board, circuit board assembly, system, subsystem or product are functioning differently the part will give off a different electromagnetic signature and software induced parts functionality or parts functionality generally can be differentiated from modified or unmodified parts for inspection or screening purposes.

The unintended emissions given off by the powered electrical device, for examples from wires and/or connections, can be used to provide a substantial amount of information about the functions underlying the operations of the device 2. The emissions in this case can be used to detect malicious IP cores that were inserted into the VHDL or Verilog source code.

Now in reference to FIGS. 1, 2, 4, 6, 17, and 19, therein is illustrated an exemplary apparatus, generally designated as 10, configured and operable to detect and/or differentiate between properly operating, uninfected, unmodified or genuine one or more electrically powered devices or electrical devices 2, hereinafter referred to as device 2, and an improper configured, modified, anomalous, malicious or infected condition of the device 2. The device 2 includes but is not limited to at least one of wafer, die, discrete component, integrated circuit (IC), circuit board, circuit board assembly populated with electronic components, sub-system, system, and/or electronic device and electrical device using electronic components for operation. All of these devices, under power, emit energy, either intended or unintended in the form of electromagnetic energy, RF energy, magnetic field and/or electrostatic field.

Now in a particular reference to FIGS. 1 and 17A, a subset of the apparatus 10 is shown as apparatus 450 which includes an electromagnetic pattern sensor or a sensor 820 and controller represented by time domain and frequency domain processing modules, 450A and 450B respectively, although either would provide needed discrimination functionality of varying capability and cost depending on the signature characteristics of the emissions radiated from the device 2. The controller may be a computer loaded with the required algorithms, a circuit board assembly or a plurality of circuit board assemblies or any other controllers suitable for executing the instructions or logic algorithms.

The sensor 820 may be also referred in this document to as an emissions acquisition assembly or a emissions pattern sensor.

The sensor 820 is configured to capture unintended emitted electromagnetic energy and/or unintended conducted energy from the device 2. When the sensor 820 is configured to capture unintended emitted electromagnetic energy 4 from the device 2, the sensor 820 includes a low noise amplifier (LNA) 834, a tuner 836 and analog to digital converter (ADC) 838. The tuner 836 may be of RF tuner type. The sensor 820 can be a general receiver or tuner and the general receiver can be a heterodyne or super-heterodyne receiver OR EQUIVALENT. The receiver 820 can be improved by providing a broadband response. Though one embodiment focuses on emissions from about 100 KHz to about 6 GHZ the bandwidth can be reduced to about 30 MHz to about 1 GHz to capture the majority of emissions from the devices coming in to the facility. The receiver 820 may be provided as a stand-alone device or a circuit board assembly.

Further sensitivity is achieved by lowering the noise figure of the system. In one embodiment the receiver 820 has a modified front end with the Low Noise Amplifier (LNA) 834 with an ultra-low noise figure.

Each of the time domain and frequency domain processing modules, 450A and 450B respectively, includes one or more processors or logic devices, for example such as general purpose processor(s) 402 and programmable logic device 406 that may be a FPGA. Some FPGAs have logic employing multiple states that each have their own decision trees which the FPGA typically periodically cycles between. One exemplary embodiment is configured to examine each of the states in more detail and with less effective unrelated noise from adjacent states by employing a means to synchronize acquisitions in the time domain with the different states or sensed states.

To examine software based malware more effectively, an acquisition or analysis time window of emission signal input can be selected from a emission signal input stream, typically from the digitized analog time domain data before the fast fourier transform (FFT) or even before the down conversion before the FFT, and which is pre-known or has been found to be associated with the execution of that software or a segment of that software. In this way, the specific malware to be found can be considered to be separated from the ongoing noise in the time domain, as compared with examination in more detail in the frequency domain.

DSP integrated circuit(s) (IC) 404 and a single board computer 451 may be also provided. There is also a computational medium comprising algorithms and/or executable instructions that, when executed by the one or more processors or logic devices, cause the one or more processors or logic devices to perform, in one exemplary embodiment, the following steps on the captured unintended emitted electromagnetic energy and/or the unintended conducted energy: measuring a feature value in at least one spectral frequency region of the captured unintended emitted electromagnetic energy and/or unintended conducted energy from the one or more electrical devices, calculating a difference value between the measured feature value and a baseline feature value, and determining, based on the calculated difference value, a presence or an absence of at least one of malicious software, anomalous software, modified software, malicious firmware, anomalous firmware, modified firmware, malicious circuitry, anomalous circuitry and modified circuitry within the one or more electrical devices.

A logic set of algorithms for comparing and matching the captured RF energy to a set of parameters identified for a baseline configuration of a modified or unmodified device 2 is best shown in FIG. 17A as the logic set 810. It would be understood that such logic set 827 is carried out by the at least one processor 402, though it also contemplates other hardware or firmware manifestations to assist or perform the comparison algorithms of verifying a match with the anticipated parameters such as Programmable logic device 406 or DSP IC 404.

Logic set 810 executes Fourier Transform 846 to convert the data in the digital filter 840 into the wavelet de-noise 847 for further processing in the subset 827. At least one and plurality of algorithms 848, 850, 852, 853 and 857 in the logic subset 828 are executed to match the data collected to the expected signature for the device 2. More than one algorithm may be used to match mutually exclusive parameters of the RF energy emission signature and then combine those using numerically weighted coefficients for each in a linear or nonlinear equation to yield a final overall score approximating the degree of match to an infected device. A fuzzy logic approach, neural network or other approach may be used to assist or replace this. In this manner the ability to match the collected signature to the expected signature is improved. The weighting of these algorithms favorably improves the ability to detect modified or unmodified parts. One key factor in determining the quality of signal fed into the overall system it the linearity, number of bits (Effective Number of Bits (ENOB)) and speed of the ADC 838 converting the raw analog time domain voltages into digital values for processing. A higher ENOB for example generates less noisy data resulting in more accurate and/or faster modified/unmodified determination decisions.

Thus, logic set 810 typically includes at least one of Harmonic Analysis, Matched Filter, non-harmonic correlation, timing correlation, Artificial Neural Networks (ANN), specifically multilayer perception (MLP) feed-forward ANN with back propagation (BP), Wavelet Decomposition, Autocorrelation, Spectral Feature Measurements or Statistics, Clustering or Phase Detrending algorithms.

The configuration and/or operation of the apparatus 450 may be also in accordance with disclosures in the U.S. Pat. Nos. 7,515,094 and 8,063,813, both issued to Keller, III; in the U.S. Pat. No. 8,643,539 issued to Pauly on Feb. 4, 2014; and in the U.S. patent application Ser. No. 13/344,717 filed on Jan. 6, 2012 now published as US 2012-0179812 A1 on Jul. 12, 2012 and entitled "System and Method for Physically Detecting, Identifying, Diagnosing And Geo-locating Devices Connectable To A Network", all owned by the assignee of the instant invention and whose teachings are incorporated herein by reference thereto.

A further more detail operation of the time domain and frequency domain processing modules, 454 and 456 respectively, will be provided further in this document.

The apparatus 450 may further comprise an antenna 20 coupled to the sensor 820 and collecting the unintended emitted electromagnetic energy from the device 2.

The apparatus 450 may further comprise a graphic user interface (GUI) display 476 in a communication with one or both time domain and frequency domain processing modules, 450A and 450B respectively, for example through the single board computer 451.

Filter setting 837 may be also provided with a connection 839 to the programmable logic device 406.

Figure 2:
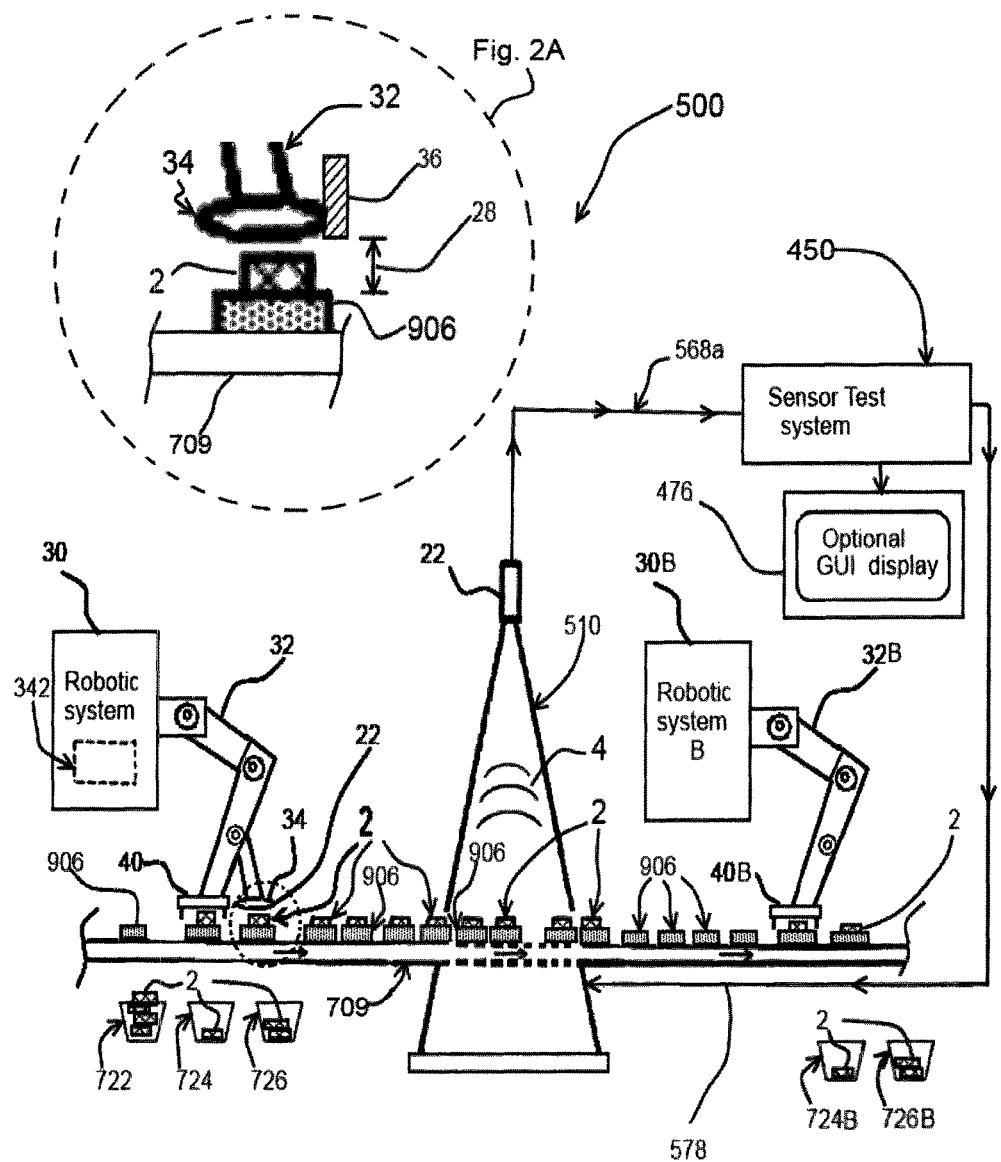
FIG. 2 illustrates a diagram of an exemplary stationary robotically controlled version of the apparatus of FIG. 1, particularly illustrating a part manipulation and/or test arm, a part conveyor, a shielded test chamber Integrated Antenna Enclosure for part emission enhancement if needed, a precision signal input antenna at the end of the robotic arm, a device under test, and a test system signature signal processing apparatus.

Now in a particular reference to FIG. 2, therein is illustrated a system 500 of another exemplary embodiment directed towards automated testing typically of a large number of device 2 and/or testing with higher sensitivity in an RF shielded hollow enclosure 510. The antenna 20 may be at least one of integrated into the enclosure 510, inserted into the enclosure 510 or may be configured into an array 22 within the enclosure 510.

Figure 3:
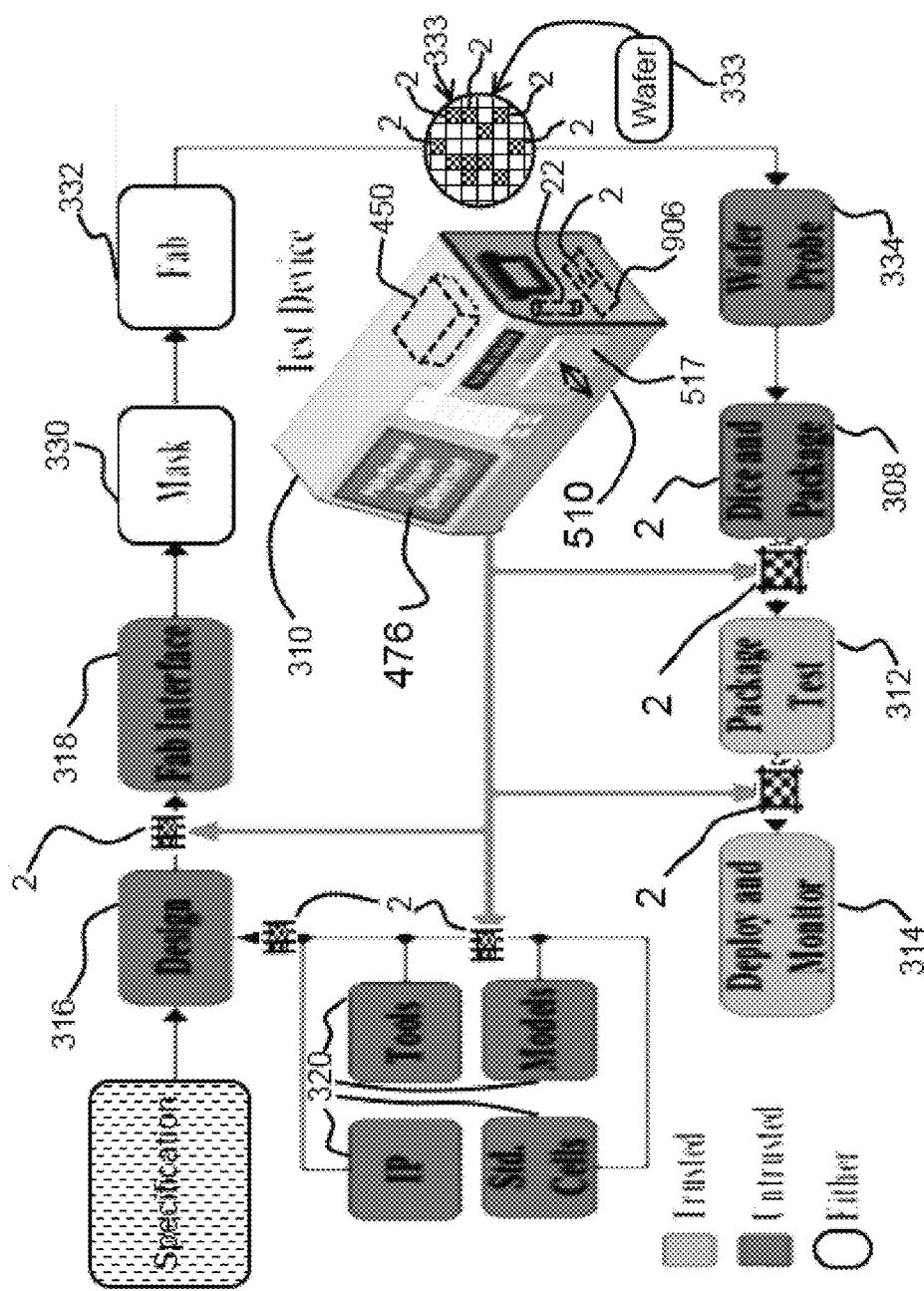
FIG. 3 shows selected possible screening points within the stages of an IC life cycle and an embodiment of the instant invention with a graphical display which may be typically used to test candidate ICs for undesired capabilities, undesired lack of capability, or operational features more generally.

Now in a particular reference to FIG. 3, therein is illustrated a system 310 of another exemplary embodiment directed towards a small manually operated device for testing typically individual isolated devices 2, for example such as wafers and/or dies, inside its enclosure 510, for example such as an RF shielded enclosure.

Malware presence can be detected on a wafer or die typically by providing test lines such as power, ground and clock to the appropriate pins and positioning an antenna 20 above it, typically in the near field distance. Alternatively, its unintended emissions may be coupled to the test lines and the emissions may be acquired from the test lines by coupling means such as capacitive coupling or a connected capacitor for spectrum signature analysis and determination by the system. These tests typically can be easily performed between steps 308 and 312 or between steps 312 and 314 in FIG. 3. It may be also possible to test for malware in the prototype stage between 316 and 318 on test parts programmed with firmware to be implemented in hardware in later steps.

Additionally, portions of the spectrum or the time varying nature may be modeled using 2-D or 3-D curve fitting linear or nonlinear extrapolation means such as Levenberg-Marquardt algorithm, Nonlinear regression, Probability distribution fitting, Smoothing, Total least squares, Overfitting and Curve-fitting compaction.

The antenna 20 or antenna array 22 may be also provided within the enclosure 510 having a drawer 517 connected to fixture(s) 906 that may be positionable within the enclosure 510 and being sized and shaped to receive the device 2 as well as being configured to stimulate the device 2 being tested into an operating state wherein unintended emissions are generated. In a further reference to FIG. 9, such device 2 may be a chip positionable within a socket 902.

Figure 8:
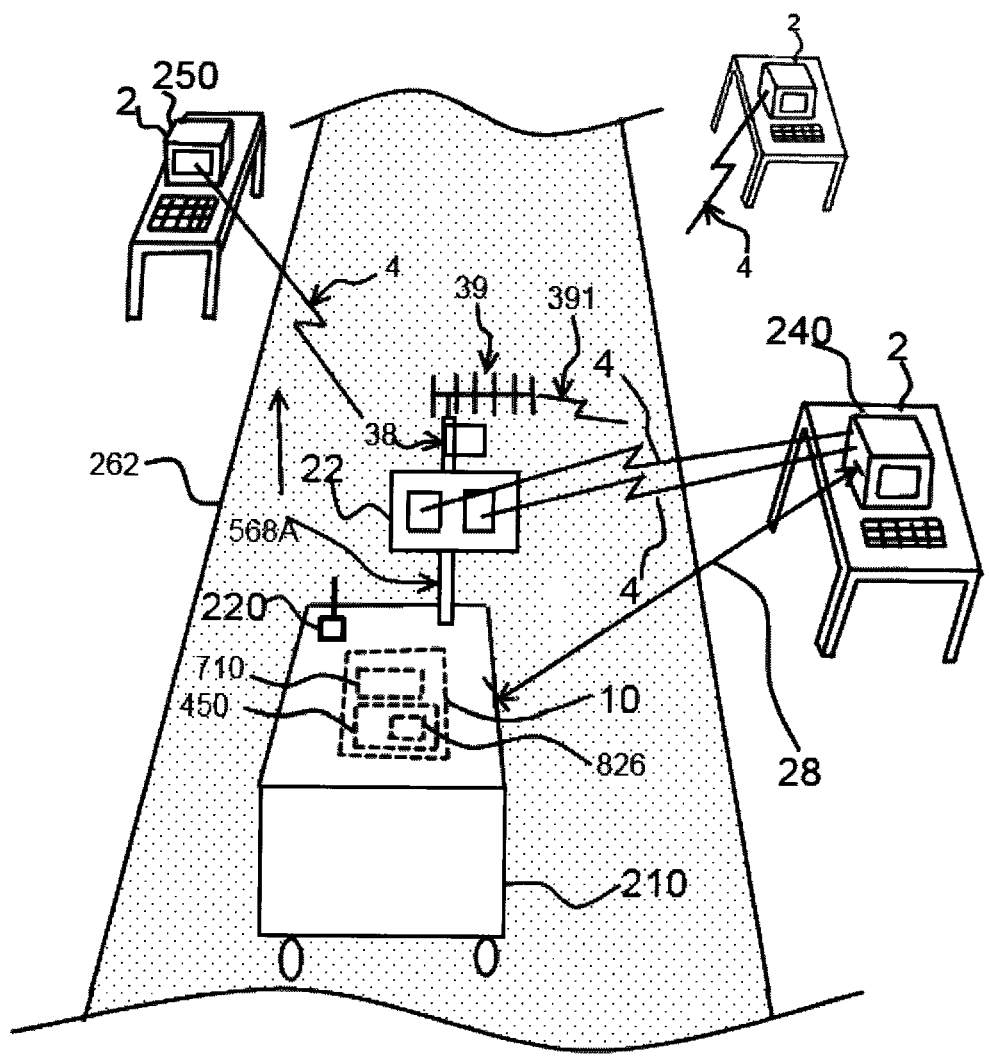
FIG. 8 illustrates a diagram of an exemplary autonomous mobile robot performing a malware search, containing a GPS and/or local-positioning termination system suitable for use in an office environment to move about an office building, while inside a floor of a building containing desk locations with computers running software to be evaluated as to being modified or unmodified.

Now in a particular reference to FIG. 8, therein is illustrated a system 210 of yet another exemplary embodiment provided as an autonomous mobile robot 210 directed towards testing devices 2 contained within operating systems, moving along path 262, especially suitable for finding software based malware and its location which is substantially within the receive range of the apparatus 210.

Figure 6:
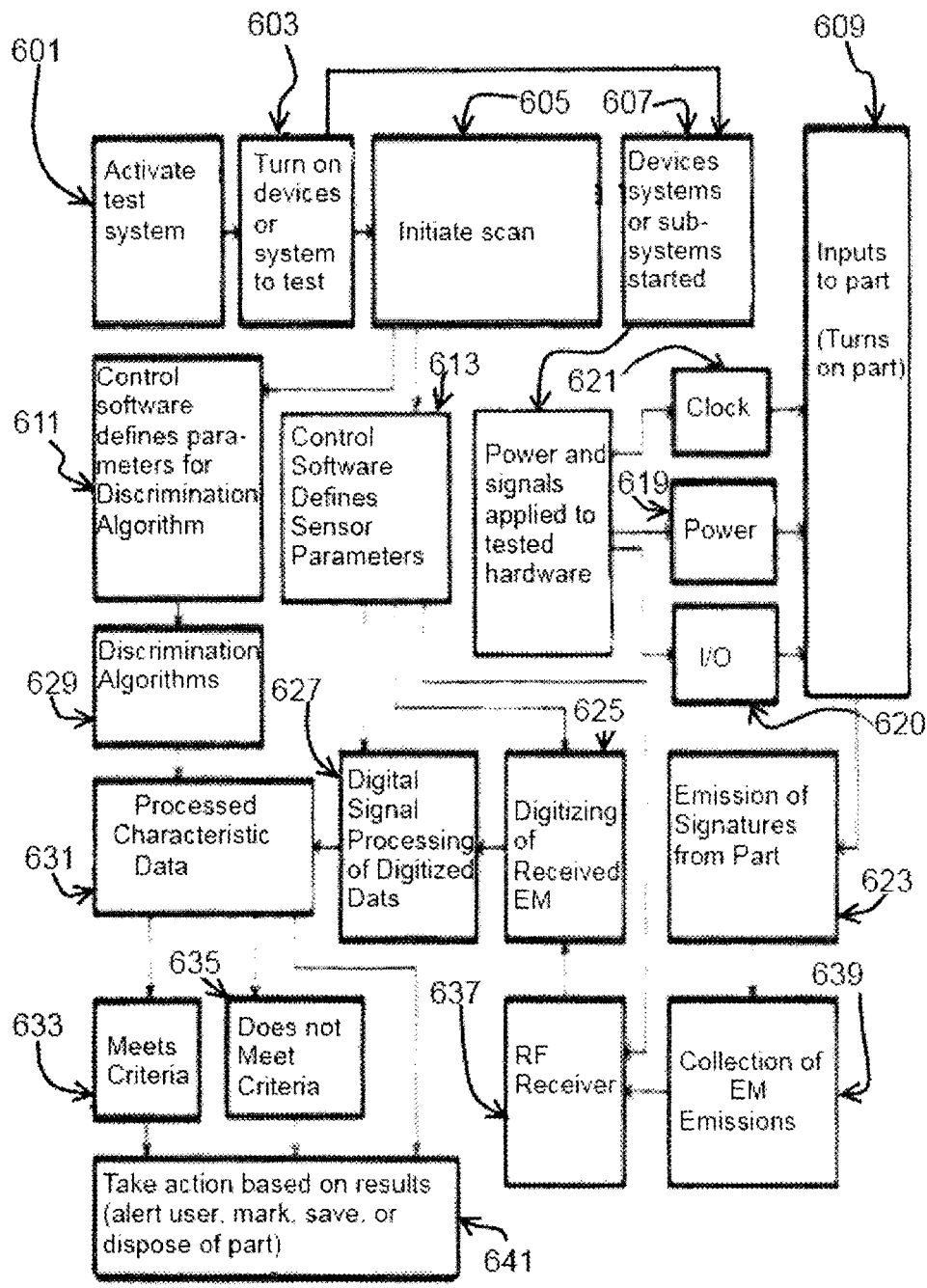
FIG. 6 illustrates a diagram of sequence of operation employed in the system of FIG. 1.

FIG. 6 shows the conceptual sequence of logical operations typically employed in test system 10.

Figure 19:
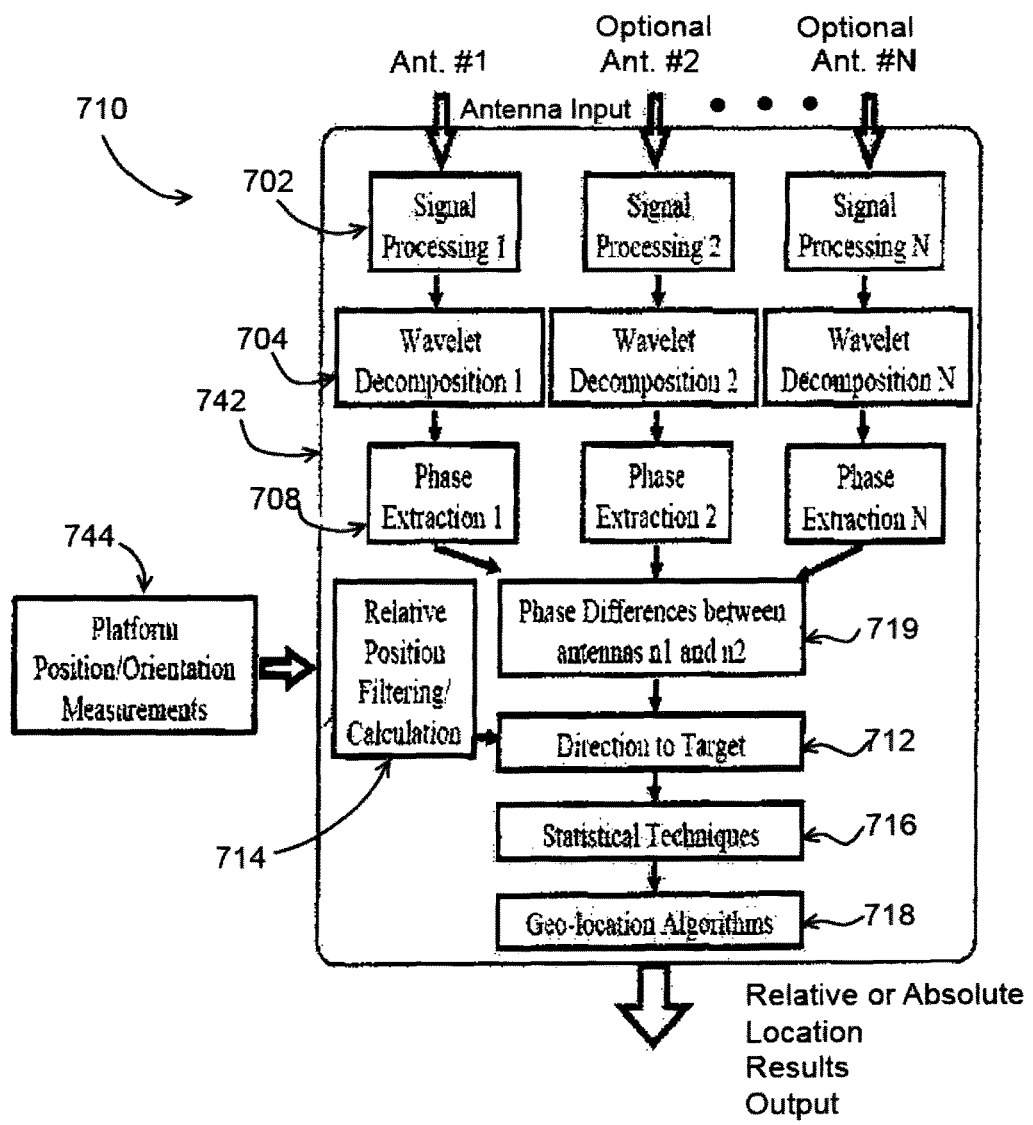
FIG. 19 illustrates a detailed RF emission geolocation hardware and software method which can be used in conjunction with the instant invention to physically locate a device or computer emitting unintended emissions indicating malware.

FIG. 19 shows a geolocation module 710 which can be employed by system 10, with an addition of the measurements from a remote platform or position in step 744, for determining physical location of the device 2, either when device 2 is one of many devices 2 located on a multi-socket, multi-device test fixture, or when device 2 is employed in pre-existing, pre-designed boards or components located as part of a sub-system deep within a fully operational system such as a personal computer. Device 2 may range from fully one-time programmable logic or ASIC to Field-programmable devices to 8-bit and 32-bit cpus with multiple processing cores to simple DRAM memory or Ram memory chips. Device 2 may be considered to be more than one component and may encompass multiple components on a Multi-Chip-Module (MCM), board, I/O device, sub-system or system, especially a small self-contained system such as a Raspberry Pi or LantroniX Xport Ethernet to serial converter with programmability and operating system. Device 2 may further represent other devices such as TFT displays or self-contained peripherals, and may easily extend to cell phones, watches, hearing aids and the like. Device 2 may be at least one of a wafer, a die, an electronic part, a circuit board, system, sub-system, and a circuit board assembly.

Further shown in FIG. 19 is an exemplary embodiment employing a multi-channel configuration from three different antennas with signal processing from each antenna occurring in step 702, wavelet decomposition in step 704 and phase extraction in phase 708. The phase differences are calculated in step 719 and direction to target is determined in step 712 through aid of relative position calculation in step 714. Statistical analysis techniques are used in step 716 for further processing by geolocation algorithms 718 to define relative or absolute location of the device 2. Thus, an exact placement of the malware containing device 2, for example on a circuit board assembly, can be detected.

Unintended radiated emissions from complex ICs, systems, subsystems, boards, peripherals, FPGAs or other electronic devices utilizing a clock source provides a means for detecting hardware Trojans in IP cores as any minute change to IC circuitry or program execution within IC circuitry necessarily and predictably affects their emission signature. Routine screening can be easily and fully automated to enable 100% screening for critical applications. The developed subject matter provides the ability to scan IP core for non-infection or as an initial test standard of comparison on a separate test platform prior to integration with a system under development, removing any possibility of contaminating sensitive systems. Full automation is accomplished via Data Acquisition, Signature Analysis, and Part Handling performed without operator intervention:

In the Data Acquisition phase the Signal processing of raw waveforms emitted from the known good or known infected operating device, system, subsystem or component under test is used to acquire frequency-domain data on which detection and assessment algorithms operate. The acquired frequency-domain data is then searched for characteristic patterns indicative of possible unique signatures associated with the software or software influenced hardware under test. The detection system may be performed in an automated mode.

In the Signature Analysis phase the Emission signature analysis is accomplished through algorithms that extract characteristic signature elements and examine them for indicators of malicious circuitry or executing modified or unmodified software's characteristics. Established algorithms for signature element extraction are active within the system.

In an exemplary embodiment where individual parts, ICs, components, subsystems or systems are tested, the Devices 2 programmed with the IP core to be screened are typically placed within the appropriate test fixture 906 and set inside an enclosure 510 so as to be subjected to at least one of screening, test, analysis, measurement and investigation. Automation of this stage for example is accomplished through integration of robotics that performs part handling.

Some exemplary embodiments allow routine screening of third party IP cores and can be used by test laboratories, SOC/VLSI/FPGA device developers as well as entities that integrate programmed devices into larger systems. Periodic scans of integrated devices can ensure that they have not been tampered with after deployment. By checking for hardware Trojans at multiple points in the supply and maintenance chain and performing appropriate actions, the risk posed by malicious circuitry or malware to critical systems is at least detected and can be further mitigated.

One exemplary embodiment provides a system capable of detecting means to modify DRAM memory contents by deliberately excessively accessing, reading or writing to those registers, adjacent register addresses or those nearby using techniques such as the Rowhammer exploit. The exemplary embodiment may be directed to detecting attempts at repetitive access to change bit contents or damage memory, detecting attempts to inject code which when ran will attempt to perform said exploit, detect successful exploit condition and detect use of exploit during system operation—all associated with the Rowhammer exploit. As the attempts typically occur on a repetitive basis, the instant invention could easily detect such attempts long before they become successful, by detecting emissions from the DRAM chip or related circuitry as the bit-wearing accesses are executed.

An important note is that unintended emissions are considered herein to be not only emissions unintendedly emitted by the device 2 or system contrary to the intent and objective of the device, system, or its designers, but also unintended properties of intended emissions of the device or system. Therefore, the intended digital data contained in an intended digital Wi-Fi transmission would not be considered Unintended, however other aspects of the intended signal such as harmonics, phase noise, frequency stability, out-of-band signal content, amplitude deviation, bit duration times, etc. would not be deliberately used by the system for information content to be conveyed to the user and hence be considered herein to also be unintended emissions.

It must be further noted that directly injected signals such as oscillating signals may be of sufficiently low level or selected frequency or frequencies to not affect the resulting logical digital operation of the device but enable and enhance the detection of hardware, firmware or software modifications, especially in subsystems whose operations are modified by changes in software, firmware or hardware. Thus subsystems for example which might only be briefly activated will emit more (in number of peaks and in dB peak height) characteristic emissions if they are also suitably injected with additional low level signals which couple and emit typically when the subsystem is activated.

From the sensor 820, the signature data will be sent to the one or more processors. One exemplary embodiment is related to direct analog analysis. Though direct analog analysis is a described embodiment, the analog to digital conversion by way fi the ADC 838 may be used to convert the analog output of the sensor 820 to digital output. The digital output is then sent to the controller or signal processing modules 450A and 450B. Several means of direct analog analysis are indicated including analog circuitry such as bandpass filters selecting known regions of emissions containing content associated with Malware and analog detector circuitry to create signals proportional to the degree of signal or signals at those specific frequencies. Other means include FIR or IIR filters applied to the digitized analog I and/or Q data and threshold signal strength trigger points indicating malware presence compared with result signal levels passed thru the filters, the result of trigger level comparison and result level creating a Malware presence yes/no digital signal which is sent to user output indication such as a LED lamp indicating red if a malware is detected and green if it is not, yellow if the results are borderline. Direct analog analysis may also examine the transmission amplitude envelopes of unintended emissions from a suspect device 2, preferably at an already filtered frequency, and compare such analog envelope pattern signature with expected analog envelope pattern signature from a known uninfected device.

Preferably, such antenna 22 is an antenna array positioned at a predetermined distance, at a predetermined location from the device 2. When the device 2 is a small discrete component or an integrated circuit, the antenna array 22 is positioned stationary relative to the device 2 under test. The elements of the antenna array 22 can be weighted via electronic steering to optimize the energy collected from certain parts of the part, circuit board, sub-system, system or larger item under test. In the case of a single component that is being tested no weighting is necessary or it could be weighted to enhance signature amplitude from the location of the component. In this exemplary embodiment, the antenna array 22 may provide a constructive interference of the antenna pattern of each antenna in the array 22 when the element is weighted to constructively enhance the gain on different areas of the board of interest to inspect individual parts on a board without the need for mechanical or robotic steering. When the device 2 is of a larger size, for example such as a printed circuit board assembly populated with electronic components, a single antenna element or much smaller number of elements integrated to the end of the robotic arm 32 are or a compact version of the antenna array 22 is positioned for movement, by way of an electronically controlled mechanical or robotic steering, over the surface of such printed circuit board or the printed circuit board is mounted for movement beneath the antenna array 22. It is further contemplated that a robotic system may contain a GPS or local positioning system acquiring its relative or absolute position and orientation in space to determine an relative or absolute position of the device being sought or evaluated and may simply move about a floor or building structure to search active PC systems or sub-systems for software verification purposes, or for malware specifically.

LNA 26 may be integrated into the antenna array 22. The advantage of integrating LNA 26 is in enhanced sensitivity of the entire system and enhanced level of the signatures given off by the device 2. The antenna 22 and LNA 26 may be mounted within an integrated circuit (IC) to perform electronically steered detection of software or hardware induced characteristics. To further enhance the emission signatures, the LNA 26 with a noise figure of less than one can be employed to better approach the theoretical room temperature sensitivity of the apparatus 10.

In another exemplary embodiment of FIG. 2, a compact antenna array 22 with integrated LNAs 26 or a single compact antenna that is approximately the size of the components one wishes to inspect on a board with a single element may be integrated onto a robotic arm 32 for inspection of the device(s) 2, including without limitations at least one of a wafer, a die, an electronic part, a circuit board, a circuit board assembly, a sub-system and a system, wherein the apparatus further comprising a probe 34 and an antenna located on a tip of the probe 32 and wherein the probe 34 is movable across the at least one of wafer, die, electronic part, circuit board, circuit board assembly, sub-system and system being in an electrically excited state.

It should be noted that antenna 34 may typically act as a near field probe, wherein the distance of the probe from the surface of the chip or die is sufficiently small to be in the near field of frequencies and wavelengths being examined. As such, the benefits and drawbacks of localization capabilities in the near-field can be employed in determining with greater specificity the physical location of a malware component within the device 2 being a chip, a die on wafer 333 or a stand-alone die, or the location of a malware containing chip or die on a Multi-chip-module, board or system under test relative to the probe 34. Further, the die or chip, for example a PLCC package chip, may be powered from the top or sides while the near field probe 34 is receiving unintended emissions from a location underneath the wafer 333.

One exemplary embodiment contemplates that the antenna array 22 and the apparatus 10 may be mounted on a semiconducting substrate or die, such as silicone material, and attached to the probe 34 of the robotic arm 32. A More detailed description of this semiconductor circuit is provided in the pending U.S. Ser. No. 13/410,909 filed on Mar. 2, 2012 and published as US Pub. 2012-0223403 A1 on Sep. 6, 2012 and entitled "INTEGRATED CIRCUIT WITH ELECTROMAGNETIC ENERGY ANOMALY DETECTION AND PROCESSING", whose teachings are incorporated by reference herewithin.

The predetermined distance 28 may depend partially on the desired success rate or certainty rate of detecting modified or unmodified device characteristics, the type of devices 2 being inspected or screened and the sensitivity of the antenna array 22 and the sensor 820.

In another exemplary embodiment, the antenna/LNA array tips RF probe 34 suitable for a robotic arm 32 may be interchangeable based on the performance parameters (for example RF gain vs frequency vs. isotropic or anisotropic performance) optimized or sought for the inspection of certain electronic devices or components. It is envisioned in some exemplary embodiments that near-field antenna coupling may be favorably selected over far-field coupling for some frequencies and characteristics of the device 2.

For the case of detecting electronics outright or identifying devices 2 at range most of the radiative energy components are attenuated to a level that makes them extremely challenging to detect. When the goal is to screen or inspect for modified or unmodified electronics, the detection apparatus can be placed at extremely close range to the components, boards or systems being tested. At least one exemplary embodiment focuses on that environment and the advantages of the extra information provided about the electronics being screened or inspected when in the near environment of the RF collection means. Accordingly, it is contemplated to position the end of the antenna array 22 between about one micrometer and about one centimeter from the surface of the device 2 in the exemplary embodiment 500 using RF probe 34. The sensitivity may be better than about −152 dBm. In the case of detecting software changes in a running system, the memory and address busses typically radiate at a stronger energy level. If the software containing malware is completely loaded into CPU chip cache, detection is more difficult and is best accomplished as the software is loaded from memory or is being swapped in or out.

Furthermore, in a reference to FIG. 8, at least one exemplary embodiment contemplates use of an active illumination source 38, for example such as an antenna 39, emitting emissions 391 configured to illuminate the device 2 that is at least one of detected, inspected or screened with free field RF energy to further enhance the emissions signature of the device 2 under test, inspection, examination, evaluation and/or screening.

In a further reference to FIG. 2, an automated mechanism 30 includes a robotic arm 32 and a general controller 342 configured to control movement of the robotic arm 32. The automated mechanism 30 may further include a sensor 34 for setting such predetermined distance 28, particularly, when components within the device 2, for example such as a printed circuit board assembly, have variable heights.

It is to be understood that such automated mechanism 30 for control of the robotic arm 32 used to position the means for collecting the RF energy may be provided as a stand alone system or may be incorporated into a manufacturing line (not shown) for a printed circuit board assembly or any apparatus that allows for at least one of input, output and power connections.

It is to be further understood that although the positioning of the antenna array 22 or a single element antenna 20 above the device 2 under test is depicted to be in the vertical direction other orientations and manipulations can be undertaken by the robotic arm to access difficult to reach spaces in fully assembled products or complex assemblies. In another embodiment, different orientation of the antenna array 22 may be utilized based on an assessment that the device 2 being inspected tends to radiate the RF energy being collected from that direction. It follows, based on the conventional wisdom in the art, other special orientations are also contemplated for a number of other test specific orientations.

Unlike conventional full electrical tests, some exemplary embodiments where the device 2 is tested on an isolated basis such as in the example of FIG. 2, is based on activating limited or baseline functionality of the device 2 in order to screen for and inspect for an modified or unmodified condition. In the case of circuit board, printed circuit board assembly or partially or fully assembled products, typically it is sufficient to provide power to the board. All of the inputs and outputs are not necessary, though clearly those skilled in the art would be aware that connecting all of the inputs and outputs might potentially serve to improve the statistical screening success. The circuit board in this state will undertake its basic functions and the sensor 820 is able to collect enough differentiable information from device 2 on the board to screen for emissions indicative of modifications or lack of modifications. If an entire partially or fully completed commercial board destined for a final commercial system containing one or more device 2 of the same or different design and function as other devices 2 on the board, is tested in variations of the apparatus in FIG. 2, the received unintended emissions would again enable discrimination regarding the modified or unmodified nature of any of the devices 2 or even modification detection of entire board features including trace configuration, board substrate composition, and passive components thereon, and if a specific component on the board is modified or unmodified, or any electronic property or feature of the board has been modified or is unmodified.

Now in a particular reference to FIGS. 5, 7 and 9, in the case of components/devices 2 being of an electronic type, that are intended to be later integrated into a circuit board or circuit board assembly prior to the board existing manufacturing line, one exemplary embodiment is directed to simply apply, as inputs, power signal 42 or 912 and ground input 46 or 908 to the component/device 2 so as to only electrically turn the component or board ON. Another exemplary embodiment is directed to only providing an oscillatory input 44 or 910, so as to energize clock input or output of the device 2 under test. The power signal 42 may be also combined with the oscillatory input 44 or 910. Such oscillatory input 44 or 910 may be a monotonic oscillating signal, but can be also provided as a multi-tone input, a modulating or modulated oscillating signal, a randomized signal or a complex signal originating from an arbitrary waveform generator. The use of multi-tone input injection aids in developing cross-modulated and intermodulated responses that translate into unique signatures for a modified versus unmodified devices. Furthermore, use of multi-tone injection aids in developing non-linear responses that translate into unique signatures for modified versus unmodified devices.

Figure 5:
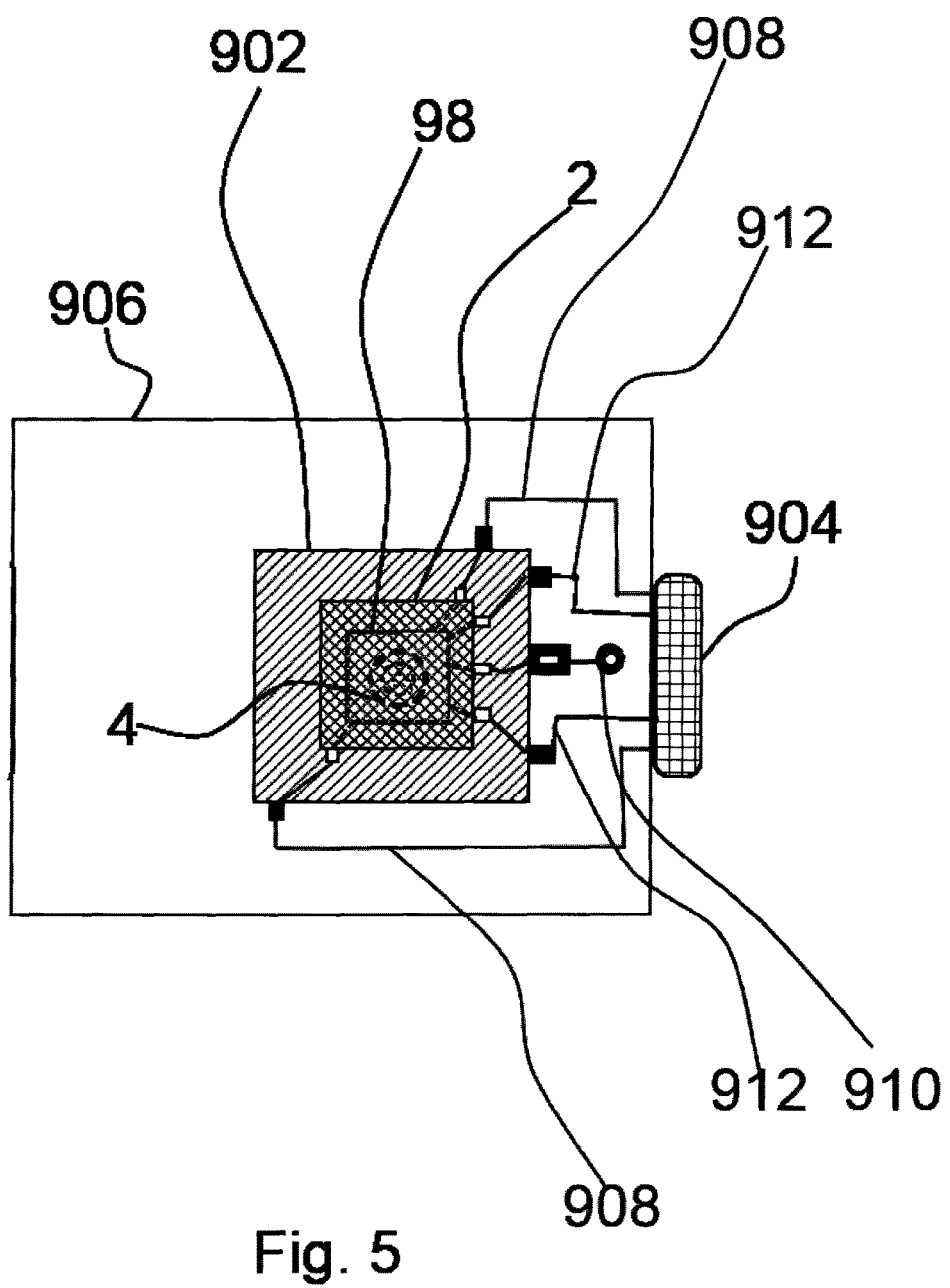
FIG. 5 illustrates a conceptual electrical diagram of the physical test fixture shown in FIG. 9.
Figure 7:
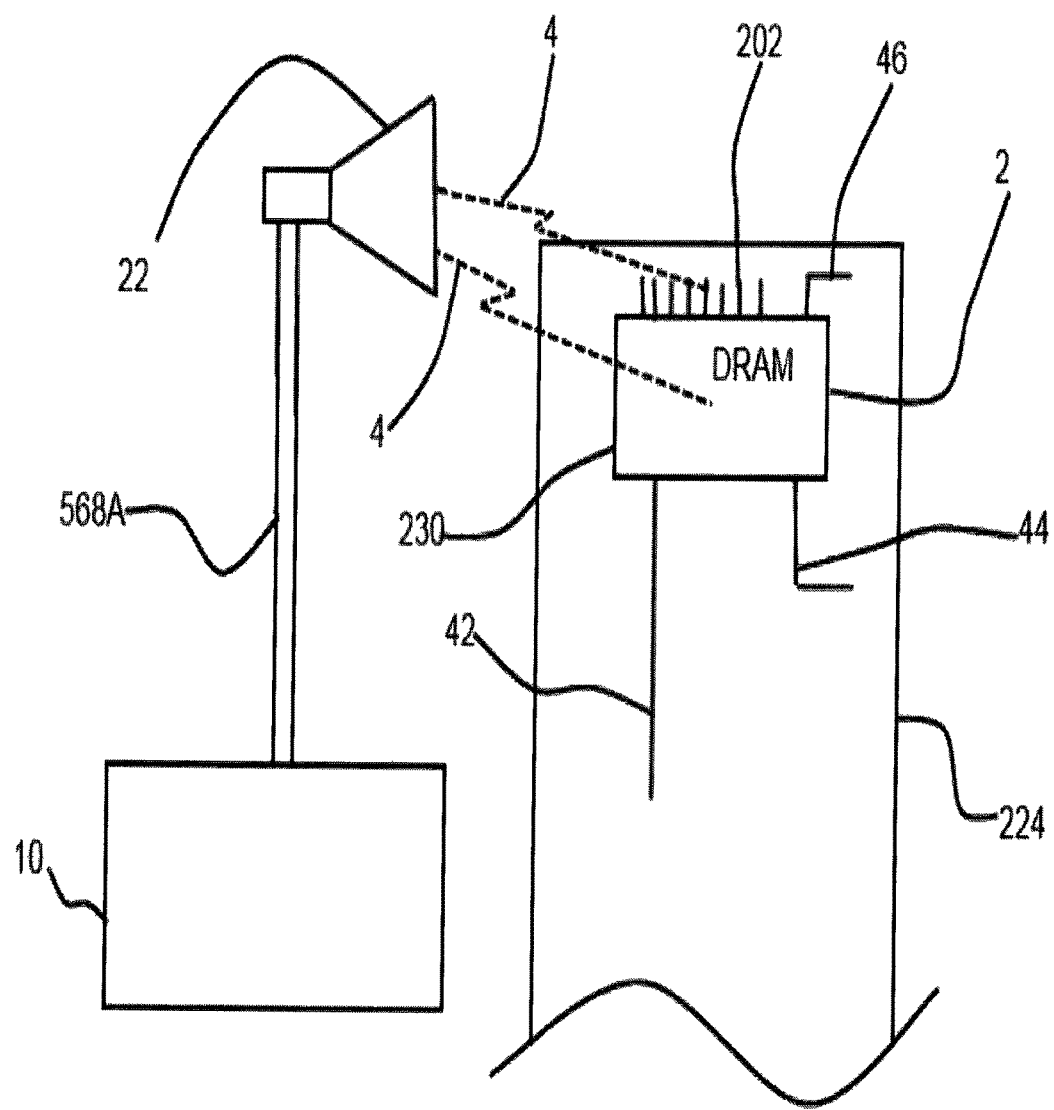
FIG. 7 illustrates a diagram of a DRAM chip on a PCB emitting unintended emissions which are received by a horn antenna with integrated LNA and then sent to the examining system

The computer-implemented method of energizing the device 2 with a power signal 42 or 912 and oscillator signal 44 or 910 in the exemplary embodiments of FIGS. 5, 7 and 9 applies to semiconductor devices, integrated circuits (IC), board level devices such as surface mount or through whole parts, sub-boards or daughter boards, entire circuits boards, assemblies of multiple boards or even whole products. It is also contemplated that power signal 42 or 912 may be provided to power the device 2 as a baseline and a single simple monotonic oscillatory signal 44 or 910 may be provided to energize basic functions of the device 2 that will then, when active, create electromagnetic emissions for capture by the sensor 820 and antenna array 22 or individual antenna 20 positioned in the near vicinity to the device 2 and analyzed against an expected standard or baseline characteristics of a modified or unmodified part, as needed. Or, the sensor 820 may be directly and electrically coupled to the device 2 so as to directly receive conducted energy from the device 2 without the use of the antenna 20 or the antenna array 22.

In an example of the device 2 being the IC part, and not necessarily a complete running system, the power input 42 04 412 and ground 46 04 908 will turn the IC ON and the oscillating signal 44 or 910 will enable internal circuitry by providing an oscillatory input into a pin or port on an IC specification sheet that is often referred to as a clock input or Clock In, but would not cause more complex operation of the IC, since no other inputs are being energized. Another example would be providing the oscillatory input only signal, communications or secondary clock inputs with the primary focus on energizing the underlying circuitry of the IC.

The oscillator input source may be termed as crystal oscillator, ceramic oscillator, oscillator, time standard, signal, signal generator, frequency reference or other similar terms in that are typical in the art. Although each of these sources may have differences when analyzed in detail, each of them fundamentally provides a mechanism to provide an oscillatory input to the device 2.

It has been found that the manner in which the semiconductor responds is dependent on the quality of the oscillator input 44 or 910 that is used to drive either the clock inputs or the power and ground signal inputs of the semiconductor device 2.

It has been also found that temperature compensated Crystal Oscillator (TCXO), microcomputer compensated Crystal Oscillators (MXCO), Oven Controlled Crystal Oscillator (OCXO), small atomic frequency standards (Cesium (Cs) or Rubidium (Rb) and Rubidium oscillators (RbXO)), and high performance atomic standards such as Cesium all provide accuracy in excess of $10^{-4}$. In one example, the precision of the oscillating signal 44 or 910 exceeds $10^{-8}$, and the source is a small atomic frequency standard oscillator. Thus, the oscillator signal source is hereafter sometimes referred to as a "high precision signal source" and the oscillator signal 44 or 910 is hereafter sometimes referred to as "high precision oscillator signal". The high precision signal may further have a frequency thereof being consistent with input requirements of the device 2. A Cesium standard is optimally indicated if the needed RBW is in the 0.01 Hz to 0.001 Hz range, especially if the frequencies examined are in the 500 MHz to 1500 MHz range.

In some exemplary embodiments, the oscillator source described above needs only be used for the clock input 44 or 910 to the device 2. Though more spectrally rich emissions can be derived by adding modulations or complex timings to the manner in which the device is driven, the presently preferred embodiment limits complexity to only energizing the device input such as the clock or other signal input and creating an emissions pattern that provides information as to whether the condition of the device 2 is modified or unmodified.

Another exemplary embodiment provides for allowing the oscillator source to sweep over a frequency band while providing a means to measure the emissions of the device 2 simultaneously. In one example, the frequency sweep occurs continuously. In another example a discretized sweep where only certain predetermined discrete frequencies over the band of interest are swept. The frequency swept over may typically depend on the anticipated inputs and/or device specifications of the device 2 under test. In some cases it may suffice to sweep over several Hz, others KHz of bandwidth, others MHz of bandwidth and others GHz of bandwidth. Any of these ranges can be covered, but for cost concerns the bandwidth is typically limited to ranges that are effective, but not exhaustive. It is clearly contemplated that any of these bandwidth intervals could be used and anticipated.

In addition, at least one exemplary embodiment contemplates occasional, sporadic, periodic, or continuous energizing of inputs outside of the engineering, designed, calculated or specified range specific to the device 2 being driven in devices 2 where it has been experimentally determined to be more optimally effective to do so. In one example, a test time may typically be reduced if higher voltage or frequency input than the maximum specified by the manufacturer is introduced into the device 2 under test. The test time may be reduced because fewer total signature regions may be needed to determine a result to the required degree of certainty. In another example, RBW dwell times sufficient for emission discrimination may be usefully reduced using the introduction of higher frequencies than specified by the manufacturer, also reducing total test time. In this example, the modified or unmodified device 2 may also have been developed to have a wider input range and engineering tolerance or safety factor than actually specified to provide a more robust part whereas the modified or unmodified part may not have that capability. In either example, responses such as non-linear responses that differ between the parts are readily translated to be received by the sensor 820. It may be further determined that any loss in RUL of a specific device 2, due to testing, may be mitigated by the testing efficiency gains derived. In yet another example, testing protocol is incorporated deliberately and specifically outside of engineering, designed, calculated or specified limits to test the device 2 and a testing is further configured to determine RUL of the device 2 after the test completion to ensure lifetime longevity in the system destined to incorporate the tested device 2. Thus, all resulting losses of RUL due to these more extreme tests may be continually and statistically monitored and the overvoltage, overfrequency or other excesses both in the devices' deliberately established test environment (such as temperature level, using a temperature controlled heater within an integrated antenna enclosure 510) may be dynamically modified and applied into the device 2, over an ongoing statistical test sample with adjustment for changes in the RUL. Such dynamic adjustments may be based on weighing economic factors of device 2 cost and rejection of the device 2, as suitable for use after testing or inspection due to insufficient RUL remaining even with a probability of missing the device 2 containing malware or probability of increased unexpected early failure and overall target system maintenance, repair, replacement, or target system failure costs while operating in critically important activities.

In another example, amplitude of oscillator input(s) may be altered so as to be applied to device inputs such as clock inputs, signal inputs and other then expected outputs and inputs that may have been defined by the manufacturer of the device 2. This includes testing at lower than specified oscillator peak-to-peak range.

In another example, the amplitude may be not only altered, but modulation as well.

In addition to energizing inputs to the device 2, outputs of the device 2 may be also energized. Driving the outputs may create device architecture responses. By way of one example only, a unmodified part, boar, or a multi-chip module might have filtering or Electrostatic Discharge (ESD) protection in the device that a modified or Malware containing device 2 does not have. The modified device 2 may "light up like a Christmas tree" in the RF spectrum when some standard protection is not included in the circuits by an agent of modification.

In a further reference to FIGS. 7 and 9, when the device 2 is not a running system but a printed circuit board, printed circuit board assembly or any larger device, at least one exemplary embodiment contemplates simply connecting power input 42 or 912 and ground 46 or 908 to the device 2 without the need to drive any of the other inputs or outputs of the device. The use of power input 42 or 912 and oscillator input 44 or 910 to respective inputs (or outputs) of such device 2 are also contemplated. For smaller components, such as discrete semiconductors, integrated circuits and the like, a test fixture 902 provides a means for transferring such input 42 or 912 and 44 or 910 to the device 2. For example, such test fixture 902 may be a zero insertion force socket configured to receive such device 2 and preconfigured to apply such input 42 or 912 and 44 or 910 thereto. In another example, the test fixture 902 may be any specialized apparatus that facilitates an effective manner or applying power to the power pin and an oscillating signal to other desired inputs (or outputs). Grounds are also typically connected as well. Or the test fixture 902 may simply provide two surface level contacts and means for temporarily securing the device 2 positioned thereon. For example, such temporarily securing means may be a vacuum generating device positioned below the surface of the test fixture 902, or above it in the condition of an upside down part. Specifically, the device 2 may provide a Ball Grid Array (BGA) interconnect means and its placement in an upside down manner enables access to the BGA pins from above, said device 2 being securely held to contact the test fixture's exposed pins dedicated for connection to the BGA by vacuum means.

Figure 4:
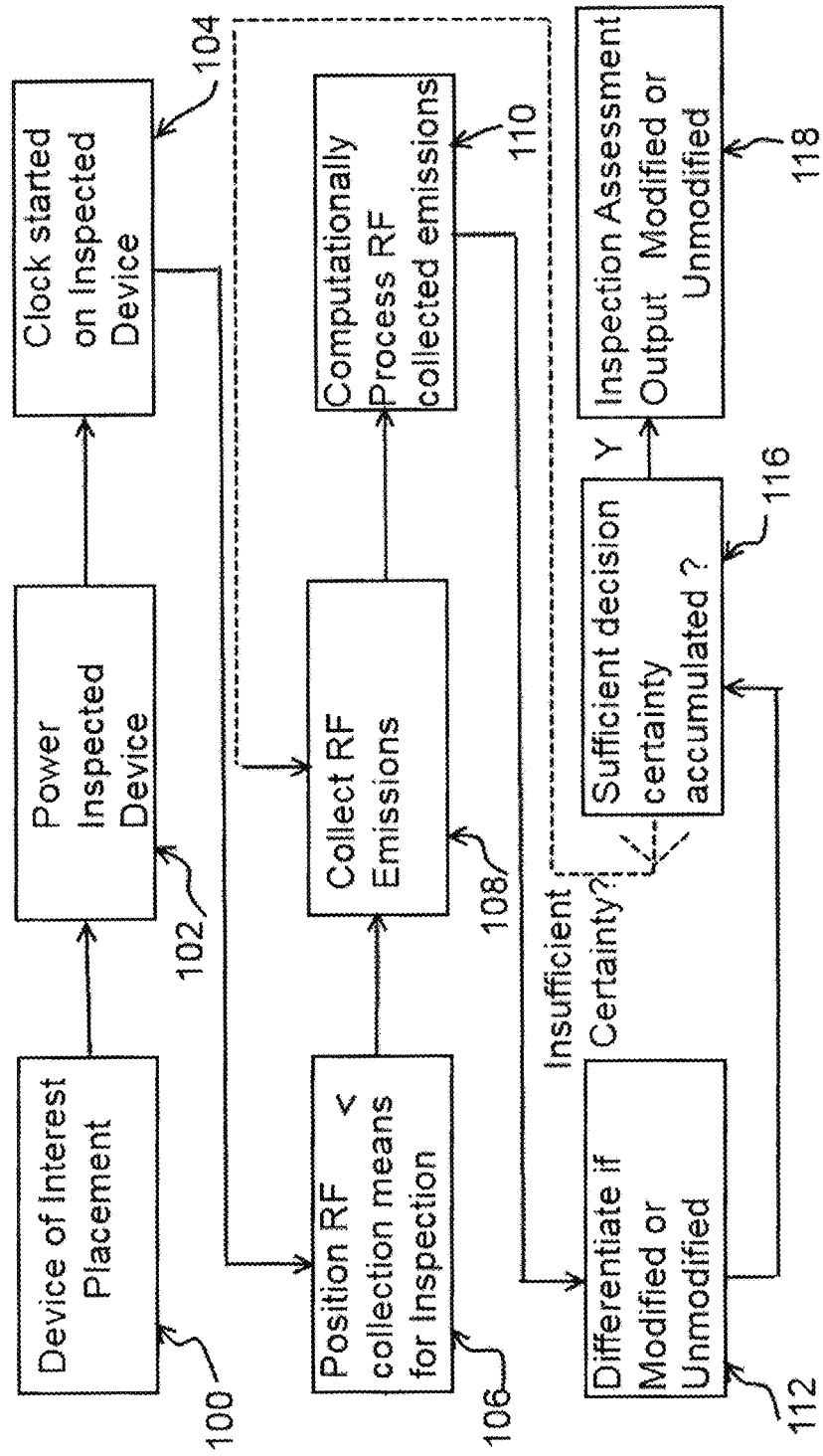
FIG. 4 illustrates a flow chart of an exemplary method for inspecting or screening electrical or electronic devices, subsystems or systems.

Now in reference to FIG. 4, a computer-implemented method of inspecting or screening for modified or unmodified electronic or electrical device 2 and not a screening a complete previously started running system starts with powering the device 2 at the step 1102 and inputting an oscillating signal at step 1104. Then, the apparatus 10 is positioned in step 1106 and is operable to collect RF emissions from the device 2 injected with power signal 42 or 912 and oscillating signal 44 or 910. Although, the apparatus 10 may be positioned in an earlier step. Captured or collected RF emissions are computationally processed at step 1110 which includes the step of comparing and matching signature of collected RF emissions 4 with RF emission signature characteristics for a modified or unmodified device 2 determine by various methods, for example sampling of plurality of devices 2, manufacturing specifications and the like methods. Spectrum features whose metrics may be incorporated into the signature include skewness 162, noise floor 164, frequency location and magnitude 166 and phase noise 168, best shown in FIG. 11. Specifically, the dB levels of the noise floor, the Hz width span of the phase noise, the % asymmetry of skewness or MHz location of the peak are usefully quantifiable.

It is contemplated to use various automated algorithms within the step 1110. The step 1110 may include the step of obtaining discrete wavelet transform coefficient statistics or the step of obtaining relative phase measurement and comparing obtained phase measurement to anticipated phase measurements. The step 1110 may also include the step of using at least one of a clustering algorithm a Hierarchical Agglomerative Clustering (HAC) algorithm.

FIG. 4 may be considered as illustrating a simplified embodiment of the apparatus embodiments shown in FIGS. 1, 2, 3, 6, 8, and 17 as may be seen from a viewpoint of a technician, user, purchaser or operator, containing only the key conceptual elements of at least some exemplary embodiments.

The Wavelet transform is a multi-resolution analysis technique employed to obtain the time-frequency representation of an analyzed emission. It is an alternate basis function to the Fourier Transform and is based on the expansion of the incoming signal in terms of a function, called mother wavelet, which is translated and dilated in time. From the computational point of view, the Discrete Wavelet Transform (DWT) analyzes the signal by decomposing it into its 'approximate' and 'detail' information, which is accomplished by using successive low-pass and high-pass filtering operations respectively. Alternatively or in addition, the wavelet transform can be used to de-noise a signal by reconstructing a DWT deconstructed signal but reducing or zeroing the detail coefficient data before reconstruction.

The high-pass 'detail' coefficient outputs of these multiple decompositions as features in signal classification have been found advantageous for use herewithin. DWT has been found beneficial for classifying near-identical device emissions based on a measure of skewness obtained by applying the Wavelet Transform on frequency domain information. DWT analysis may be applied on the frequency domain emission of each emission. Average energy at each of the different detail-coefficient scales is computed and each resulting value shall be retained for use in classification. DWT analysis can also be applied on the time domain emission such as in Time Domain Data Processing element 450B, typically in analyzing very broadband emissions originating from logic level transitions within the device 2. The phase information of identified emissions is used to provide a particularly sensitive assessment of circuit modification. Signal phase (and, in turn, emission phase) is easily modified through slight variations in either distributed or localized impedance within a given circuit. Phase information is therefore highly relevant when seeking to identify subtle circuit changes. Further, phase information can be used to identify associated higher harmonics and verify signature features at higher harmonics are associated with lower harmonics.

Figure 20:
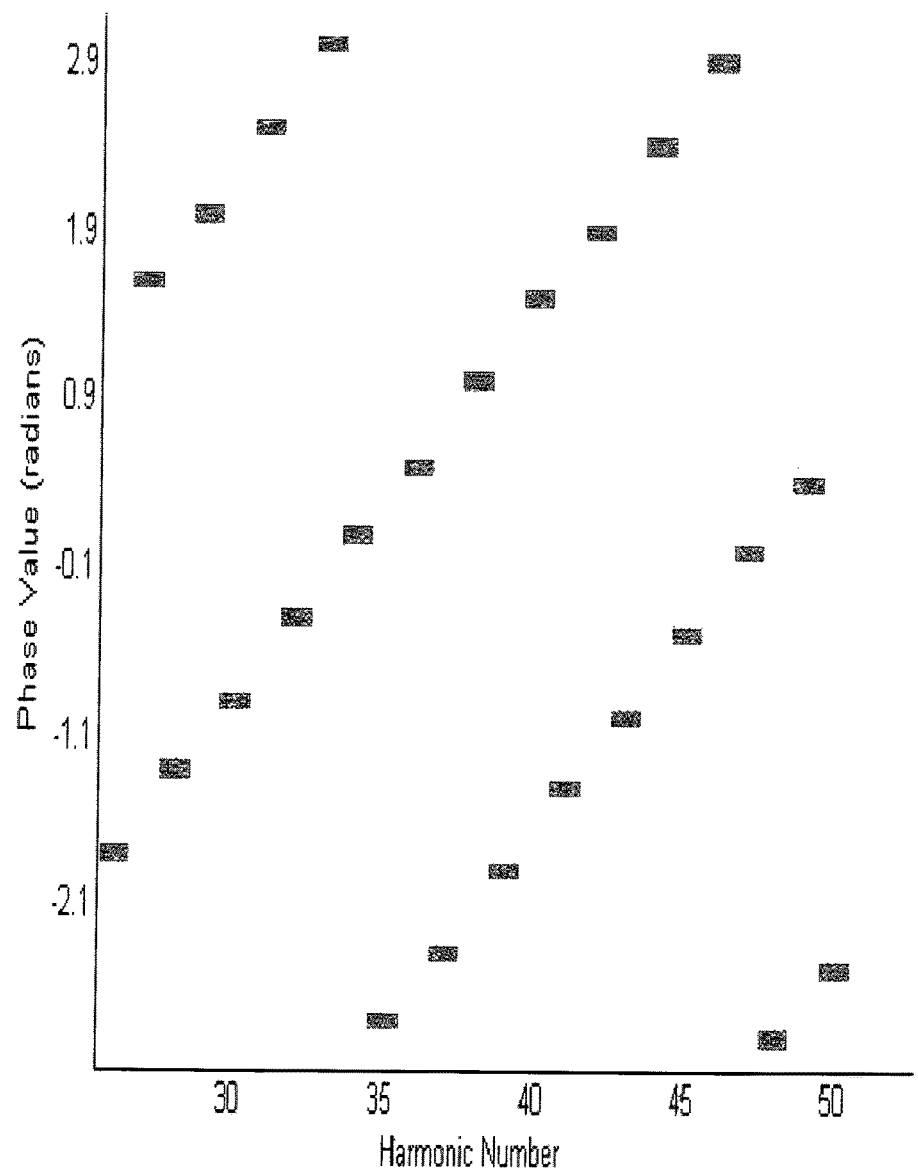
FIG. 20 illustrates a chart of Phase-Harmonic relationships illustrating relationships of separate peaks at separate harmonic frequencies which can be used to create more accurate, more discriminating, and more detailed emission signatures for more accurate comparison with known good or bad emission signatures.

Now in reference to FIG. 20 illustrating exemplary harmonic relationships and associated phase values, and in a relative phase measurement algorithm, phase measurements may be performed on each emission relative to another (or several other) emissions, due to the lack of a known reference. Any set of static frequency emissions are necessarily repetitive within a time-domain envelope and, therefore, contain a repetitive phase relation at a certain point within this envelope, which for example is named as the reference time $t_{ref}$. If a measurement of the signals is made at some other time, $t_M$, during the repetitive envelope, the phases at $t_M$ will not usually appear to correspond in any obvious way to those of $t_{ref}$ due to the time difference $t_{ref}-t_M$. The identification of $t_{ref}$ from a measurement made at $t_M$ allows a shift of the time reference back to $t_{ref}$ and, in turn, an alignment of the phases such that a single, repeatable measure of relative phase relation may be taken.

Nominally, harmonics are expected to have a relative phase measurement of 0 degrees, while inter-modulation components are expected to have relative phase measurements of either 0 degrees or 180 degrees. Precise phase relationship of harmonics and inter-modulation components often varies from these nominal expectations and may be effectively used to characterize circuitry. The deviation in relative phase from the nominal value is attributed to the small changes in circuit reactance at the varying frequencies of the analyzed harmonics.

Some computer-implemented methods rely on frequency domain phase detrending, which generally has drawbacks in the computational ambiguities associated with the modulo 2 pi calculations. Other computer-implemented methods rely on the use of a reference signal to establish a precise reference time off of which to measure. Given these drawbacks, neither of these approaches is an optimal methodology for emission measurement. However, when the relationship is known a priori (that is, if the signals are harmonics –0.degree. shifts—or inter-modulation components –0.degree. or 180.degree. shifts), one may minimize a function of the difference in phase on each signal from the expected values using a single time delay offset as the independent variable. This approach, taken by the inventors provides the framework to analyze the phases of harmonic and inter-modulation emission content for variations between known good devices 2 and suspect devices which may contain Malware.

Typically, each of the emission patterns identified as belonging to a harmonic or inter-modulation relationship is assessed to determine precise relative phase measures. It has been found that ANN algorithm excels in learning trends occurring in large databases, combining information in a manner optimized to either classify or function fit. This is applied in many exemplary embodiments to both analyses acquired data from many known good and known malware-containing devices to generate weighting coefficients applied to the equations generating a final score based on combining the individual scoring results from signature comparisons between known good and not-yet-decided candidate devices 2 and dynamically in determining degree of match as the system is used.

There may be several desirable aspects to neural network-driven data analysis. The RF emission data contains a rich and diverse set of characteristic signatures for persistent monitoring and diagnosis. To achieve the most sensitive, accurate and reliable results, as much of this information as possible is included in the analysis. However, the fact that the phenomenology of RF emissions consists of a combination of broadband and narrowband characteristics makes it difficult to determine a robust processing technique appropriate to the task. ANN's are highly skilled at combining large or diverse information into easily understood quantities. Additionally, simply providing automated neural networks (ANN) with useful data and instructions pertaining to the desired categorization obtains solutions to complex problems. This feature allows the use of multiple RF techniques in conjunction, utilizing all relevant information to ultimately distinguish one unique signature set from good devices 2 from another signature set originating in malware infected devices 2.

In a further reference to FIG. 4, at step 1112, the computationally processed RF emissions are discerned to determine condition of a modified or unmodified device 2. If required, the frequency setting of the oscillating signal may be changed in step 1114 and steps 1104 through 1112 are repeated. Each measured response is stored at step 1116 and the responses are compared with each other to improve inspection for modification or non-modification. The frequency change may be associated with different frequency amplitude settings and/or different relative phases between two or more signals. When at least two inputs are injected with the oscillating input 44 or 910, the captured or collected RF emission data for each input is compared individually against the expected signature and injection into all inputs simultaneously. Alternatively, if insufficient certainty remains, the sequence starting at step 1108 may be iteratively performed until a greater combined certainty is calculated. For example, if a certainty level of 80% is required, multiple iterative reexaminations all resulting in certainty around 80% would quickly increase the aggregate certainty to above a 95% level, which may be the threshold needed for part acceptance, prompting tested part to be categorized appropriately and the next part to be examined.

Finally, at step 1118, an assessment of the condition of the device 2 is made so as to discern between modified and unmodified device 2. The step 1118 of determining the modified or unmodified device 2 typically includes the step of analyzing at least one of frequency locations of emissions components, phases of emissions, cross-modulation and inter-modulation components generated by the internal circuitry, shape of any individual emission, quality factors of any individual emissions or timing characteristics of emissions.

Figure 11:
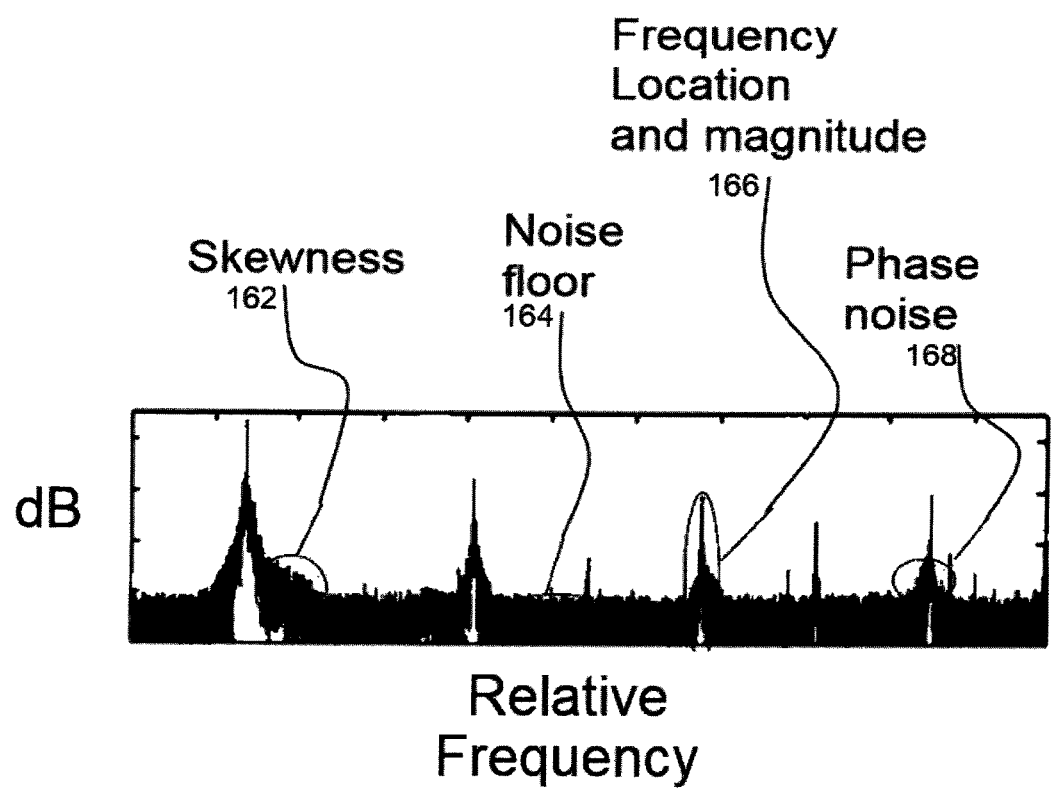
FIG. 11 shows exemplary spectra signature properties which can be measured and used for signature comparison purposes.

The computer-implemented method of inspecting, evaluating, testing or screening for modified or unmodified device 2 may further include the step of establishing the baseline RF characteristics representative of the modified device 2. Such step of establishing the baseline RF characteristics includes the step of large scale comparison of spectral emissions and the step of reducing the large scale comparison to narrowband comparisons and outputting after comparison and further reduction a single scalar value based on the quality of the comparison match. The step of establishing the baseline RF characteristics may also include the step of obtaining local spectral power density statistics, wherein plurality of semiconductors are sampled and discriminated based on localized statistical feature measured on each of emissions common between sampled devices. The statistical features include at least one of Emission Frequency Location, Emission Peak Magnitude, Emission Phase Noise, Emission Symmetry, Skewness, and Emission Local Noise Floor, as best shown in FIG. 11. When possible, if known Malware samples are available and are expected as a potential problem to be discerned within candidate parts, the creation of a device 2 with known Malware is used or deliberately created and emissions taken and processed in a similar manner as above to more easily categorize the differences in the signatures between the infected and uninfected.

In one exemplary embodiment therein is provided the necessary steps and specifics to simultaneously apply power and one or more than one oscillatory input and simultaneously measuring the RF emitted by the device 2 under these conditions whether that emission 4 be conducted or radiated to detect, screen, identify and inspect for modified or unmodified electronics.

In one exemplary embodiment the intended or unintended RF emissions 4 are used to characterize devices at the die or substrate level. The introduction of free field EM field strengths at select frequencies where the device is measured to be emitting, will amplify and/or alter the Unintended radiation characteristics of the device. There is further contemplated an exemplary embodiment wherein an active illuminating source is used to enhance the emissions collected by the RF collection means. In this case the power to the device being applied is applied via the test fixture and the RF collection means collects the emitted energy. During this collection the free-field illumination source is turned on to energize the circuit. Another exemplary embodiment encompasses the application of power and the oscillating signal via physical connection to the device being tested while the free field illumination is carried out and the RF collection apparatus collects the emitted energy. In this embodiment the illumination source may illuminate using single frequency monotonic, multi-tone or complex modulated RF energy.

The introduction of EM field strengths via the illumination source at select frequencies may amplify and/or alter the unintended radiation characteristics of the device. Amplification of the RF emission signature may improve the ability to detect, inspect or screen modified or unmodified electronics. This enhancement is conceptually similar to the modulation of the device 2 inputs or outputs by direct connection of modulated power signals or I/O signals to the device.

The illumination field strengths necessary to cause the described responses may not need be so robust. Lower field strengths in some cases may enhance the emissions collected substantially. For example, oscillator instabilities at low field strengths can significantly alter the emission signature of such devices and aid in the location of the device. Excessive field strengths may undesirably completely suppress such oscillators.

In a further reference to FIG. 8, therein is illustrated another exemplary embodiment providing an autonomous mobile robot 210 containing a GPS and/or local-positioning determination system 220 suitable for example in use in an office environment to move about an office building, to acquire the unintended emissions from devices 2, such for example as computers, located in the vicinity, as well as the distance and direction of the unintended emissions. Further, the autonomous mobile robot 210 contains the above described apparatus 10, for differentiating between an improper-software infected and uninfected condition or modified or unmodified software bearing device of an electrically powered device 2. The autonomous mobile robot 210 then knowing its position from the GPS and/or local-positioning determination system 220 can examine the device(s) 2 located at locations 240 and/or 250, and using the previously taught computer-implemented methods determine if the device located at location 240 or 250 has modified or unmodified software, and further determine the physical location 240 and/or 250 containing those software characteristics using either simple trigonometric means or a method as illustrated in FIG. 17B starting with implementing emissions template in step 870, collecting/capturing the spectral data by the sensor 450 in step 872, comparing spectral data to template instep 874, detecting and even identifying device 2 in step 876, physically locating device 2 in step 878 and optionally storing or sending the obtained information in step 880.

Relevant regions are regions which show significant changes in spectral features such as changes to those features shown in FIG. 11 appearing in a region of spectrum being emitted from the device 2.

Figure 15:
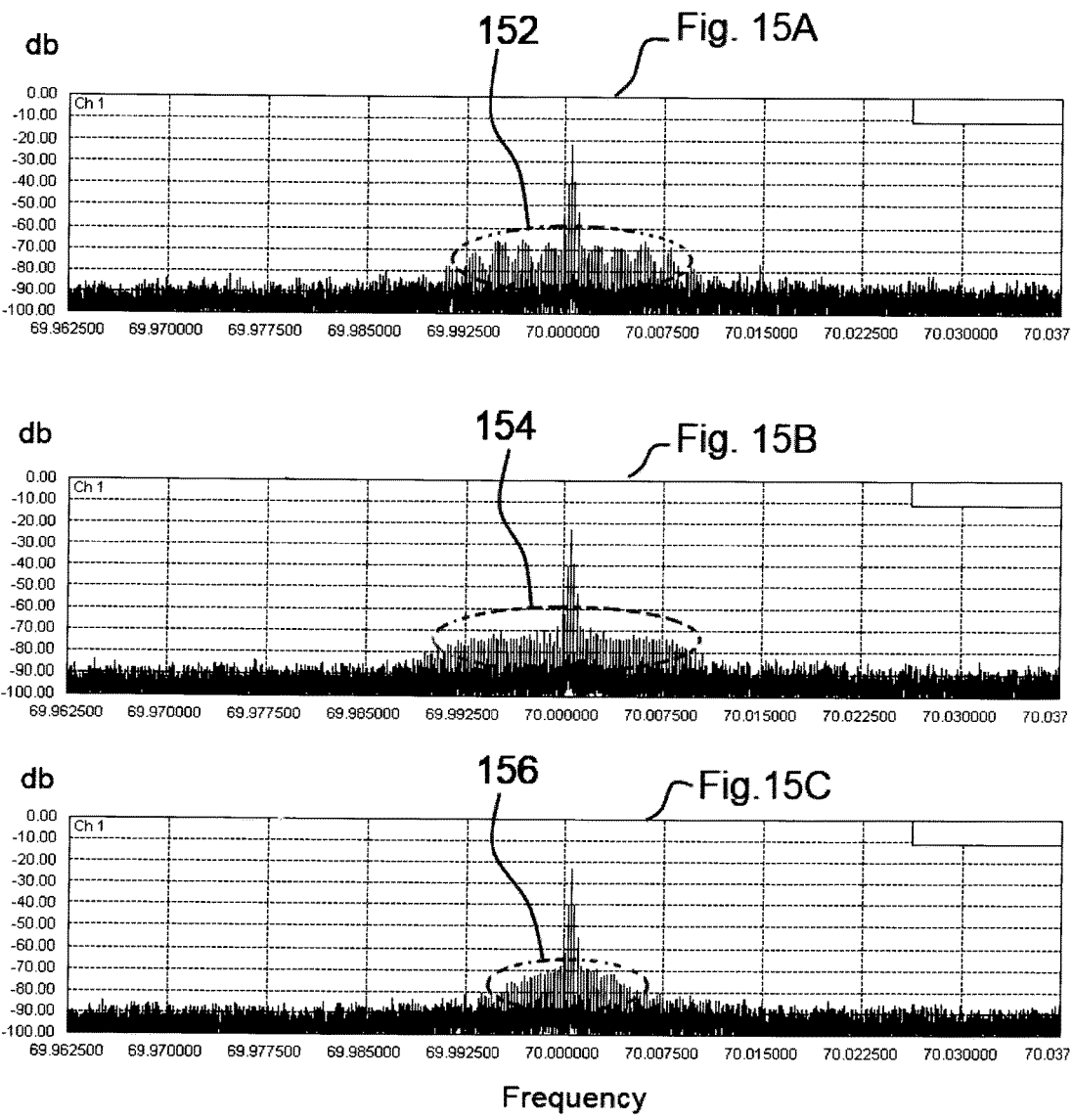
FIGS. 15A-15C illustrate exemplary spectra of a modified software emission at 2 separate stages in its software execution and also an unmodified software emission from the same electrical device.

A typical key measurable difference in the spectrum signature from a software malware or firmware malware may be a time sample sequence containing changing height of peaks within identified relevant regions or the location, addition or subtraction of peaks from relevant regions when compared with a known good exemplary part, changes in absolute and/or relative frequency positions of signature elements, addition or subtraction of the total emitted energy of a spectral feature and modification of the emitted energy distribution and information content as seen in FIGS. 15A-15C.

Specifically, FIGS. 15A-15C show only one of an exemplary spectrum emitted from specific hardware containing an unmodified software 152 and modified software 154, wherein the software considered in this instance may be the unmodified software 152, as the unmodified software 152 contains the malware which was later removed by typical means such as using an automatic update from the software vendor. Further, a later exemplary execution point pattern of the modified software is seen in spectrum 156 of FIG. 15C. Different software execution segments containing different code and/or executing under a different software state or using different variables will typically emit different spectra across a wide range of frequencies. A more and more detailed and comprehensive (multiple separate spectral regions with characteristic features) acquisition and examination of these spectra can create more unique signatures to identify with more discrimination. A lower noise environment, lower internal noise components in test hardware, a more sensitive LNA (perhaps cooled to a few degrees above 0 degrees Kelvin) a lower resolution bandwidth, multiple test systems 10 output integrated together to reduce noise, and other means known to those skilled in the art may be used to enhance sensitivity to code changes or software modifications exhibited as unintended emissions in device 2. The depth of sensitivity will determine if other characteristics such as program looping, instruction length of program loop, and even memory variable values or value changes can be detected and usefully compared against other baselines.

A typical key measurable difference in the spectrum signature from a hardware malware may be a static sample difference containing changed height of signature elements within identified relevant regions or change to the amplitude, height, location, number, addition or subtraction of peaks, widening or narrowing of signature feature width, and introduction or removal of broad emission energy features from relevant regions when compared with a known good exemplary part as seen in FIG. 12, FIG. 13, FIG. 14, FIG. 16, or FIG. 18.

A known good exemplary (baseline) device 2 and its characteristic spectrum features may be used to form a basis for comparison with unknown parts to determine existence of spectrum changes indicative of malware presence.

One general overall exemplary embodiment system directed to screening devices 2 before they are in place in fully functional systems is shown in FIG. 2 and designated as the parts test system 500. This exemplary embodiment is generally directed towards automated testing of a large volume of parts requiring minimal human oversight or intervention. However this embodiment may allow for a human operator placement, removal and disposition of devices 2 depending on cost savings, low volume of parts to be tested, or temporary outage of robotic system 30 and/or 30B, if implemented. The output from the antenna and LNA combination 22 is fed into the sensor test system 560, which then optionally displays status information and option inputs on optional GUI display 476 and controls the operation of the optional conveyor 709, Robotic systems 30 and 30B, and outputs for device 2, specifically the device 2 configured clock, power, I/O modulated power, and other necessary signals for testing device 2 on output cabling 578.

Test boards with Zero Insertion Force sockets or similar sockets suitable to enable the placement and removal of candidate ICs for testing of selected programmable ICs which contain potentially pre-implanted on-chip malware, viruses, Trojans or other anomalous software or IP core samples is envisioned as a component in some embodiments. The exemplar test board 906, which is used in one exemplar embodiment along with the board's basic architecture, is shown on FIG. 9. The power may be typically applied using connector 904 through power and ground lines 908 to the IC socket 902. The connector 910 serves to connect a clock source to the appropriate pins on the socket 902. Lines 912 from the connector 904 to the socket 902 may energize other specific I/O pins for the IC under test when it is inserted into socket 902. The IC semiconductor die 98 contained and encapsulated within the package of the device 2 is actually tested and radiates Unintended emissions 4 based on internal firmware, software, and/or hardware utilizing its internal existing circuitry. The IC semiconductor die 98 may be tested as a singular entity or as part of a multi-chip module (MCM), board, subsystem, or system, while the system is active. The IC semiconductor die 98 as part of the device 2 can be more man-hour inexpensively tested in an automated test system such as the one seen in FIG. 2 and can be tested either on an assembly line basis 709 and/or an automated robotic basis 30. Further, the two testing means, assembly line basis 709 and/or an automated robotic basis 30, can be combined into a system wherein the robotic system 30 using its controlled actuator arm 32 can be used to place parts onto the conveyor 709 or remove parts from the conveyor 709 using part placement grabber 40. The parts 2 may be picked from a parts bin by the part placement grabber 40 and placed onto the conveyor 709, or alternatively the conveyor 709 may place parts into separate respective parts bins based on the parts status determination after the part 2 has been tested, said status being typically respectively 'modified' or unmodified', that is containing malware or not containing malware. The robotic system 30 may also have an antenna 34 or an integrated antenna 22 and Low Noise Amplifier 834 (LNA) combination configured onto the end of its actuator arm to be connected in the same manner as antenna 20 to the test system 560. Alternatively, the antenna 34 may be incorporated into the part placement grabber 40 to enable the simultaneous testing and moving of the part. It is envisioned that a test fixture 906 may be integrally incorporated into the robotic system's 30 antenna 34 to enable testing of the part 2 below the robotic system's 30 antenna 34. For this purpose, the device 2 may be placed upside down for easy or faster access to the pins of the device 2, this may be especially important when testing devices 2 whose packaging is in the form of a Ball Grid Array (BGA). Further, the conveyor 709 may contain a series of built in test fixtures 906 to provide power, clock, ground and other signals necessary or useful for some specific parts typically using such input voltage and current in their operation. The operation of device 2 placement on the conveyor 709 would involve placing the device 2 in the proper orientation into possible test fixtures 906 of the conveyor 709, enabling contact of the pins of the device 2 to correct corresponding signal, I/O and power pins on the socket 902. Test fixture 906 may incorporate a complete temporary power and/or clock means to enable it to be self-contained and provide power, clock and other needed signals without being connected to anything else electrically including conveyor 709. An ultracapacitor or battery may be incorporated into test fixtures 906 to enable its temporary isolation. An advantage of ultracapacitor power is its output voltage will decay slowly, providing a simple means to scan a range of input voltages while the device 2 is emitting at the slowly decaying input voltage and exhibiting useful changes in signature features based on the consistently decaying voltage. The capacitor may be typically recharged at the beginning when the part in inserted into the test fixture.

The test fixture 906 as seen in FIG. 9 can provide compatibility between boards and the sensor(s). Related sensor(s) in terms of overall general hardware capability and not software-based spectral feature analysis but incorporated by reference typically include an emission receiver or antenna and possibly an RF shielding structure with capabilities up to and including an anechoic chamber. In an embodiment including an anechoic chamber, the antenna typically is inside the anechoic chamber or is a part of the anechoic chamber. The test fixture with matching device or system to be tested can be placed within a combined anechoic chamber and integral antenna-like emission receiver as an integrated antenna enclosure 510 that typically provides >80 dB of isolation from environmental radiation sources, an anechoic chamber, a shielded chamber, or in an open environment. The IAE is an exemplar environment that houses a conformal antenna that provides a direct RF feed into the ultra-sensitive sensor or receiver for acquisition and recording of emission signature data. In some embodiments a custom cable provides proper power, analog, digital and/or clock inputs to be received by the test board or to a system under test for baseline activity, as part of the test process.

Further, the robotic system 30 may be configured to directly place or remove the device 2 directly into or from the Integrated Antenna Enclosure 510 before or after testing. This includes placing the device 2 into a test fixture 906 on an assembly drawer or similar which is then inserted into the integrated antenna enclosure 510. The sensor and controller assembly or apparatus 450 typically contains not only the control and coordination system for the robotic system 30 but also typically contains the detection system elements and operational sequences described in FIG. 1, FIG. 3, FIG. 4, FIG. 6, FIG. 17 and/or FIG. 19. One advantage of the robotic system 30 and its integrated antenna and Low Noise Amplifier 26 (LNA) being used in conjunction with the IAE 510 and conveyor belt 709 as input to the test system 560 is the robotic system 30 with antenna can act to pre-screen parts which may then after being analyzed by the sensor and controller assembly or the apparatus 450, be screened in a lower noise environment within the integrated antenna enclosure 510 if the results derived from the signals gathered by the robotic system 30 and its integrated antenna and Low Noise Amplifier 834 are insufficiently conclusive and a more detailed and sensitive analysis is required. It must be noted some exemplary embodiments may function containing only the integrated antenna enclosure 510 with a drawer 517, or the integrated antenna enclosure 510 with a belt type conveyor 709 or the robotic system 30, and/or any combination of the above elements.

The use of a test board allows for a consistent hardware environment for instantiation of all benchmark hardware Trojan examples. Multiple ICs facilitating testing of multiple technologies though a universal fixture is envisioned as an embodiment that allows for only one board to test all technologies or alternatively an approach is envisioned to exercise the computer asset, software, firmware etc. that does not need a dedicated separate board for testing. In addition, an exemplar embodiment is envisioned in which the parts, boards, systems or networks are tested in situ in the hardware that they are intended to operate in.

Now in a particular reference to FIG. 6, the exemplary computer-implemented method includes the step 601 of activating the test system and loading in the specifically selected signatures for the parts to be tested. In step 603 the device 2 within test fixture 906, or device 2 within board, sub-system or system such as computer 240 or computer 250 is turned on in step 607 or verified to be in an on state generally. This on state then applies power and appropriate test or normal functioning signals to the hardware to be tested in step 615. This typically includes then providing the typically predetermined optimal test or operational clock 621, I/O 620 and power 619 (depending on an exemplary embodiment situation such as seen in FIG. 2, FIG. 7 or FIG. 8) to the device 2 as seen in FIG. 2, or alternatively the part 2 under test within the operational system 240 or 250. The Inputs to the part appropriately activate the part in step 609 resulting in emissions of signatures from the part in step 623. These typically Unintended emissions 4 are then acquired or collected by antenna 4 or integrated antenna and LNA 22 in collection of emissions step 639 which then is an RF input into the RF receiver 637. In an exemplary embodiment subset such as those seen in FIG. 8, the location system of FIG. 19 is typically employed to determine the location of the systems 240 or 250 relative to the unmanned automated self-propelled robotic vehicle apparatus 210 and its GPS or local positioning receiver 220. Further, this robotic vehicle apparatus 210 contains one or more antennas or a plurality of antennas such as an array of antennas 22 receiving typically Unintended emissions 4 at different angles from the device being scrutinized 240 containing suspect part 2 emitting said typically Unintended emissions, enabling the determination of location of part 2 or system 240 or system 250 in an RF environment containing multiple such candidate parts of systems to be scrutinized and typically located. It must be noted that such a location system can also be employed in an exemplary embodiment such as that seen in FIG. 2 if the antenna 22 has a similar multiple antenna or antenna array arrangement within it, or there are additional antennas inputs located on the sides of the enclosure 510. Herein one of several IC chips within enclosure 510 emitting unintended emissions indicative of malware may be identified and located within enclosure 510. It must be noted that movement changing mere proximity to systems sufficiently spaced apart may be sufficient to geolocate the source of unacceptable emissions in some exemplary embodiments, thus geolocation sub-system 710 is not absolutely necessary as the intelligent movement of the robotic receiver device 210 or even randomized wandering of it can suffice to locate the source 240 responsible for the acceptable or unacceptable emission 4.

In a further reference to FIG. 6, as the part 2 is being activated in step 607, there are various exemplary embodiment subsets to consider. In the case of an isolated part testing apparatus such as the system shown in FIG. 2, the user or robotic action places the electronic device 2 in the optimal position to transmit the emissions and also simultaneously seals the container 510 from unwanted external RF interference. In the case of an exemplary embodiment wherein the part or parts under test are operating within a board, system or sub-system, such as a part containing suspect software, firmware or hardware in computer 240 or computer 250, step 607 verifies the systems 240 or 250 are on, ready and generally in a normal operational state.

Typically simultaneous to this, the RF Unintended signal acquisition spectrum and signature analysis scan is initiated in step 605. Step 605 also triggers the step 613 wherein the logic executed by the processing device seen in FIG. 1 defines parameters for the sensor and controller apparatus 450 is configured by for example typically setting the center frequency, frequency span, Resolution Bandwidth, internal gain, FFT size, filter characteristics and potentially other factors. Also typically simultaneous to this, in step 611 the Signature patterns and typically frequency domain pre-processing settings are selected for the specific part 2 under test and established and activated within software, such as Wavelet Transform processing. Step 605 also initiates, the logic executed by the processing components and defines parameters for RF signal discrimination algorithms. Step 615 configures the power, ground, clock source and modulation parameters using circuits/boards that provide means for modulating an input and/or output pin of the electronic device 2. Steps 621, 619 and 620 generate the configured inputs that are subsequently applied to the electronic device 2 through step 609. These steps thus provide predesignated signals to the predesignated pins of the electronic device 2.

When powered, the electronic device 2 emits electromagnetic energy in step 623 that are gathered by the integrated antenna enclosure 510 via the antenna structure 22 in step 639 and is received at the RF receiver and sensor test system 560. The RF receiver and sensor test system 560 thus receives the intended or Unintended emissions 4 from the electronic device 2, which proceed outward from the electronic device 2 where the emissions 4 are gathered by an antenna means and sent typically by a coaxial cable 568a to the RF receiver and sensor test apparatus 450. The RF receiver and sensor test system 560 or in more detail emission detection and characterization device 450 typically employs a sensitive low-noise amplifier (LNA) to amplify the emission signals first. The device 450 may include either one or both of the Frequency domain processing module 450A or Time domain processing module 450B.

The received RF emissions are digitized in step ADC 838 with the digital signal processed in steps 826 and 827. Further, in step 828, the logic algorithms executed by a general processing device such as a CPU 402, characterize the RF emission signature and the device 2 as either found as meeting a predetermined performance criteria or a predetermined emission signature in step 633 or is found as counterfeited or substandard in step 635. When desired, the results are displayed on a display or GUI such as display 476 in step 641.

Again with regard to FIG. 2 Robotic system 30B can typically be used to unload a tested part from the IAE 510 or unload a tested part 2 from the conveyor 709 and place it into an accepted bin 726B or a rejected bin 724B based on test results in step 633 or 635. Similarly, Robotic system 30 may take parts to be tested from bin 722 and test them using antenna 34 coupled to a Sensor Test System 560 immediately, typically performing a lower acuity test than is capable in the IAE 510.

At this point if sufficient certainty is achieved the results of the test, may then cause the Robotic system 30 to place the tested part into a rejected bin 724 or accepted bin 726. If the test is inconclusive, the part may be loaded onto conveyor 709 for more detailed tests. There are many possible exemplary embodiment combinations of such a system using human operators in place of all or some of the Robotic system 30 or 30B, or a system using only one Robotic system 30 for loading and unloading and dispositioning parts in their appropriate bins.

FIG. 3 shows an exemplary system directed towards testing isolated electronic devices 2 in many phases of the manufacturing chain, especially more accessible phases such as die separation from wafer and packaging 308, chip package functionality test 312, and shipping and deployment phase 314. Herein, the test system 10 performs testing on suspect devices 2 in die form, in packaged chip form, at prototype stages or final stages. After the design phase 316, a prototype, such as even an FPGA-based prototype is often made to verify operation, and this prototype under operation can both serve as a source of emissions as a basis for comparison and can be tested for indications of malware against previously obtained known good emission patterns or signatures. Similarly, after Fab Interface step 318 or IP generation, Standard Cells, Models and/or Tool usage 320, physical prototypes which are instantiated can be tested or used for comparison purposes against subsequent prototypes or subsequent physical prototypes created in later phases. Mask 330 can be fabricated in step 332 and applied to the die or chip. This is especially the case before manual or automated optimization occurs. In typical manual operation, the part 2 to be tested will be placed into the RF shielded enclosure within the testing system 510 by opening closing access door 517 placing part 2 within test fixture 906 and then closing access door 517. As can be seen, testing system 510 metallic enclosure acts as an RF shield 510 from outside RF noise after access door or drawer 517 is closed. Or, a wafer probe 334, for example as illustrated in FIGS. 2-2A can be used.

Another exemplary embodiment of FIG. 7 shows emissions 4 of RF energy from an electrically powered device 2 containing an operational DRAM chip 230 on an existing operational computer board section segment 224 shown connected and interfaced in typical implemented fashion as the electrically powered device 2 with power input 42, ground 46, DRAM data and/or address lines 202, and clock input source 44. The RF energy 4 from the chip or the RF energy from data or address lines 202 is acquired by the RF emission analysis system 10 using the antenna 22. The system 20 containing a substantial number of processing components in FIG. 17, system 810, and compares the Unintended RF energy patterns 4 emitted from the DRAM chip 230 or its lines 202 with existing acquired RF energy patterns and their corresponding signatures to determine if the software executing or stored within the DRAM 230 is modified or unmodified.

Figure 21:
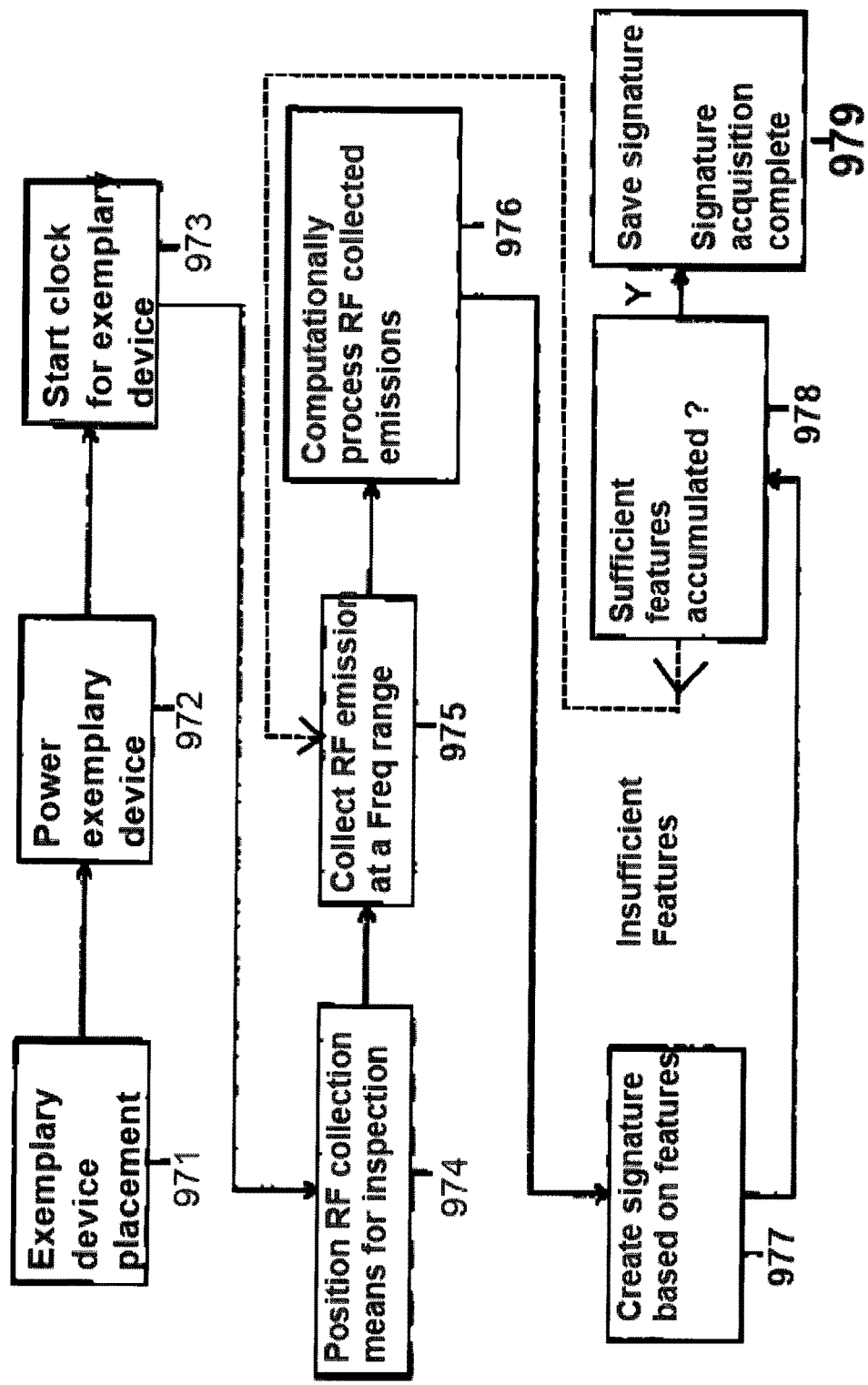
FIG. 21 illustrates a flowchart of exemplary actions that may be taken to acquire an initial signature from a known good, malware-free device using many typical exemplary embodiments disclosed herein.

Now in a reference to FIG. 21, therein is illustrated an exemplary flowchart of exemplary actions that may be taken to acquire an initial signature from a known good, malware-free part 2 using many typical exemplary embodiments disclosed herein. In step 971, the exemplary device 2 is placed into a proper location for examination by apparatus such as 500, 510, or 210. In the instance of apparatus 500, this would typically mean placing the part 2 into a test fixture 906. Next, the apparatus 500 typically applies power and ground in step 972 and starts clock in step 973. Other signals may be also applied in steps 972 and 973 including bitstream loads, I/O signals, and the like as needed for the device 2 to emit characteristic emissions. In step 974, the RF collection means is readied, which typically includes selecting an initial starting examining frequency location, span, and RBW and activating all necessary means such as those shown in steps 605, 607, 609, 615, 621, 619, 620, 623, 639, 637, 625, 627, and 613 of FIG. 6. Thus hardware and/or software equivalent elements in 824, 826, 827, and 828 are activated. In step 975, the spectrum region at the above chosen specified frequency, span and RBW is acquired. In step 976, the acquired spectrum region may be examined manually by the user or operator or automatically by the software logic to determine if there are sufficient useful features above the noise floor to merit the region for feature extraction, measurement and recordation as a candidate signature or signature segment to be used for future comparison with features similarly extracted from candidate unknown parts using a substantially similar specified frequency, span and RBW. In step 977, the candidate signature or signature segment is created and saved from the sufficiently usefully discriminating features determined in step 976 from characteristics including those specified in FIG. 11. Typical basic evaluation could typically include peak frequency location and magnitude 166 above noise floor 164, phase noise present of a peak 166, skewness 162 of a peak 166 substantially above the noise floor 164, and multi-peak envelope outline or envelope characteristics such as seen in 152, 154, or 156 FIGS. 15A, 15B and 15C respectively.

In step 978, the determination is made deciding whether sufficient features represented by the accumulated signatures are sufficient to substantially ensure desired threshold evaluation accuracy. If the desired evaluation accuracy is not yet achieved, the steps 975 through 977 can be typically repeated or again repeated until sufficient accuracy is determined or decided upon manually, broad historical basis based on similar component categories, automatically or by human inductive or intuitive means. Once sufficient accuracy is decided automatically or manually, the resulting signature segments are saved as a complete signature or signature segments in step 979 and exemplary signature acquisition is typically complete.

Some exemplary embodiments contain an Unintended emission analysis hardware and software system in a handheld embodiment operable by a user manually, another general category of embodiments contain a system in an unmanned robotic arrangement, still other categories of an unmanned robotic arrangement contain a self-propelled and self-navigating system, in a vehicular fashion or a UAV manner (such as a Quadra-copter enabled system), which seeks out and identifies systems with potentially contain malware, a further embodiment actively suppresses or permanently damages a device containing improper software once found, other forms of the above or below embodiments use time domain analysis of emitted signals and/or frequency domain analysis of emitted signals, further other forms of the above or below embodiments may use active source RF emissions to assist in more accurately locating the device or system, while other forms of the above or below embodiments may use active source RF emissions to assist in more accurately further isolating and influencing the type of chip device emitting the suspected emission signature. Some exemplary embodiments of the below or above embodiments may use harmonic phase analysis to assist in further determining if emission signatures are the ones being compared with a higher degree of accuracy, some embodiments may use non-coherent signal integration techniques to further reduce the noise of received emissions, some embodiments may be directed towards detecting emission signatures from devices connectable or connected to a network which may be especially susceptible to malware or Trojan injections, and to identifying potentially infected devices both using network characteristic means and/or identifiers such as IP addresses and intended or Unintended emissions means. Some devices may be specifically configured to examine medically implanted devices. Some exemplary embodiments may be directed into integration into a very small package or a single IC chip. Some embodiments may be directed towards estimating the loss of useful lifetime and total Remaining Useful Life as a result of added activity due to malware or improper software. Some exemplary embodiments may be adapted to locate Malware even when it is within or running on counterfeited electronic parts and devices. Some embodiments may first locate counterfeit devices, then examine them to determine if they are infected with malware to save examination time in conditions where the likelihood of infection is higher on counterfeited devices. Some exemplary embodiments may be directed towards examining separate isolated IC chips in a specifically designed apparatus to detect Malware, modified or unmodified software in the chip firmware or hardware or programmable hardware. Some exemplary embodiments may be directed towards examining running systems containing software Malware, Trojans or modified or unmodified software somewhere within the system. Some exemplary embodiments may include use of a RF shielding enclosure or anechoic chamber for enhanced low level signal sensitivity. Some exemplary embodiments may be designed for use in noisy environments by additional filtering and noise reduction means such as non-coherent integration. Some exemplary embodiments may be directed towards detecting emissions from DRAM chips while they are refreshing but the malware is not being accessed, written nor executed, other embodiments may be directed towards detecting emissions from DRAM chips and/or their associated circuitry while the malware is read written and/or executing. Some exemplary embodiments may contain all of the above features, while other embodiments may contain a limited subset or only one of the capabilities described above or below. All exemplary embodiments contain the necessary emission acquisition means, hardware processing means, software processing means, and result actions means needed to determine if modified or unmodified operational logic patterns are present within electronic logical processing devices.

Many receiver embodiments are contemplated as a component to the RF energy collection apparatus to include as noted heterodyne or superhetrodyne receivers, wideband crystal video receivers, tuned Radio frequency crystal video receivers, narrowband scanning superhetrodyne receivers, channelized receivers, microscan receivers, Acousto-optic receivers and the vast array of tuner technologies that may often be referred to as synonymous with receivers.

It must be noted that a Trojan, malware, modified or unmodified software, hardware or firmware can directly accelerate aging of a device, component, board, subsystem or system. This can cause the Remaining Useful Lifetime (RUL) to decline through the increased usage of system hardware resources such as CPU time, I/O use, additional active circuitry drawing current or additional gate usage, more frequent occurrences of usage or more power or less time efficient operations. Disclosed in patents incorporated by reference herein are apparatus, systems and means to measure overall degradation by comparison of baseline signatures of substantially new undegraded devices, components, boards, subsystems or systems with baseline signatures of aged, degraded devices, devices which have exceeded their recommended operational parameters, or devices which have been aged more due to additional use of their capabilities such as overclocked or overvoltage devices or devices which have not been properly or more optimally configured to run in a lower speed or energy usage state. Emission signature of devices can be matched with a known RUL to interpolate a calculated RUL. Thus, not only components, subsystems or systems which contain malware or modified software can be identified, but calculation of the shortened and final RUL of a device as a result of the malware presence can be carried out. The degradation of the device 2 due to the potential added load of malware, Trojan, or additional software being executed can be quantified or expressed in terms of % RUL lost based on the instant invention in combination with previous inventions incorporated by reference such as U.S. Pat. No. 8,643,539 issued to Pauly et al. and entitled "Advance manufacturing monitoring and diagnostic tool". Thus, the capability is taught herein to detect aging and decrease of RUL caused by such Trojans, malware, software modifications, software unmodifications, or lack of software modifications.

Further, detection of malware or software changes can be accomplished by RF emissions analysis specifically configured in signal characteristics, signal frequency, modulation, signal phase, signal polarizations, strength and direction to introduce malware or software changes into a device using a non-contact means from a distance. Further still, a specifically designed signal with carefully constructed characteristics can be used to trigger already embedded malware or to change the state of the device to trigger modified or unmodified software to execute different instructions or in a different manner than designed or expected. A simpler example of this would be to interfere with an I/O operation communication within a device causing I/O drivers infected with malware to be invoked executing expected repeated retransmission of data or commands along with unexpected retransmission to an undesired destination or to similarly repeatedly reestablish a secure communication link, especially an Internet Protocol connection. Alternatively, the unmodified software could be forced to go into an error recovery state which would not normally be entered. It is contemplated herewithin that these operations and state changes and the change in execution of the unmodified software could be discerned.

Malware or malicious software is software or firmware used or created by any person, group or entity to disrupt computer operation, unduly influence computational outcomes, subtlety modify mathematical outcomes, compromise security, gather sensitive information, send information external to the computer or network, or gain access to private, commercial or public computer systems. While it is often in the form of traditional CPU-based software, it can also appear in the form of scripts, code, or firmware, or changes to the physical underlying hardware that are initiated via VHDL code such as is the case in FPGAs or CPLDs that can be instantiated via standard "burning" of the part to include anti-fuse or non-anti-fuse FPGAs. Malware is a general term used to refer to a variety of forms of intended acts of adding function to a computer, board or part that is hostile, intrusive, or annoying and functionally changes the intended operation of the computer, system or network and encompasses the anomalies that can be detected by the analysis of Unintended emissions. Malware includes computer viruses, worms, Trojan horses, spyware, adware, most rootkits, robots and other malicious programs. Malware is sometimes also often known as a computer contaminant. Any computer contaminant will give off a change in unintended emission that can be captured. Malware is not the same as defective software with unintended flaws though defective software can be detected using these methodologies and, therefore, this technique can be used for quality control of software. One example bug in defective software which can be clearly detected would be a software bug in the form of a tight programming loop. Repeated periodic unintended emissions caused by the loop and emitted by the hardware executing the code can be received, characterized and recognized. Other subtler examples which could be detected would be software versions that have a legitimate design and anticipated results, but contains harmful bugs and/or potentially exploitable bugs such as buffer overrun capability or SQL injection attacks which can be invoked under special circumstances remotely to inject malware code that were not noticed before release. The detection of the results of an SQL injection attack or the emissions from an attack in progress can be identified. However, some malware can be considered to be disguised as modified (in this case, for example, containing unrelated bug fixes) or unmodified software (in this case being pre-bug-fix), and may come from an official company website but be infected or newly infectable by a whole array of means. This may include installation at the IC fabrication facility or at any point in the supply chain from the time a part, board or system is conceived until it is delivered and used by a user of the computer asset and then throughout the lifetime of the computer asset in the case of malware that is emplaced during the use of the computer asset. An example would be software used for harmless purposes that also includes tracking software to gather marketing statistics for advertising by the software producer. As an example, unmodified software can be considered malware if a needed software upgrade was performed to remove a known security risk, but said update was rolled back deliberately or accidently thus re-exposing the host system to the security risk for exploitable purposes.

Some exemplary embodiments may employ electromagnetic emissions analysis of electronics including spectrographic analysis, time-frequency analysis, and electromagnetic emission radiation response to input signal variations. Electromagnetic emissions analysis is an important tool used in part verification of microelectronic devices. Electromagnetic emissions analysis may be performed on devices 2 to verify that the sub- and super-EMI threshold radiated emissions are consistent with an exemplar item. When an exemplar item is not available, comparisons may be made within a homogenous sample population using the technical data available for that item. Test fixtures, for example such as exemplary fixture 906, can typically be put into two primary categories: passive fixtures and active fixtures. Test fixtures may be generally designed and optimized to enhance electromagnetic emissions. Passive fixtures only transfer the input stimulus from the Driving Equipment to the device 2 under test (DUT) and have a minimum of auxiliary passive components on board. Active Fixtures contain additional components that support the Driving Equipment and are more common for complex DUTs. Known good samples (set-up samples) may be used before and after testing of any control samples if they are available. This assures that the correct stimulus software algorithms and algorithm parameters are being used and most exemplary embodiments of the system is operating properly. These known good devices may be the exact same part type as the product being tested.

Further, additional control samples may typically be used and kept separate from set-up samples whenever possible. These control samples may be used as system calibration specimens during the electromagnetic emission analysis process. When inspecting a large assembly with many installed devices, such as a printed circuit board, and focusing on a specific device, areas that are not under examination may be masked with appropriate shielding. Aappropriate shielding may be supported up on blocks or other elements so the weight of the shielding does not damage the assembly.

Inspection of a large assembly with many installed devices, such as a printed circuit board, and analyzing the entire assembly as a whole, may require that no areas are masked to impede aggregate electromagnetic emissions. Prior to analysis, a system calibration specimen (SCS) may be used to ensure that the apparatus is operating properly for the assembly being analyzed. An SCS may be analyzed at the beginning of the examination of a lot of devices, and then a reanalysis of the same SCS may be performed at the end of the examination. SCSs may be typically analyzed and verified with the full range of acquisition settings (for example, when spectral resolution band width (RBW) is changed during an examination to view multiple spectral features, SCSs may be subject to those same settings).

To prepare the system for electromagnetic emission acquisition the following steps may be typically performed. To prepare a single component or a group of components for emissions acquisition, the test fixture is properly registered relative to the receiving antenna or integrated antenna enclosure. The device 2 is inserted into the test fixture, ensuring that proper connection between the DUT and the test fixture occurs. Acquisition of electromagnetic emissions can proceed using automated measurement and logging equipment, such as for example the above described apparatus 450, in a response to the appropriate driving stimuli. Appropriate sensitivity may be used for each individual frequency span. Appropriate frequency resolution may be used. High resolution bandwidth inspection and minimum number of frequency spans may be determined by the function and complexity of the DUTs. As an example, 1 Hz RBW and 7 frequency spans are typically used for high confidence in low complexity parts. Digital representations of electromagnetic emissions may be compared and contrasted with specific focus on emission homogeneity, consistency, and uniformity. This process may be automated. It is normal for there to be some variation across different date and lot codes but not normally in parts with the same date and lot code. Additional analyses may be performed on parts that exhibit anomalies in their radiated electromagnetic emissions. The acquisition of the DUT's electromagnetic emissions may be repeated multiple times and combined to decrease the amount of variability associated with any individual acquisition.

Some of the above described may be typically capable of handling parts supplied in tubes, reels, trays, or as piece parts. Acquisition sensitivity may typically be well below EMI levels, with a typical threshold of a −165 dBm noise floor at 1 Hz RBW. Frequency resolution may typically allow acquisition of both broadband and narrowband emissions, with a threshold of 1 Hz RBW for separating emission frequency components. Bandwidth of the electromagnetic emission acquisition system may typically allow for the acquisition of multiple emissive frequencies, with a typical threshold range of 100 MHz-750 MHz. Facilities with a non-automated system may typically have a viewer or a monitor that is capable of displaying a representation of the DUT's, the control part's, and the set-up part's electromagnetic emissions. Either acquire that the digital representation of identifying electromagnetic emissions of the reference sample directly, or load the digital representation of the identifying electromagnetic emissions from persistent storage. Acquire that the digital representation of identifying electromagnetic emissions from the device under test.

While evaluating electronic components with the same date code, part number, place of manufacturing and country of origin, the following attributes may typically be evaluated: relevant variance in noise floor, variations in emission signature features and/or any additional or missing electromagnetic emission elements.

Prior to inspecting, comparing, contrasting, and interpreting digital representations of electromagnetic emissions, one may ensure that the representations are of adequate quality (by the use of an SCS or System Calibration Specimen). Digital representations of adequate quality can be achieved by eliminating artifacts that can arise due to system attributes. Specific artifacts or poor emissions can arise from incorrect part or test fixture registration, improper stimulation of the part, handling of the part, improper choice of electromagnetic spectral spans, and usage conditions. The quality of the representation may be determined by producing a digital representation with an SCS as well as the reference part.

Digital representations of electromagnetic emissions may be inspected, compared, contrasted, and interpreted using appropriate means. An auditable standard, methodology, procedure and/or equipment may be developed for the purpose of comparison. Auditable standards may be proprietary or trade secret information. The extent of variance of electromagnetic emissions for suspect parts detection may be based on the specified test requirement. The intent of these specifications may be to assess for indications of counterfeiting. There may be issues identified during this evaluation which are non-conformities but are not considered to be indications of counterfeiting. Non-conformities may be reported and clearly documented. Additional test methods may be used for complete assessment of part authenticity. Further disposition or testing may be required. However, non-conformities within specified margins may not be considered to be counterfeit reject criteria.

When inspecting digital representations of electromagnetic emissions, indications can be interpreted as artifacts, part quality control issues or counterfeits. Artifacts in digital representations can arise from the following system attributes. Note that the list provided below is not all-inclusive; artifacts beyond the ones listed here may be observed: Inappropriate Signal-To-Noise Ratio (SNR): follow guidelines to optimize SNR for the acquired emission elements. As required, there may be adequate acquisition averaging or integration. Inappropriate Distortion: follow manufacturers' guidelines to ensure that emission distortion is not observed. Gain and Offset Correction: As required, evaluate any signal gain per the manufacturers' guidelines.

These artifacts above can be validated either after rectifying the issues identified above, with a comparison of digital representations of the SCS/reference part/DUT pre- and post-correction, or with a different follow-up technique. However, if left unaddressed, the test would be considered invalid, and would render ambiguous results.

If stimulating parameters for the part are considered proprietary, an auditable reference may be used. Key findings with respect to an exemplar part, homogeneous lot comparison or manufacturer specification review such as: variability of emissions, unexpected emissions, lack of identifying emissions, other emissions anomalies that could indicate counterfeits (increased variability of emissions acquisition to acquisition, etc.). If key differences are observed between DUT and exemplar (baseline) DUT, information on exemplar item can be obtained from sources such as datasheets, specifications, or digital representation of exemplar item characterization.

In one exemplary embodiment, an apparatus comprises a sensor, configured, to capture unintended emitted electromagnetic energy and/or unintended conducted energy from one or more electrical devices; one or more processors or logic devices; and a computational medium comprising executable instructions that, when executed by the one or more processors or logic devices, cause the one or more processors or logic devices to perform the following steps on the captured unintended emitted electromagnetic energy and/or the unintended conducted energy: measuring a feature value in at least one spectral frequency region of the captured unintended emitted electromagnetic energy and/or unintended conducted energy from the one or more electrical devices, calculating a difference value between the measured feature value and a baseline feature value, and determining, based on the calculated difference value, a presence or an absence of at least one of malicious software, anomalous software, modified software, malicious firmware, anomalous firmware, modified firmware, malicious circuitry, anomalous circuitry and modified circuitry within the one or more electrical devices.

The apparatus may further comprise an antenna coupled to the sensor and collecting the unintended emitted electromagnetic energy.

The antenna and fixture(s) may be positionable within an enclosure, wherein the fixture(s) sized and shaped to receive the one or more electrical devices and configured to stimulate the one or more electrical devices being tested into an operating state wherein unintended emissions are generated.

At least one of a stimuli used to stimulate the one or more electrical devices may be is configured to sweep across at least one of a frequency span, a voltage range, a duty cycle, a pulse duration, a time interval, a power amplitude and an electromagnetic illumination range.

The baseline feature value may be obtained from captured unintended emissions being given off by a baseline electrical device, wherein the one or more electrical devices are determined and/or validated to be at least one of constructed, coded, programmed, loaded, burned-in and functioning identically to the baseline electrical device.

The baseline electrical device and one or more electrical devices may be located, during operation of the apparatus, within a hollow enclosure having the antenna being integrated therewithin.

The one or more electrical devices may be at least one of a wafer, a die, an electronic part, a circuit board, system, sub-system, and a circuit board assembly and wherein two are serially, concurrently or simultaneously tested using apparatus.

The one or more electrical devices may be a circuit board or a circuit assembly, each including plurality of electronic components and wherein the plurality of electronic components are being simultaneously determined to have the presence or the absence of the at least one of malicious software, anomalous software, modified software, unmodified software, malicious firmware, anomalous firmware, modified firmware, unmodified firmware, malicious circuitry, anomalous circuitry and modified circuitry, unmodified circuitry during operation of the apparatus.

The step of measuring the feature value may be performed serially or concurrently with a step of measuring the baseline feature value.

The executable instructions, when executed by the one or more processors or logic devices, may also cause the one or more processors or logic devices to perform an additional step of electromagnetic emissions analysis including at least one of a spectrographic analysis, a time-frequency analysis, an electromagnetic emission radiation response analysis related to input signal variations, a phase analysis, an informatics analysis, and a statistical analysis.

The one or more electrical devices may be at least one of a wafer, a die, an electronic part, a circuit board, circuit board assembly, a subsystem, a system and a network and wherein the executable instructions, when executed by the one or more processors or logic devices, further cause the one or more processors or logic devices to determine an authenticity or an unmodified state of at least one of a software, a firmware and a circuitry present in the at least one of wafer, die, electronic part, circuit board, circuit board assembly, subsystem, system and network.

The one or more electrical devices may be at least one of a wafer, a die, an electronic part, a circuit board, a circuit board assembly, a sub-system and a system, wherein the apparatus further comprising a probe and an antenna located on a tip of the probe and wherein the probe is movable across the at least one of wafer, die, electronic part, circuit board, circuit board assembly, sub-system and system being in an electrically excited state.

The at least one of malicious software, anomalous software, modified software, malicious firmware, anomalous firmware, modified firmware, malicious circuitry, anomalous circuitry and modified circuitry may include at least one of tainted, bug, malware, tampered, subversively altered, worm, zombie, Trojan, Trojan horse, Rootkit, virus, spyware, adware, checksum exploit, scareware, incorrect software, exploit, SQL injection attack, privacy-invasive software, backdoor, Rowhammer exploit, update, tainted part, tampered with, counterfeit, and denial of service.

In another exemplary embodiment, an apparatus is provided for analyzing at least one electrical device being at least one of a wafer, a die, an electronic part, a circuit board, system or sub-system or a circuit board assembly. The apparatus comprises an integrated antenna enclosure including a hollow enclosure and one or more antennas being at least one of integrated into, inserted into or configured in an array within the enclosure that within the enclosure, the one or more antennas receiving unintended emissions of electromagnetic energy given off by one or more electrical devices; an electromagnetic pattern sensor, configured, in a combination with the integrated antenna enclosure, to capture the unintended emissions of electromagnetic energy being given off by the electrical device placed within the integrated antenna enclosure; one or more processors or logic devices; and a computational medium comprising executable instructions that, when executed by the one or more processors or logic devices, cause the one or more processors or logic devices to perform the following steps on the captured unintended emissions of the electromagnetic energy: quantifying a feature value in at least one spectral frequency region of the unintended emissions for at least two different physical electrical devices that are determined and/or validated to be at least one of constructed, coded, programmed, loaded, burned-in and functioning identically to each other, wherein the at least two different physical electrical devices are serially or concurrently emplaced and measured in the integrated antenna enclosure, identifying differences between at least one corresponding quantified feature of the spectral frequency region in the unintended emission for each of the at least two different physical electrical devices, calculating a value based on a comparison of the two corresponding quantified features forming at least one parameter of the spectral frequency region in the unintended emission, and determining, based on the calculated difference value, a presence or an absence of at least one of malicious software, anomalous software, modified software, malicious firmware, anomalous firmware, modified firmware, malicious circuitry, anomalous circuitry and modified circuitry within the one or more electrical devices.

The at least two different physical electrical devices may include at least one of a baseline electrical device and an unexamined device, at least two different baseline electrical devices of a different type, at least two unexamined devices of the same type, at least two different baseline electrical devices of the same type, and at least two unexamined devices of a different type.

In another exemplary embodiment, an apparatus comprises an antenna; an emissions acquisition assembly, configured, to receive, in an analog form, unintended emissions of electromagnetic energy being given off by an electrical device and to covert the received unintended emissions into a digitized data; one or more processors; and a non-transitory computer readable medium comprising executable instructions that, when executed by the one or more processors, cause the one or more processors to perform the steps of: identifying a spectral frequency region within a sample unintended emission, measuring a value of a parameter of the spectral frequency region in the sample unintended emission, measuring value(s) of the parameter in one or more of subsequent unintended emissions, and determining, based on distinct changes in the values of the parameter, at least one of anomalous software, anomalous firmware and anomalous circuitry of the electrical device.

The value of the parameter may change over time and/or the value of the parameter may differ across frequency ranges.

The executable instructions herein, when executed by the one or more processors, may further cause the one or more processors to at least one of locate or geolocate the electrical device.

The executable instructions, when executed by the one or more processors, may further cause the one or more processors to determine location(s) of the unintended emissions within the electrical device and/or associate the emissions to a distinct electronic component within the electronic device The emissions of distinct electronic components on a circuit board may be associated with the corresponding distinct physical electronic components on the circuit board.

The executable instructions, when executed by the one or more processors, may further cause the one or more processors to determine a type of and/or classify the electrical device.

The digital representations of electromagnetic emissions may be compared and contrasted with a specific focus on at least one of emission homogeneity, consistency, and uniformity.

Another exemplary embodiment provides a method that may be a computer-implemented method for analyzing plurality of wafers, dies, electronic parts, circuit boards, circuit board assemblies, sub-systems and systems for presence or absence of at least one of anomalous circuitry, anomalous firmware or anomalous software. The method comprises the steps of capturing emissions of electromagnetic energy radiating from the at least one of wafers, dies, electronic parts, circuit boards, circuit board assemblies, sub-systems and systems; analyzing signature(s) of the captured emissions by at least one of a spectrographic analysis, an amplitude analysis, a time-frequency analysis, a frequency analysis, an electromagnetic emission radiation response analysis, input signal variations, a phase analysis, an informatics analysis, and a statistical analysis, and verifying whether at least one of sub-threshold and super-threshold values have been exceeded in one or more of amplitude, frequency, phase and time domains of signature(s) elements of the captured emissions.

The method may further comprise the step of providing a calibration specimen, the step of capturing emissions radiating from the calibration specimen and the step of defining a calibrating emission signature.

The method may further comprise the step of analyzing at least one of the captured emissions radiating from the calibration specimen and the calibrated emission signature using at least one of manual or automatic means to define, select or enhance the at least one calibrating emission signature to find more discriminating comparison characteristics of the calibration specimen.

The method may further comprise the step of assuring by way of comparing signature of the captured emissions with the calibrating emission signature, a proper operation of the at least one of wafers, dies, electronic parts, circuit boards, circuit board assemblies, sub-systems and systems.

The method may further comprise the step of analyzing operation of the calibration specimen at different time instances during analysis of the wafers, dies, electronic parts, circuit boards, circuit board assemblies, sub-systems and systems.

The method may further comprise the step of comparing a signature of captured emissions from baseline wafers, dies, electronic parts, circuit boards, circuit board assemblies, sub-systems and systems at different time instances to wafers, dies, electronic parts, circuit boards, circuit board assemblies, sub-systems and systems under test, inspection and/or examination.

The method may further comprise the step of combining results of at least one of spectrographic analysis, frequency analysis, time-frequency analysis, electromagnetic emission radiation response analysis, input signal variations, phase analysis, informatics analysis, and statistical analysis for at least one of the feature values with results of at least one of spectrographic analysis, frequency analysis, time-frequency analysis, electromagnetic emission radiation response analysis, input signal variations, phase analysis, informatics analysis, and statistical analysis for at least one of another feature value in at least one frequency region from at least one time interval.

In one embodiment, the highly sensitive RF energy collection apparatus is a traditional RF receiver.

In another embodiment the ultra-sensitive RF energy collecting device is a photon detector that operates in the RF energy spectrum.

In another embodiment, the electronic device being inspected has at least power connected to it and may also have one or more digital, analog or oscillatory signals connected to one or more inputs of the inspected electronics. This may also be used to artificially test and exercise features of the device and/or which may invoke a mode of operation which may not normally be created in the overall environment unless unusual or rare conditions occur. Further, the signals may be used to enhance or further create additional unintended emission features to more easily create distinguishing characteristics. Such enhancement can enable faster, safer, more certain, more acuity, and/or more thorough diagnostics. Further, the signals may be low enough to be within the tolerances of the device or circuit operation and usefully induce additional indicative or enhanced emissions without changing any functionality, logical operation or signaling within or to or from the device, especially during normal operation. Also, the signals may temporarily be outside the minimum or maximum manufacturer specifications, yet briefly enough not to effect operation of the circuitry it is operating within, nor insufficient to damage the device or electrically adjacent devices under test.

In another exemplary embodiment an active free-field RF illumination source is used to enhance, affect operation of, and/or suppress the emissions given off by the targeted device for simultaneous collection by the RF collection means for the purpose of enhancing the detection of malware, or locating or geolocating the component containing the malware, especially in the form of malware embedded in firmware or in programmable logic devices, while remaining under the field strength needed to impact or change the functionality of the device being tested or monitored.

In another exemplary embodiment an active free-field RF illumination source is used to determine levels at which the device operation is changed, specific operations are inhibited such as inhibiting Malware or a virus from successfully using an illumination-inhibited I/O hardware sub-system to transmit critical data or reproduce, and/or suppress the emissions also given off at a higher harmonic by the targeted device for simultaneous collection by the RF collection means for the purpose of enhancing the detection of malware emissions incidentally located near or at that harmonic, or locating or Geolocating the component containing the malware, especially in the form of malware embedded in firmware or in programmable logic devices, while remaining under the field strength needed to impact or change the functionality of the device being tested or monitored.

In another exemplary embodiment, the apparatus or method can be further used to detect malicious software that may be encoded in a standard programming language.

In another exemplary embodiment, the apparatus or method can be further used to detect specific code execution patterns, being agnostic to the overall desirability of such code functionality results within the framework of the specific CPU and system hardware configuration it is running on.

In another embodiment the highly sensitive RF energy collection apparatus is a cryogenically cooled receiver. In one embodiment the system has a noise figure of less than 5. In another embodiment the system has a noise figure of less than 1. In another embodiment the system has a noise figure less than 0.1.

One exemplary embodiment uses direct analysis of the analog signal into a digital output.

Another exemplary embodiment where higher frequencies are required, utilizes a down conversion of the analog output prior to conversion to a digital signal.

In one exemplary embodiment, the highly sensitive receiver further uses Digital Signal Processing (DSP) to further enhance the sensitivity of the receiver.

In another exemplary embodiment, the RF energy collection apparatus utilizes DSP filtering techniques to prepare the collected data for further processing by DSP algorithms.

One embodiment directed to improve sensitivity of the receiver uses a Fast Fourier Transform (FFT).

In another exemplary embodiment, the FFT is utilized in excess of 1 Million points.

In another exemplary embodiment, the FFT is implemented on an embedded chip within the RF collection apparatus.

In another exemplary embodiment, an apparatus uses unintended electromagnetic energy in the RF spectrum to detect Malware and malicious software in electrical and electronic devices.

In another exemplary embodiment, an apparatus detects malware and malicious software in electrical and electronic devices and includes a precision input source generating a precision input for low voltage level signal injection into such electrical and electronic devices.

In another exemplary embodiment, an apparatus detects malware and malicious software in electrical and electronic devices and includes an antenna array with integrated low noise amplifier.

In another exemplary embodiment, an apparatus detects malware and malicious software in electrical and electronic devices and includes means for comparing signature of emitted RF energy with baseline RF characteristics.

In another exemplary embodiment, an apparatus detects malware and malicious software in electrical and electronic devices and includes test devices preconfigured for screening an individual circuit, software or system component.

In another exemplary embodiment, an apparatus inspects a large variety of devices with similar, digitally functionally equivalent subsystems or complete systems. In some examples, the inspection may be undertaken in response to repair or maintenance to assure that all of the software is consistent and modified or unmodified, as needed.

In another exemplary embodiment, an apparatus provides for testing a large number of functioning parts, subsystem or complete system simultaneously and/or sporadically, continuously, occasionally, a limited number of times, a fixed time duration, or periodically. Here multiple different possible malware injections in different parts or subsystems can be simultaneously tested.

In another exemplary embodiment, an automated apparatus accomplishes the test of multiple parts, systems or subsystems within an operational system, subsystem or devices simultaneously for the existence or execution of malware, out-of-date drivers, improper firmware versions and improper software generally.

In another exemplary embodiment, an apparatus non-destructively inspects an integrated circuit, operational system, subsystem or devices to screen for malware, malicious software, firmware, out of date software version, improperly configured software, software version number, undesired software version number, non-updated or old software version number, enabled software features, or disabled software features, proper or improper software device drivers, proper match of detected software drivers with detected hardware peripherals, enabled software, disabled software, and/or approximate system CPU allocation percentage, software or malware usage statistics, software or malware usage correlation patterns, execution occurrences and/or software removal for each piece of identified software, firmware or hardware.

In another exemplary embodiment, an apparatus remotely logs the execution or use of specific software, specific software state, or specific software routine contained within specific software on a system, for future hardware or software upgrade considerations, for security purposes, for research into user software feature use, for user time spent using a specific feature, for system resources needed while using a specific feature or function, for overall system or subsystem use, for separate software interaction patterns, for user software use patterns, for system energy usage, for accumulated power usage, and/or for billing purposes.

In another exemplary embodiment, an apparatus detects malware or improper software execution patterns in electrical and electronic devices that eliminates complex testing of multiple electronic components or subsystems employed within electrical and electronic devices.

In another exemplary embodiment, an apparatus or method inspects fully populated circuit boards to determine if the board contains the proper software or firmware when compared to a modified or unmodified standard.

In another exemplary embodiment, an apparatus or method inspects a fully populated circuit board to determine if the board has any improper or undesired software in any parts or subsystems.

In another exemplary embodiment, an apparatus inspects fully populated circuit board and determines specifically what improper software is associated with which parts on the board and which parts contain proper, desired or authentic software, firmware or hardware patterns.

In another exemplary embodiment, an apparatus detects malware, malicious hardware or improperly versioned software introduced into components that may reside on a partially populated circuit board or during steps in a manufacturing process on a circuit board before the board is fully populated.

In another exemplary embodiment, the software, firmware or hardware inspection process is achieved by only applying power to the fully or populated circuit board.

In another exemplary embodiment, an apparatus tests embedded malware, firmware or undesired software in circuit boards by applying only power to the circuit board.

In another exemplary embodiment, determination of the cause or category of fault conditions, especially at startup, is achieved by examining the emissions of the device under test and comparing said emissions to emissions of known good devices or devices in known fault configurations for diagnostic purposes to determine the category or cause of startup failure or status including recommending further actions to be taken to repair or optimize said startup configuration, especially directed towards personal computer diagnostics. The comparisons being a single comparison, sequence of comparisons, comparisons expected at specific time intervals after startup or after a device state change, or trees of operational mode possibilities searched and tracked by their matching associated identifying emissions.

In another exemplary embodiment, an apparatus determines expected operability of a device or system undergoing assembly and which has not yet been completed. This also enables corrective steps to be taken early in the manufacturing process where corrective action is less costly.

In another exemplary embodiment, an apparatus identifies presence of any malicious software, malicious firmware, or undesired software in a wholly assembled product that contains multiple boards, components, integrated circuits.

In another exemplary embodiment, an apparatus detects proper or improper software, firmware, hardware or malware in electrical and electronic devices that eliminates complex testing of entire functionality of an electrical or electronic component or device.

In another exemplary embodiment, power is only applied to an electronic component, fully populated circuit board, a series of connected circuit boards or a fully assembled product for the detection of modified or unmodified electronics with the item being inspected or screened for improper software or improper operation.

In another exemplary embodiment, a method is provided for detecting malware, proper or improper software, or a resulting indication in electrical and electronic devices that includes the step of injecting one and only one signal into the electrical and electronic device under test.

In another exemplary embodiment, a method is provided for detecting malware, proper or improper software in electrical and electronic devices that includes the step of injecting only a combination of a power signal and a monotonic oscillating signal into the electrical and electronic device under test.

In another exemplary embodiment, a method is provided for detection of malware being in the process of received and/or introduced into electrical and/or electronic devices that includes the continuous monitoring of emissions from circuitry which can be used to receive software changes.

In another exemplary embodiment, a method is provided for active disablement of a system containing detected malware in electrical and electronic devices that includes the continuous monitoring of emissions from circuitry which can be used to receive software changes.

In another exemplary embodiment, a method is provided for detection of malware, unexpected software, or expected software, while being in the process of received and/or introduced into electrical and electronic devices that includes the continuous monitoring of emissions from circuitry which can be used to receive software changes, and further preventing the completion of said malware from being fully introduced into the system by interrupting reception or interrupting the software update operation.

In another exemplary embodiment, an apparatus detects a change in system, component, or subsystem operation as a result of malware activity.

In another exemplary embodiment, an apparatus detects viruses, Trojan horses, Rootkits, spyware, adware, scareware, worms, zombie computers, privacy-invasive software, and backdoors.

In another exemplary embodiment, a completed board or system is analyzed to determine what component versions are present and operational, and/or if all subsystems and functionality is present using their emitted signatures.

In another exemplary embodiment, a completed board or system is analyzed to determine the relative or absolute location of a software or hardware component based on its emissions or a comparison of its emissions with a known standard.

In another exemplary embodiment, a digital signal input is provided to an electronic device, complete board or system to invoke a state which presents unintended RF emissions which are then received to determine the modified or unmodified nature of software, firmware or hardware executing on the an electronic device, complete board or system.

In another exemplary embodiment, an apparatus detects occurrences of modifying DRAM memory contents using unusual means such as by deliberately excessively accessing, reading or writing to those registers, adjacent register addresses or those nearby using techniques such as the Rowhammer exploit. Attempts are detected at repetitive access to change bit contents or damage memory, detecting attempts to inject code which when ran will attempt to perform the exploit, detect successful exploit condition and detect use of exploit during system operation.

Another exemplary embodiment provides an apparatus collecting unintendedly emitted electromagnetic energy, wherein the apparatus uses electronic device information derived from the expected operating parameters of the device being tested to assess that the electronic device being tested has at least one of authentic physical hardware, firmware and software by measuring at least one unintended emission given off by the electronic device.

Another exemplary embodiment provides an unintended electronic emission measurement device comprising an apparatus capable of capturing Unintended electromagnetic energy, a means for collecting and filtering the captured unintended electromagnetic energy, a means for assessing the regions where filtering occurs and converting the filtered energy into a digital means while maintaining substantial equity of the spectral characteristics of collected unintended electromagnetic energy wherein the apparatus capable of collecting unintended electromagnetic energy is capable of maintaining the characteristics of the collected unintended electromagnetic energy from 0.01 Hertz Resolution Bandwidth through 1000 Hertz resolution bandwidth wherein this data is used to assess that the electronic device being tested has at least one of authentic firmware and software by measuring at least one unintended emission given off by the electronic device.

Another exemplary embodiment provides an electronic unintended emission measurement device comprising an apparatus capable of capturing Unintended electromagnetic energy, a means for collecting and filtering the captured unintended electromagnetic energy, a means for assessing the regions where filtering occurs and converting the filtered energy into a digital means while maintaining substantial equity of the spectral characteristics of collected electromagnetic energy wherein the apparatus capable of collecting electromagnetic energy is capable of maintaining the characteristics of the collected electromagnetic energy from 0.01 Hertz Resolution Bandwidth through 1000 Hertz resolution bandwidth wherein this data is used to assess that the electronic device being tested has at least one of authentic instantiated circuitry, modified software, and unmodified software in an integrated circuit by measuring at least one unintended emission given off by the electronic device.

Another exemplary embodiment provides an unintended electronic emission measurement device for detecting malicious software, malicious firmware and malicious circuitry comprising an apparatus collecting unintended electromagnetic energy, a means for developing anticipated spectral characteristics of collected unintended electromagnetic energy wherein the apparatus capable of collecting electromagnetic energy uses electronic device information derived from the expected operating parameters of the device being tested to assess that the electronic device being tested has at least one of authentic physical hardware, firmware and software by measuring at least one unintended emission given off by the electronic device.

Another exemplary embodiment provides an electronic unintended emission measurement apparatus for detecting malicious software, malicious firmware and malicious circuitry comprising a receiver capturing unintended electromagnetic energy, a means for collecting and filtering the captured unintended electromagnetic energy, a means for assessing the regions where filtering occurs and converting the filtered energy into a digital means while maintaining substantial equity of the spectral characteristics of collected unintended electromagnetic energy wherein the apparatus maintains the characteristics of the collected electromagnetic energy from 0.01 Hertz Resolution Bandwidth through 1000 Hertz resolution bandwidth wherein this data is used to assess that the electronic device being tested has at least one of authentic firmware and software by measuring at least one unintended emission given off by the electronic device.

Another exemplary embodiment provides an electronic unintended emission measurement device for detecting malicious software, malicious firmware and malicious circuitry comprising an apparatus capable of capturing unintended electromagnetic energy, a means for collecting and filtering the captured unintended electromagnetic energy, a means for assessing the regions where filtering occurs and converting the filtered energy into a digital means while maintaining substantial equity of the spectral characteristics of collected Unintended electromagnetic energy wherein the apparatus capable of collecting unintended electromagnetic energy is capable of maintaining the characteristics of the collected unintended electromagnetic energy from 0.01 Hertz Resolution Bandwidth through 1000 Hertz resolution bandwidth wherein this data is used to assess that the electronic device being tested has at least one of authentic instantiated circuitry in an integrated circuit by measuring at least one unintended emission given off by the electronic device.

Another exemplary embodiment provides a means of further receiving the unintended emissions from actively running Dynamic Memory Chips indicating the content of data memory patterns in the memory of the chips and comparing the patterns with known patterns of one of malicious software, malicious firmware and malicious circuitry functioning in physical hardware, firmware and software to determine the probability of their containing at least one of Malicious Software, Malicious Firmware and Malicious Circuitry.

Another exemplary embodiment provides an apparatus comprising: an antenna, a receiver, configured, in combination with the antenna, to receive at least one unintended emission of an unintended electromagnetic energy, the at least one unintended emission being given off by at least one electrical device; at least one processor; wherein the processor is operable to monitor the at least one electrical device by measuring and processing a change or changes in a signature of the at least one electromagnetic unintended emission; and wherein the device is configured to determine malicious software, malicious firmware and malicious circuitry of a component of the at least one electrical device based on the signature change or changes.

Another exemplary embodiment provides an apparatus comprising an antenna, a receiver, configured, in combination with the antenna, to receive at least one unintended emission of an Unintended electromagnetic energy, the at least one unintended emission being given off by at least one electrical device; one or more processors; and a non-transitory computer readable medium comprising executable instructions that, when executed by the one or more processors, cause the one or more processors to perform the steps of measuring and processing a change or changes in a signature of the at least one electromagnetic Unintended emission, and determining at least one of malicious software, malicious firmware and malicious circuitry of the at least one electrical device.

Another exemplary embodiment provides an apparatus comprising: an antenna, a receiver, configured, in combination with the antenna, to receive at least one unintended emission of an unintended electromagnetic energy, the at least one unintended emission being given off by at least one semiconductor device; at least one processor; wherein the device is configured to passively measure and process a change or changes in a signature of the at least one unintended electromagnetic emission and is further configured to assess at least one of a determine malicious software, malicious firmware and malicious circuitry of the at least one semiconductor device either during manufacturing of the at least one semiconductor device, during manufacturing of an assembly containing the at least one semiconductor device or during a quality control inspection.

Another exemplary embodiment provides an apparatus comprising: (a) an antenna, (b) a receiver, configured, in combination with the antenna, to receive at least one unintended emission of an Unintended electromagnetic energy, the at least one unintended emission being given off by at least one electrical device without an aid from a hardwire connection, (c) at least one processor, wherein the device is configured to measure and process change or changes in a signature of the at least one electromagnetic unintended emission and is further configured to monitor a level of probability of the existence of Malicious Software, Malicious Firmware and Malicious Circuitry in the at least one electrical device.

Another exemplary embodiment provides an apparatus comprising: a housing sized to be held by a hand of a user; an antenna disposed within the housing, a receiver disposed within the housing, the receiver configured, in combination with the antenna, to receive at least one unintended emission of an unintended electromagnetic energy, the at least one unintended emission being given off by at least one electrical device, at least one processor disposed within the housing, and wherein the device is configured to determine at least one of malicious software, malicious firmware and malicious circuitry of the device with at least one electromagnetic unintended emission.

Another exemplary embodiment provides an apparatus containing at least one processor comprises a Field Programmable Gate Array (FPGA) processor configured to conduct an initial processing of a targeted analog signal and wherein the at least one processor further comprises a general purpose processor (GPU) coupled to the FPGA processor and configured to perform higher level processing of the analog signal, the higher level processing including at least one of comparing the signal to a predetermined signature, accessing a non-volatile memory provided within the device so as to store historical records, and interfacing with a user.

Another exemplary embodiment provides an apparatus wherein the FPGA processor is further configured to transform an analog representation of the waveform of the emitted spectrum from the at least one electrical device to a digital signal representing a frequency signal in a frequency domain of interest.

Another exemplary embodiment provides a device further comprising a cascade integrated comb (CIC) filter configured to decimate an analog signal, and wherein the FPGA processor is further configured to apply Fast Fourier Transform (FFT) to the analog signal.

Another exemplary embodiment provides an apparatus wherein the FPGA and GPU are configured to process the frequency domain and are further configured to identify inconsistencies in the digital waveform from an anticipated waveform.

Another exemplary embodiment provides an apparatus comprising: an antenna, a receiver, configured, in combination with the antenna, to receive at least one unintended emission of an Unintended electromagnetic energy, the at least one Unintended emission being given off by at least one electrical device; at least one processor; wherein the apparatus is configured to monitor the at least one electrical device by measuring and processing a change or changes in a signature of the at least one electromagnetic unintended emission; and wherein the apparatus is configured to determine malicious software, malicious firmware and malicious circuitry of a component of the at least one electrical device based on the signature change or changes.

Another exemplary embodiment provides an apparatus comprising: an antenna, a receiver, configured, in combination with the antenna, to receive at least one unintended emission of an unintended electromagnetic energy, the at least one unintended emission being given off by at least one electrical device; at least one processor; wherein the apparatus is configured to monitor the at least one electrical device by measuring and processing a change or changes in a signature of the at least one electromagnetic unintended emission; and wherein the apparatus is configured, based on the signature changes, to determine malicious software, malicious firmware and malicious circuitry of the at least one electrical device.

Another exemplary embodiment provides an apparatus comprising: an antenna, a receiver or sensor, configured, in combination with the antenna, to receive at least one unintended emission of an unintended electromagnetic energy, the at least one Unintended emission being given off by at least one semiconductor device; at least one processor; wherein the apparatus is configured to passively measure and process a change or changes in a signature of the at least one unintended electromagnetic emission from the receiver and is further configured to assess at least one of a determine malicious software, malicious firmware and malicious circuitry of the at least one semiconductor device either during manufacturing of the at least one semiconductor device, during manufacturing of an assembly containing the at least one semiconductor device or during a quality control inspection.

Another exemplary embodiment provides an apparatus comprising: (a) an antenna, (b) a receiver, configured, in combination with the antenna, to receive at least one unintended emission of an Unintended electromagnetic energy, the at least one unintended emission being given off by at least one electrical device without an aid from a hardwire connection, (c) at least one processor, wherein the apparatus is configured to measure and process change or changes in a signature of the at least one electromagnetic unintended emission and is further configured to monitor a probability of malicious software, malicious firmware and malicious circuitry of the at least one electrical device.

Another exemplary embodiment provides an apparatus comprising: a housing sized to be held by a hand of a user; an antenna disposed within the housing, a receiver disposed within the housing, the receiver configured, in combination with the antenna, to receive at least one unintended emission of an unintended electromagnetic energy, the at least one unintended emission being given off by at least one electrical device, at least one processor disposed within the housing, and wherein the apparatus is configured to measure and process change or changes in a signature of the at least one electromagnetic Unintended emission to determine at least one of modified Software, unmodified software, Malicious Firmware, non-Malicious Firmware, non-Malicious Circuitry, and Malicious Circuitry.

Another exemplary embodiment provides an apparatus wherein the at least one processor comprises a Field Programmable Gate Array (FPGA) processor configured to conduct an initial processing of a targeted analog signal and wherein the at least one processor further comprises a general purpose processor (GPU) coupled to the FPGA processor and configured to perform higher level processing of the analog signal, the higher level processing including at least one of comparing the signal to a predetermined signature, accessing a non-volatile memory provided within the device so as to store historical records, and interfacing with a user.

Another exemplary embodiment provides an apparatus wherein the FPGA processor is further configured to transform a digital waveform of the emitted spectrum from the at least one electrical device to a frequency domain of interest.

Another exemplary embodiment provides an apparatus further comprising a cascade integrated comb (CIC) filter configured to decimate a frequency signal, and wherein the FPGA processor is further configured to apply Fast Fourier Transform (FFT) to the frequency signal.

Another exemplary embodiment provides an apparatus wherein the FPGA and GPU are configured to process the frequency domain and are further configured to identify inconsistencies in the digital waveform from an anticipated waveform.

Another exemplary embodiment provides an apparatus, wherein the receiver is a radio frequency (RF) receiver configured to extract a desired target frequency from a raw signal received from the antenna.

Another exemplary embodiment provides an apparatus, wherein the at least one processor includes a Field Programmable Gate Array (FPGA) configured to convert the target frequency to a baseband frequency.

Another exemplary embodiment provides an apparatus, wherein the at least one processor is configured to extract a desired target frequency from a raw signal received from the antenna.

Another exemplary embodiment provides an apparatus, wherein the at least one processor is configured to transform a digital waveform of the emitted spectrum from the at least one electrical device to a frequency domain of interest.

Another exemplary embodiment provides a computer-implemented method comprising: receiving an unintended electromagnetic energy emission from a source with an antenna connected to a receiver; and using a processor to: select a candidate harmonic of a device from an expected spectral region of the Unintended electromagnetic energy emission, use a frequency location of the candidate harmonic to determine frequency locations of additional harmonics, identify, from the received Unintended electromagnetic energy emission, at least two of the additional harmonics, measure a phase of each harmonic, and compare the measured phases to determine malicious software, malicious firmware and malicious circuitry.

Another exemplary embodiment provides an apparatus, wherein the method is used to locate or geolocate the malicious software, malicious firmware and malicious circuitry.

Another exemplary embodiment provides a computer-implemented method used to determine an instantaneous phase of an underlying source signal to identify at least one determine malicious software, malicious firmware and malicious circuitry.

Another exemplary embodiment provides a computer-implemented method used to differentiate harmonic content of the source from electro-magnetic background noise.

Another exemplary embodiment provides a computer-implemented method used for detection of at least one electronically triggered event associated with malicious software, malicious firmware and malicious circuitry.

Another exemplary embodiment provides a computer-implemented method used to perform diagnostics on an electronic device, an electrical component, and a combination thereof for determine malicious software, malicious firmware and malicious circuitry.

Another exemplary embodiment provides a computer-implemented method further comprising the step of actively illuminating the device to determine malicious software, malicious firmware and malicious circuitry.

Another exemplary embodiment provides a computer-implemented method used to identify that a set of harmonics are all related to a specific class of electronic device to determine malicious software, malicious firmware and malicious circuitry.

Another exemplary embodiment provides a computer-implemented method is used to identify that a set of harmonics are all related to a specific electronic device with malicious software, malicious firmware and malicious circuitry.

Another exemplary embodiment provides a computer-implemented method used to aid in RF spectroscopy.

Another exemplary embodiment provides a computer-implemented method wherein the source is an electrical device.

Another exemplary embodiment provides a computer-implemented method wherein the processor is further used to add an error term to each phase measurement and change the each phase measurement to a phase range measurement.

Another exemplary embodiment provides a computer-implemented method wherein the processor is further used to calculate a time vector for each harmonic and to plot time vectors in a time-domain waveform.

Another exemplary embodiment provides a computer-implemented method wherein the processor is further used to intersect the time vectors, to identify an intersecting vector and to determine a value of the intersecting vector.

Another exemplary embodiment provides a computer-implemented method wherein the processor is further used to classify the Unintended electromagnetic energy emission as interference in absence of the frequency locations for the at least two additional harmonics.

Another exemplary embodiment provides an apparatus comprising: an antenna, a receiver connected to the antenna and configured to receive an Unintended electromagnetic energy emission, and at least one processor configured to: select a candidate harmonic of a device from an expected spectral region of the Unintended electromagnetic energy emission, use a frequency location of the candidate harmonic to determine frequency locations of additional harmonics, identify, from the received Unintended electromagnetic energy, at least two of the additional harmonics, measure a phase of each harmonic, and compare the measured phases to at least one of identify the device containing malicious software, malicious firmware and malicious circuitry.

Another exemplary embodiment provides an apparatus wherein the electromagnetic emission measurement device is configured to include an analog to digital converter that is part of a receiver, part of the at least one processor, or implemented as a stand-alone component and a combination thereof.

Another exemplary embodiment provides an apparatus wherein the processor is further configured to add an error term to each phase measurement and change the each phase measurement to a phase range measurement.

Another exemplary embodiment provides an apparatus wherein the processor is further configured to calculate a time vector for each harmonic and to plot time vectors in a time-domain waveform.

Another exemplary embodiment provides an apparatus wherein the processor is further configured to intersect the time vectors, to identify an intersecting vector and to determine a value of the intersecting vector.

Another exemplary embodiment provides an apparatus wherein the processor is configured to classify the Unintended electromagnetic energy emission as interference in absence of the frequency locations for the at least two additional harmonics.

Another exemplary embodiment provides a method comprising the steps of: (a) receiving unique harmonic spectral regions of an Unintended electromagnetic energy emission with an antenna connected to a receiver; (b) selecting, with a processor, from an expected spectral region of frequencies received in step (a), a candidate harmonic of a device; (c) determining, with the processor, a frequency location of the candidate harmonic; (d) determining, with the processor from the unique harmonic spectral regions received in step (a) and based on the frequency location of the candidate harmonic determined in step (c), frequency locations for at least two additional harmonics, each from a respective unique spectral region received in step (a); (e) measuring, with the processor, phase values of the candidate and the at least two other harmonics selected or determined in steps (b) and (d); and (f) determining, with the processor in accordance with at least one logic algorithm, a time phase relationship of the candidate and the at least two additional harmonics to identify the device as containing malicious software, malicious firmware and malicious circuitry.

Another exemplary embodiment provides an apparatus comprising: a receiver, an electromagnetic source for enhancing at least one RF emission signature, wherein the receiver is configured to least one of detect and locate at least one electronic device by measuring at least one unintended enhanced RF emission given off by the at least one electronic device and enhanced by the electromagnetic source, wherein the receiver is positioned on a first platform and the electromagnetic source is positioned on a second platform, the first platform and the second platform being coordinated to improve performance of the malicious software, malicious firmware and malicious circuitry measurement device.

Another exemplary embodiment provides an apparatus comprising: a receiver, wherein the receiver is configured to least one of detect and locate at least one electronic device by passively measuring without active illumination at least one Unintended RF emission given off by the at least one electronic device, wherein the apparatus is used on a malicious software, malicious firmware and malicious circuitry containing device to verify that the device contains such malicious elements.

Another exemplary embodiment provides an apparatus comprising: a receiver, wherein the receiver is configured to least one of detect and locate at least one device containing malicious software, malicious firmware and malicious circuitry by passively measuring without active illumination at least one Unintended RF emission given off by the at least one electronic device, wherein the RF emission measurement device verifies the described malicious nature.

Another exemplary embodiment provides an apparatus comprising: a receiver, an electromagnetic source for enhancing at least one RF emission signature, wherein the receiver is configured to least one of detect and locate a device containing malicious software, malicious firmware and malicious circuitry by measuring at least one unintended enhanced RF emission given off by the at least one electronic device and enhanced by the electromagnetic source, wherein the RF emission measurement device operates in an active automated detection mode and a passive automated detection mode with correlation between the active automated detection mode and the passive automated detection mode.

Another exemplary embodiment provides an apparatus comprising: a receiver, an electromagnetic source for enhancing at least one RF emission signature, wherein the receiver is configured to least one of detect and locate at least one device containing malicious software, malicious firmware and malicious circuitry by measuring at least one unintended enhanced RF emission given off by the at least one electronic device and enhanced by the electromagnetic source, wherein the RF emission measurement device operates in an active automated detection mode and a passive automated detection mode with correlation between the active automated detection mode and the passive automated detection mode for detection of at least two targets.

Another exemplary embodiment provides a RF emission measurement device comprising: a receiver, an electromagnetic source for enhancing at least one RF emission signature, wherein the receiver is configured to least one of detect and locate at least one device containing malicious software, malicious firmware and malicious circuitry by measuring at least one unintended enhanced RF emission given off by the at least one electronic device and enhanced by the electromagnetic source, wherein the RF emission measurement device is positioned on a ground based robot.

Another exemplary embodiment provides a RF emission measurement device comprising: a receiver, an electromagnetic source for enhancing at least one RF emission signature, wherein the receiver is configured to least one of detect and locate at least one device containing malicious software, malicious firmware and malicious circuitry by measuring at least one unintended enhanced RF emission given off by the at least one electronic device and enhanced by the electromagnetic source, wherein the RF emission measurement device is positioned on a robot and quantifies a response that generates suppression.

Another exemplary embodiment provides a RF emission measurement device comprising: a receiver, an electromagnetic source for enhancing at least one RF emission signature, wherein the receiver is configured to least one of detect and locate at least one electronic device by measuring at least one Unintended enhanced RF emission given off by the at least one electronic device and enhanced by the electromagnetic source, wherein the RF emission measurement device determines existence of malicious software, malicious firmware and malicious circuitry.

Another exemplary embodiment provides an apparatus comprising: a receiver, an electromagnetic source for enhancing at least one RF emission signature, wherein the receiver is configured to least one of detect and locate at least one electronic device by measuring at least one unintended enhanced RF emission given off by the at least one electronic device and enhanced by the electromagnetic source, wherein the apparatus correlates measurements between active and passive detection for detection of devices containing malicious software, malicious firmware and malicious circuitry.

Another exemplary embodiment provides an apparatus comprising: a receiver, an electromagnetic source for enhancing at least one RF emission signature, wherein the receiver is configured to least one of detect and locate at least one electronic device by measuring at least one unintended enhanced RF emission given off by the at least one electronic device and enhanced by the electromagnetic source, wherein the apparatus is used to perform detection of a device containing malicious software, malicious firmware and malicious circuitry.

Another exemplary embodiment provides an apparatus comprising: a receiver, wherein the receiver is configured to least one of detect and locate at least one electronic device by passively measuring without active illumination at least one unintended RF emission given off by the at least one electronic device, wherein the RF emission measurement device is used to perform malicious software, malicious firmware and malicious circuitry diagnostics.

Another exemplary embodiment provides a RF emission measurement device comprising: a receiver, an electromagnetic source for enhancing at least one RF emission signature, wherein the receiver is configured to least one of detect and locate at least one device containing malicious software, malicious firmware and malicious circuitry by measuring at least one unintended enhanced RF emission given off by the at least one electronic device and enhanced by the electromagnetic source, wherein the receiver is positioned on a first platform and continuously monitors the RF emissions; the electromagnetic source positioned on a robot provides illumination, suppression and neutralization by advancing toward the electronic device or a beam steering means.

Another exemplary embodiment provides an apparatus comprising: a receiver, an electromagnetic source for enhancing at least one RF emission signature, wherein the receiver is configured to least one of detect and locate and verify a device containing malicious software, malicious firmware and malicious circuitry of at least one electronic device by measuring at least one unintended enhanced RF emission given off by the at least one electronic device and enhanced by the electromagnetic source, wherein the receiver is positioned on a first platform and the electromagnetic source is positioned on a second platform, the first platform and the second platform being coordinated to improve performance of the RF emission measurement device.

Another exemplary embodiment provides an apparatus comprising: a receiver, wherein the receiver is configured to at least one of detect and locate at least one electronic device containing malicious software, malicious firmware and malicious circuitry by passively measuring without active illumination at least one unintended RF emission given off by the at least one electronic device, wherein the RF emission measurement device is used to verify that the at least one electronic device is no longer operating.

Another exemplary embodiment provides an apparatus comprising: a receiver, wherein the receiver is configured to at least one of detect and locate at least one electronic device containing malicious software, malicious firmware and malicious circuitry by passively measuring without active illumination at least one unintended RF emission given off by the at least one electronic device, wherein the RF emission measurement device is used to verify that the at least one electronic device is suppressed.

Another exemplary embodiment provides an apparatus comprising: a receiver, an electromagnetic source for enhancing at least one RF emission signature, wherein the receiver is configured to least one of detect and locate at least one device containing malicious software, malicious firmware and malicious circuitry by measuring at least one unintended enhanced RF emission given off by the at least one explosive device and enhanced by the electromagnetic source, wherein the RF emission measurement device operates in an active automated detection mode and a passive automated detection mode with correlation between the active automated detection mode and the passive automated detection mode.

Another exemplary embodiment provides an apparatus comprising: a receiver, an electromagnetic source for enhancing at least one RF emission signature, wherein the receiver is configured to least one of detect and locate at least one electronic device containing malicious software, malicious firmware and malicious circuitry by measuring at least one unintended enhanced RF emission given off by the at least one electronic device and enhanced by the electromagnetic source, wherein the RF emission measurement device verifies suppression of the at least one electronic device.

Another exemplary embodiment provides an apparatus comprising: a receiver, an electromagnetic source for enhancing at least one RF emission signature, wherein the receiver is configured to least one of detect and locate at least one electronic device containing malicious software, malicious firmware and malicious circuitry by measuring at least one unintended enhanced RF emission given off by the at least one electronic device and enhanced by the electromagnetic source, wherein the RF emission measurement device correlates measurements between active and passive detection for electronic device detection.

Another exemplary embodiment provides an apparatus comprising: a receiver, wherein the receiver is configured to least one of detect and locate at least one electronic device by passively measuring without active illumination at least one unintended RF emission given off by the at least one electronic device containing malicious software, malicious firmware and malicious circuitry, and wherein the at least one Unintended RF emission is compared to at least two received RF emissions.

Another exemplary embodiment provides an apparatus comprising: a receiver, wherein the receiver is configured to least one of detect and locate at least one electronic device by passively measuring without active illumination at least one unintended RF emission given off by the at least one electronic device containing malicious software, malicious firmware and malicious circuitry, and wherein the at least one unintended RF emission is compared to at least two separately received pre-collected RF emissions.

Another exemplary embodiment provides an apparatus wherein the at least one electronic device is neutralized by means of active illumination.

Another exemplary embodiment provides an apparatus for measuring at least one of an unintended electromagnetic emissions signature and an intended electromagnetic emissions signature for at least one of enabling electromagnetic location of predetermined electronic equipment giving off the at least one of the unintended electromagnetic emissions signature and the intended electromagnetic emissions signature, at least one of tagging such predetermined electronic equipment by increasing power incident thereto, identifying such predetermined electronic equipment and tracking such predetermined electronic equipment and a combination thereof, the apparatus comprising: (a) an emitter means for causing at least one a changed frequency content and amplification of the at least one of the unintended electromagnetic emissions signature and the intended electromagnetic emissions signature of a targeted electronic device by the emitter means providing an amplified unintended electromagnetic energy to generate an applied electromagnetic field, and the emitter means further for at least one of enabling location of such targeted electronic device, tagging such targeted electronic device by increasing power incident thereto, identifying such targeted electronic device, and tracking such targeted electronic device; and (b) a receiver for measuring the at least one of the unintended electromagnetic emissions signature and the intended electromagnetic emissions signature for at least one of the location, tagging, identifying, and tracking of such targeted electronic device containing malicious software, malicious firmware and malicious circuitry.

Another exemplary embodiment provides an apparatus, wherein the applied electromagnetic field generated by the emitter means is at least one of in a form of a microwave source, high power microwaves, pulsed high power microwaves, a non-nuclear electromagnetic pulse, a radio frequency source, a pulsed radio frequency source, a millimeter source and radar.

Another exemplary embodiment provides an apparatus, wherein the emitter means further includes means for utilizing amplification of the emission signatures of such targeted electronic device through semiconductor component degradation to the at least one of locate, tag, identify and track such targeted electronic device containing malicious software, malicious firmware and malicious circuitry.

Another exemplary embodiment provides an apparatus, wherein the semiconductor component degradation is accomplished by an external RF energy.

Another exemplary embodiment provides an apparatus, wherein field strengths necessary to cause a desired response is insufficient to cause at least one of circuit degradation and failure and the apparatus further includes a means electrically connected to the emitter means for enabling lower field strengths with specific intents to be used to alter at least one circuit function thereby substantially causing emissions that adequately provide an emission signature that is at least sufficient to at least one of locate, identify and track such predetermined electronic equipment containing malicious software, malicious firmware and malicious circuitry.

Another exemplary embodiment provides an apparatus, wherein such predetermined electronic equipment contains at least one of an oscillator, a voltage control oscillator, a ceramic resonator, a local oscillator, and a stable local oscillator.

Another exemplary embodiment provides an apparatus, wherein the means electrically connected to the emitter means for enabling lower field strengths with specific intents to be used to alter at least one circuit function affects a clock in such predetermined electronic equipment.

Another exemplary embodiment provides an apparatus, wherein the clock harmonics are affected.

Another exemplary embodiment provides an apparatus, wherein the means electrically connected to the emitter means for enabling lower field strengths with specific intents to be used to alter at least one circuit function affects a clock in such predetermined electronic equipment by coupling to at least one of such clock's ground and to output traces of such clock.

Another exemplary embodiment provides an apparatus wherein the receiver samples electromagnetic emissions of such predetermined electronic equipment and the emitter means emits energy at frequencies selected based on anticipated characteristics of such predetermined electronic equipment.

Another exemplary embodiment provides an apparatus wherein the frequencies correspond to such clocks of such predetermined electronic equipment.

Another exemplary embodiment provides an apparatus, wherein the means electrically connected to the emitter means for enabling lower field strengths with specific intents to be used to alter at least one circuit function affects a semiconductor in such predetermined electronic equipment by coupling to at least one of a ground and to output traces of such semiconductor.

Another exemplary embodiment provides an apparatus, wherein the apparatus affects a harmonic content of a switching power supply.

Another exemplary embodiment provides an apparatus, wherein the apparatus affects a harmonic content of a semiconductor device.

Another exemplary embodiment provides a measuring apparatus, wherein the predetermined electronic components emissions are one of at a same, multiple and sub multiple of a frequency of an unintended electromagnetic energy of the emitter.

Another exemplary embodiment provides a measuring apparatus, wherein the predetermined electronic components emissions are broadband.

Another exemplary embodiment provides a measuring apparatus, wherein an Unintended electromagnetic energy of the emitter is at least one of tuned to and amplify electromagnetic emissions of such predetermined electronic component by an applied electromagnetic field generated by the emitter.

Another exemplary embodiment provides an apparatus, wherein such targeted device emissions signature received by the receiver is used specifically to tune the emitter to frequencies contained within such targeted device emissions signature to facilitate more efficient coupling of Unintended electromagnetic energy into electronics of such targeted device.

Another exemplary embodiment provides an apparatus, wherein the emitter means impacts such targeted electronics device.

Another exemplary embodiment provides an apparatus, wherein the emitter means causes a failure of the targeted electronics device.

Another exemplary embodiment provides an apparatus wherein the emitter means causes at least one of a failure of such targeted electronics device containing malicious software, malicious firmware and malicious circuitry and at least one of tagging, location, identification and tracking of such targeted electronics device.

Another exemplary embodiment provides a measuring apparatus for obtaining information with respect to at least one of contents and persons in a building, the measuring apparatus comprising: (a) a receiver for tracking a known characteristic signature of a predetermined electronic component possessed by an individual; (b) an emitter means for causing the characteristic signature being tracked to change thereby enabling such information with respect to the at least one of such contents and such persons in such building to be obtained; (c) a portable high power electromagnetic generator for generating a signal; and (d) means engageable with the emitter means for scanning the emitter 360 degrees and facilitating locating such predetermined electronic component device containing Malicious Software, Malicious Firmware and Malicious Circuitry.

Another exemplary embodiment provides a measuring apparatus, wherein the emitter means is remotely located and amplifies an electromagnetic emissions characteristic signal so that the receiver will locate such predetermined electronic component.

Another exemplary embodiment provides a measuring apparatus, wherein the emitter means is positioned on at least one of a platform located in outer space, land and water.

Another exemplary embodiment provides a measuring apparatus, wherein the emitter means is positioned on the platform located in outer space and the apparatus measures an Unintended emission signature of substantially an entire landscape before and after firing of at least one of a directed energy and a radiation type weapon to locate specific emissions signature changes to provide information about equipment at a particular location.

Another exemplary embodiment provides a measuring apparatus, wherein the measuring apparatus is disposed at a predetermined distance from the weapon to at least one of prevent failure and upset of the measuring apparatus and allow continuous monitoring of a measured landscape.

Another exemplary embodiment provides a measuring apparatus, wherein the platform is a high power microwave platform.

Another exemplary embodiment provides a measuring apparatus, wherein the receiver utilizes electromagnetic sources focused on a targeted predetermined electronic component to amplify the characteristic signal.

Another exemplary embodiment provides a measuring apparatus wherein at least one of the receiver and the emitter means is disposed for aerial surveillance.

Another exemplary embodiment provides a method for locating predetermined electronic equipment, the method comprising the steps of: (a) providing a receiver for measuring an unintended electromagnetic emissions signature and an intended electromagnetic signature of a targeted electronic device for locating the predetermined electronic equipment; (b) providing an emitter means for providing an amplified unintended electromagnetic energy for locating the predetermined electronic equipment; and (c) at least one of amplifying at least one of the unintended and an intended electromagnetic emissions signature of such targeted electronic device by using an applied electromagnetic field generated by the emitter means and at least one of shifting a frequency and changing a frequency content of the at least one of the unintended and intended electromagnetic emissions signature for locating the predetermined electronic equipment devices containing malicious software, malicious firmware and malicious circuitry.

Another exemplary embodiment provides a method wherein which includes the additional step of causing such targeted electronic device to emit electromagnetic radiation which enables at least one of better tracking, locating, eavesdropping and causing failure of such targeted electronic device.

Another exemplary embodiment provides a method, includes the additional step of using RF energy from at least one of an RF and a microwave source for enhancing ability to establish characteristics of an emissions source in conjunction with an active high power RF that drives emission signature changes.

Another exemplary embodiment provides a method, including the additional step of causing changes in emission signatures in order to impact remotely such targeted electronic device.

Another exemplary embodiment provides a method, which includes the additional step of measuring a level of field strength necessary to impact such targeted electronic device for use in deciding to use other assets to learn more about the emitter.

Another exemplary embodiment provides a method, which includes the additional step of tuning source of such emission signatures of such targeted electronic device to enable measuring a relative distance of such targeted electronic device from at least one of the receiver and such source.

Another exemplary embodiment provides a method, which includes the additional step of measuring a direction of such emission signatures of such targeted electronic device by sweeping such source across at least one of a number of degrees and radians for measuring a direction of such targeted electronic device from at least one of the receiver and such source.

Another exemplary embodiment provides a method, which includes the additional step of rapidly transforming a source of such characteristic signature into a relatively robust emitter to aid in at least one of tracking and locating such targeted electronic device.

Another exemplary embodiment provides a method, which includes at least one of the additional steps of using integrated passive emission collection techniques and at least one of offensive RF weapons, radar and jammers for at least one of locating and tracking individuals dependent on predetermined electronic devices.

Another exemplary embodiment provides a method, wherein the method includes the additional steps of cataloging in a database at least one of specific signatures of different types of equipment and circuit components and comparing such equipment signature change for at least one of locating and tracking such equipment.

Another exemplary embodiment provides a method wherein a step includes measuring an Unintended electromagnetic radiation of such targeted electronic device and directing unintended electromagnetic energy at such a targeted electronic device at tunable levels in order to locate such targeted electronic device over a wide beam width.

Another exemplary embodiment provides a method, wherein the method includes the additional step of causing at least one of incrementally more degradation and failure of such targeted electronic device.

Another exemplary embodiment provides a method, wherein the method includes the additional step of permanently altering at least one of an amplitude and a frequency characteristic of such Unintended electromagnetic emissions signature such that such electronic equipment is at least one of tagged and identified for future inspection.

Another exemplary embodiment provides a method, wherein the method includes the additional step of tuning the emitter to a non-specific frequency and using the emitter for generating Cross Modulation Products in a targeted electronic device which enables at least one of better tracking, identifying and locating of such targeted electronic device.

Another exemplary embodiment provides a method wherein the method includes the additional step of tuning the emitter specifically to a specific frequency that is emitted from the targeted device which results in shifts in a frequency of emissions of a specific board mounted device in a targeted electronic device by greater than 5 Hz for enabling at least one of better tracking, locating, identifying and eavesdropping of such targeted device.

Another exemplary embodiment provides a system comprising: (a) means for injecting a preselected input into an electrically powered device; and (b) means for determining a condition of the electrically powered device containing software or hardware which is at least one of unmodified and modified, the modified device containing malicious software, malicious firmware and malicious circuitry, the condition defined by an emission of RF energy in response to the preselected input.

Another exemplary embodiment provides the above system containing the condition which also contains at least a discrete component, integrated circuit, circuit board, circuit board assembly, subsystem, system, electronic device and electrical device employing electronic components for operation.

Another exemplary embodiment provides the above system wherein the condition defines at least one of an unmodified and modified device.

Another exemplary embodiment provides the above system wherein the device is at least one of a semiconductor, and integrated circuit and wherein the preselected input injecting means includes a zero insertion force socket, whereby the at least one of semiconductor and integrated circuit is inserted into the zero insertion force socket.

Another exemplary embodiment provides the above system wherein the preselected input is at least one of power and oscillator input and wherein the zero insertion force socket is preconfigured with the at least one of the power and the oscillator input.

Another exemplary embodiment provides the above system wherein the preselected signal inputting means further includes source for generating the oscillator input.

Another exemplary embodiment provides the above system wherein the source is a small atomic frequency standard oscillator.

Another exemplary embodiment provides the above system wherein the means for determining the condition of the electrically powered device includes: (a) a first means for collecting RF energy emitted from the electrically powered device; (b) a second means for matching collected RF energy to a set of predetermined parameters; and (c) a third means for determining if a match to the predetermined set of parameters is sufficient.

Another exemplary embodiment provides the above system wherein the first means includes an automated mechanism for collecting the RF energy from at least one of a board on an automated manufacturing line, a circuit board component mounted on an apparatus that allows for at least one of input, output and power connections.

Another exemplary embodiment provides the above system wherein the first means includes an automated mechanism for collecting the RF energy from the device.

Another exemplary embodiment provides the above system where the automated mechanism includes a robotic arm.

Another exemplary embodiment provides the above system wherein the automated mechanism includes an antenna array positioned a predetermined distance above the device, and wherein the device and the antenna array are mounted for movement relative to one another.

Another exemplary embodiment provides the above system wherein the antenna array includes an integrated Low Noise Amplifier.

Another exemplary embodiment provides the above system wherein the antenna array is an electronically steered antenna array.

Another exemplary embodiment provides the above system wherein the predetermined distance is between about one micrometer and about one centimeter and wherein the automatic mechanism includes an automatic sensor aiding in setting the predetermined distance.

Another exemplary embodiment provides an apparatus for inspecting or screening electrically powered device, the system comprising: (a) means for inputting a preselected signal into the electrically powered device; (b) an antenna array; (c) means for positioning the antenna array at a pre-determined distance above the electrically powered device; (d) means for collecting RF energy emitted by the electrically powered device in response to injection of the preselected input; (e) means for comparing a signature of the emitted RF energy with an RF energy signature of a modified or unmodified part; and (f) means for determining probability of the device containing malicious software, malicious firmware and malicious circuitry of the electrically powered device.

Another exemplary embodiment provides the above system wherein the means for comparing the signature includes at least one of Harmonic Analysis, Matched Filter, Artificial Neural Networks (ANN), specifically multilayer perception (MLP) feed-forward ANN with back propagation (BP), Wavelet Decomposition, Autocorrelation, Spectral Feature Measurements or Statistics, Clustering or Phase Detrending.

Another exemplary embodiment provides the above system wherein the means for processing digitized RF emissions to extract device signatures includes at least one of Discrete Fourier Transform, Fast Fourier Transform, Discrete Cosine Transform, Laplace Transform, Z Transform, Star Transform, Short-Time Fourier Transform, Infinite Impulse Response Filter, Finite Impulse Response Filter, Cascaded integrator-comb filter, Elliptical Filter, Chebyshev Filter, Butterworth Filter, or Bessel Filter.

Another exemplary embodiment provides the an apparatus for inspecting or screening for a device containing malicious software, malicious firmware and malicious circuitry of at least one of an integrated circuit and a device employing the integrated circuit, the system comprising: (a) a precision input generation source configured for driving at least one of a signal input and clock input of the integrated circuit; (b) means for collecting RF energy emitted by the integrated circuit in response to the precision signal generation source; and (c) means for determining one of device containing malicious software, malicious firmware and malicious circuitry condition of the at least one of the integrated circuit and device employing the integrated circuit.

Another exemplary embodiment provides an apparatus for detecting at least one of device containing unmodified Software, unmodified Firmware, unmodified Circuitry, Malicious Software, Malicious Firmware and Malicious Circuitry and a device containing unmodified Software, unmodified Firmware, unmodified Circuitry, Malicious Software, Malicious Firmware and Malicious Circuitry, the apparatus comprising: (a) a high precision input source configured to generate a high precision input for driving at least one of a signal input and a clock input of a powered at least one of the integrated circuit and device employing the integrated circuit, the high precision signal having a frequency thereof being consistent with input requirements of the at least one of the integrated circuit and device employing the integrated circuit; (b) a sensor or receiver positioned in close proximity to the semiconductor, the sensor or receiver configured to receive emissions radiated by the at least one of the integrated circuit and device employing the integrated circuit driven with the precision signal; and (c) a processor coupled to the RF collection means, the processor configured to process a signature of the radiated emission and compare the radiated emission signature against at least one emission signature predetermined for the semiconductor, whereby a resulting match of the comparison defines at least one of a device containing malicious software, malicious firmware and malicious circuitry employing the integrated circuit.

Another exemplary embodiment provides an apparatus, wherein the apparatus includes an antenna array and wherein the sensor or receiver is coupled to the antenna array.

Another exemplary embodiment of the invention provides an apparatus wherein the sensor or receiver is mounted in close proximity to the device containing malicious software, malicious firmware and malicious circuitry employing the integrated circuit.

Another exemplary embodiment provides an apparatus wherein the sensor or receiver has a sensitivity of better than −152 dBm.

Another exemplary embodiment provides a method for differentiating between device containing malicious software, malicious firmware and malicious circuitry, the method comprising the steps of: (a) generating, with a high precision input source, a high precision input; (b) injecting the input into a semiconductor in at least one of a clock input and a signal input; (c) collecting, with an RF collection means, emissions given off by the semiconductor based device in response to the signal injected in step (b); (d) comparing characteristics of the RF emissions, collected in step (c), against baseline RF characteristics of a modified or unmodified semiconductor based device; and (e) determining, based on the comparison, the one of device containing malicious software, malicious firmware and malicious circuitry.

Another exemplary embodiment provides a method further including the step of repeating steps (a) through (c) with different frequency settings on the high precision input injected into the semiconductor based device and the step of comparing RF data collections of at least two measured responses to improve detection of device containing malicious software, malicious firmware and malicious circuitry.

Another exemplary embodiment provides a method further including the step of repeating steps (a) through (c) with different frequency amplitude settings on the input injected into the semiconductor based device and the step of comparing RF data collections of at least two measured responses to improve inspection of potential device containing malicious software, malicious firmware and malicious circuitry.

Another exemplary embodiment provides a method further including the step of repeating steps (a) through (c) with different relative phases between two or more inputs injected into the semiconductor based device and the step of comparing RF data collections of at least two measured responses to improve inspection of device containing malicious software, malicious firmware and malicious circuitry.

Another exemplary embodiment provides a method further including the step of repeating steps (a) through (c) with different frequency settings on the input injected into at least two inputs on the semiconductor based device and comparing RF collection data for each input injected individually to expected signature and injection into all inputs simultaneously.

Another exemplary embodiment provides a method wherein the step of determining the device containing malicious software, malicious firmware and malicious circuitry includes the step of analyzing at least one of frequency locations of emissions components, phases of emissions, cross-modulation and inter-modulation components generated by the internal circuitry, shape of any individual emission, quality factors of any individual emissions or timing characteristics of emissions.

Another exemplary embodiment provides a method wherein a step includes the step of using at least one automated algorithm.

Another exemplary embodiment provides a method further including the step of establishing the baseline RF characteristics representative of the modified or unmodified device NOT containing malicious software, malicious firmware and malicious circuitry.

Another exemplary embodiment provides a method wherein the step of establishing the baseline RF characteristics includes the step of large scale comparison of spectral emissions and the step of reducing the large scale comparison to a single scalar value.

Another exemplary embodiment provides a method wherein the step of establishing the baseline RF characteristics includes the step of obtaining local spectral power density statistics.

Another exemplary embodiment provides a method wherein the step of obtaining local spectral power density statistics includes the step of sampling a plurality of semiconductor based devices and discriminating the plurality of semiconductor based devices based on localized statistical feature measured on each of emissions common between sampled semiconductor based devices.

Another exemplary embodiment provides a method wherein the statistical features includes at least one of Emission Frequency Location, Emission Peak Magnitude, Emission Phase Noise, Emission Symmetry, Skewness, and Emission Local Noise Floor.

Another exemplary embodiment provides a method wherein the step of comparing the characteristics of the RF emissions includes the step of obtaining discrete wavelet transform coefficient statistics.

Another exemplary embodiment provides a method wherein the step of comparing the characteristics of the RF emissions includes the step of obtaining relative phase measurement.

Another exemplary embodiment provides a computer-implemented method wherein the step of comparing the characteristics of the RF emissions includes the step of performing clustering analysis.

Another exemplary embodiment provides a computer-implemented method wherein the step of performing the clustering analysis includes the step of using a Hierarchical Agglomerative Clustering (HAC) algorithm.

Another exemplary embodiment provides a computer-implemented method wherein the step of performing the clustering analysis includes the step of using at least one of a clustering algorithm and a Hierarchical Agglomerative Clustering (HAC) algorithm.

Another exemplary embodiment provides a computer-implemented method wherein the step of comparing the characteristics of the RF emissions includes the step of obtaining discrete wavelet transform coefficient statistics.

Another exemplary embodiment provides a computer-implemented method wherein the step of comparing the characteristics of the RF emissions includes the step of at least one of obtaining relative phase measurement and comparing phase measurement to anticipated phase measurements.

Another exemplary embodiment provides a computer-implemented method further including the step of repeating steps (a) through (c) with identical settings on the high precision input injected into the semiconductor based device and the step of combining, through averaging or other mathematical transform, RF data collections of at least two measured responses to improve the probability of detecting a device containing malicious software, malicious firmware and malicious circuitry inspection.

Another exemplary embodiment provides a computer-implemented method further including the step of repeating steps (a) through (c) with identical settings on the high precision input injected into the semiconductor based device and the step of integrating RF energy across a bandwidth of at least 10 kHz.

Another exemplary embodiment provides a computer-implemented method further including the step of repeating steps (a) through (c) with identical settings on the high precision input injected into the semiconductor based device and the step of using wideband RF emissions to inform further inspection and comparison of RF emission signatures observed in narrow-band RF emission responses.

Another exemplary embodiment provides a computer-implemented method further including the step of repeating steps (a) through (c) with identical settings on the high precision input injected into the semiconductor based device and the step of using narrow-band RF emissions to inform further inspection and comparison of RF emission signatures observed in wideband RF emission responses. A method for at least one of inspecting and screening at least one of an integrated circuit and a device employing the integrated circuit for modifications or unmodified condition thereof, the method comprising the steps of: (a) providing at least an RF energy collection means; (b) positioning the RF energy collection means in close proximity to the integrated circuit; (c) providing a precision signal source; (d) injecting, with the precision signal source, a signal of a first frequency into the integrated circuit; (e) collecting, with the RF energy collection means, first emissions radiated by the integrated circuit in response to the signal of the first frequency injected in step (d); (f) injecting, with the precision signal source, a signal of a second frequency into the integrated circuit; (g) collecting, with the RF energy collection means, a second emissions radiated by the integrated circuit in response to the signal of the second frequency generated in step (f); (h) generating representative signatures of the first and second emissions; (i) determining deviation between the first emission signature and at least one of predetermined emission signature for the integrated circuit; (j) determining deviation between the second emission signature and at least one of predetermined emission signature for the integrated circuit; and (k) detecting, based on the deviation of at least one of first emission signature and second emission signature, the device containing malicious software, malicious firmware and malicious circuitry.

Another exemplary embodiment provides an apparatus for at least one of inspecting or screening semiconductor devices for a device containing Malicious Software, Malicious Firmware and Malicious Circuitry comprising a precision signal source and an RF collection apparatus including an antenna, a receiver, and a processor, wherein the apparatus is configured to characterize any semiconductor in a powered state and responsive to a signal generated by the precision signal source and injected into the semiconductor devices.

Another exemplary embodiment provides an apparatus for at least one of detecting, inspecting and screening at least one device containing Malicious Software, Malicious Firmware and Malicious Circuitry installed on a printed circuit board assembly, the apparatus comprising: (a) a robotic arm; (b) a mechanism for a precision manipulation of the robotic arm over different locations of a printed circuit board; (c) a high precision signal source generating a high precision input for injection into the printed circuit board assembly; (d) an antenna array including a low noise amplifier integrated therewithin; (e) an RF collection means connected to the antenna array, the RF collection means providing sensitivity being sufficient to receive emission radiated by the at least one powered semiconductor based device with at least one the precision input; and (f) a computational means coupled to the RF collection means and configured to at least one of inspect or screen at least one semiconductor based device on at least one printed circuit board.

Another exemplary embodiment provides an apparatus further including an active illumination source configured to illuminates the semiconductor based device that is at least one of detected, inspected or screened with free field RF energy to further enhance the emissions signature of the semiconductor based device.

Another exemplary embodiment provides an apparatus wherein the antenna array, the RF collection means and the computational means are mounted on a semiconducting die substrate and being mounted on a tip of the robotic arm.

Another exemplary embodiment provides an apparatus wherein the high precision input is a multi-tone input injection configured for aiding in developing cross-modulated and intermodulated responses that translate into unique signatures for devices containing malicious software, malicious firmware and malicious circuitry.

Another exemplary embodiment provides a system for inspecting or screening for a device containing malicious software, malicious firmware and malicious circuitry of an electrical or electronic device, the system comprising: (a) a precision signal generation source configured for inputting one and only one oscillating signal into the electrical or electronic device; (b) means for collecting RF energy emitted by the integrated circuit in response to the oscillating signal; and (c) means for determining a device containing malicious software, malicious firmware and malicious circuitry.

Another exemplary embodiment provides a system for electronically steering detection of a device containing malicious software, malicious firmware and malicious circuitry including an antenna and low noise amplifier mounted within an integrated circuit.

Another exemplary embodiment provides an integrated circuit comprising: (a) a die manufactured from a semiconducting material; (b) an RF energy collection and processing means disposed on or within the die and including at least a receiver and a processing means; (c) an input configured to supply power to the RF energy collection and processing means; and (d) an output for operative communication by the RF energy collection and processing means for detecting a device containing malicious software, malicious firmware and malicious circuitry.

Another exemplary embodiment provides the aforementioned integrated circuit, wherein the output is configured to indicate two states of the RF energy collection and processing means, whereby one state is indicative of an RF energy signature substantially matching a predetermined standard and whereby a second state is indicative of the RF energy signature deviating from the predetermined standard device and detecting a device containing malicious software, malicious firmware and malicious circuitry.

Another exemplary embodiment utilizing the aforementioned integrated circuit further includes another input configured to program operation of the RF energy collection and processing means.

Another exemplary embodiment utilizing the aforementioned integrated circuit further includes at least one circuit and at least one discrete component disposed on one of the die and another die and wherein the RF energy collection and processing means is responsive to RF energy emitted by at least one of the at least one circuit and at least one discrete component.

Another exemplary embodiment utilizes the aforementioned integrated circuit wherein the RF energy collection and processing means is configured to detect a device containing malicious software, malicious firmware and malicious circuitry of the at least one circuit and one discrete component by way of a focused ion beam technology.

Another exemplary embodiment utilizing the aforementioned integrated circuit further is mounted within a circuit board assembly and wherein the RF energy collection and processing means is responsive to RF energy emitted by at least one component on the circuit board assembly.

Another exemplary embodiment utilizing the aforementioned integrated circuit is disclosed wherein the RF energy collection and processing means is configured to detect at least one of a device containing malicious software, malicious firmware and malicious circuitry of the at least one component on the circuit board assembly.

Another exemplary embodiment utilizing the aforementioned integrated circuit is mounted within an electrical device including at least one circuit board assembly and wherein the RF energy collection and processing means is configured to detect at least one of a device containing malicious software, malicious firmware and malicious circuitry of the at least one circuit board or an at least one component mounted thereon.

Another exemplary embodiment utilizing the aforementioned integrated circuit further includes an antenna in operative coupling with the RF energy collection and processing means.

Another exemplary embodiment utilizing the aforementioned integrated circuit further includes a configuration wherein the antenna is disposed on or within the die.

Another exemplary embodiment utilizing the aforementioned integrated circuit further is configured to detect at least one electromagnetic signature anomaly in at least one of a die, integrated circuit, electronic component, circuit board, assembly of several circuits' board or a fully assembled product.

Another exemplary embodiment utilizing the aforementioned integrated circuit further includes detection of at least one electromagnetic signature anomaly is the result of at least one of changes to hardware, changes to firmware and changes to software of a device containing malicious software, malicious firmware and malicious circuitry.

Another exemplary embodiment utilizing the aforementioned integrated circuit further comprises: (a) at least one antenna; (b) a die of an integrated circuit composed of an RF energy collection and processing means disposed on a substrate and including a receiver, a processing means and a data storage means; (c) at least one other die having another integrated circuit disposed thereon; and (d) interconnections required to interface the die and the other die to appropriate connection input and output pins on the integrated circuit to determine a device containing malicious software, malicious firmware and malicious circuitry.

Another exemplary embodiment utilizing the aforementioned integrated circuit further includes the die containing the RF energy collection means continuously monitors RF energy emissions of the another die of the another integrated circuit and any changes to the RF energy emissions due to any factors that change the emissions characteristics collected by the RF energy collection means.

Another exemplary embodiment utilizing the aforementioned integrated circuit is configured to provide at least one of modification detection, modification monitoring, unmodification detection, unmodification monitoring, software changes monitoring, and firmware changes monitoring.

Another exemplary embodiment utilizing the aforementioned integrated circuit further includes means for destroying operation of the device in an event of at least one of hardware, firmware or software tampering.

Another exemplary embodiment utilizing the aforementioned integrated circuit further includes a system comprising: (a) a first means for detecting at least one emission; (b) a second means for collecting a set of parameters transmitted through a network by at least one device connectable thereto; and (c) a third means for at least one of detecting, identifying, diagnosing condition of and geolocating the at least one device connectable to the network containing malicious software, malicious firmware and malicious circuitry.

Another exemplary embodiment utilizing the aforementioned integrated circuit further includes a connection between the at least one device and the aforementioned network and wherein the set of parameters identifies at least one of the device and information transmitted therefrom.

Another exemplary embodiment utilizing the aforementioned integrated circuit at one time in communication with the at least one device connectable to the network further includes a communication connection which is one of wireless and wired.

Another exemplary embodiment is configured to operate wherein the at least one emission is at least one of Unintended properties of intended emissions and Unintended emissions.

Another exemplary embodiment is configured to operate wherein the at least one emission is at least one of an Unintended electromagnetic energy, sound and odor.

Another exemplary embodiment is configured to operate wherein the unintended electromagnetic energy is in a Radio Frequency spectrum.

Another exemplary embodiment is configured to operate wherein the at least one emission is at least one of a microwave or millimeter emission.

Another exemplary embodiment is configured to operate wherein the at least one emission is at least one of an infrasonic or ultrasonic emission.

Another exemplary embodiment is configured to operate wherein the at least one device includes at least one electronic component, wherein the at least one emission is an unintended electromagnetic energy and wherein the first means is operable to detect the at least one emission of the unintended electromagnetic energy.

Another exemplary embodiment is configured to detect the at least one emission through at least one wall of a structure.

Another exemplary embodiment is configured to operate wherein the first means includes: (a) an antenna; (b) an emission collection device coupled to the antenna and configured to output an emission signal; and (c) means for processing the emission signal.

Another exemplary embodiment is configured to include a low noise amplifier, a tuner, and a digital to analog converter.

Another exemplary embodiment is configured to operate as a emission collection device with a receiver having at least one receiver channel.

Another exemplary embodiment is configured to operate in a manner wherein the means for processing the emission signal includes: (a) a digital filter; (b) means for processing the emission signal in a time domain; and (c) means for processing the emission signal in a frequency domain independently from the means for processing the emission signal in the time domain.

Another exemplary embodiment is configured to operate in a manner wherein the means for processing the emission signal further includes means for at least reducing noise of the emission signal processed in the frequency domain.

Another exemplary embodiment is configured to operate in a manner further including at least one transform domain so as to enhance detection, identification, geolocation and diagnostics of the at least one device containing malicious software, malicious firmware and malicious circuitry.

Another exemplary embodiment is configured to operate in a manner which further includes means for weighting output from at least one of the means for processing the emission signal in the time domain and the means for processing the signal in the frequency domain.

Another exemplary embodiment is configured to operate in a manner wherein the means for processing the emission signal in the time domain is configured to execute a plurality of algorithms.

Another exemplary embodiment is configured to operate in a manner wherein the means for processing the emission signal in the frequency domain is configured to execute a plurality of algorithms.

Another exemplary embodiment is configured to operate in a manner further including a means for matching the processed emission signal against a template containing at least one emission signature.

Another exemplary embodiment is configured to operate in a manner further including a means for matching the processed emission signal which is configured to execute at least one algorithm.

Another exemplary embodiment is configured to operate in a manner further including a means for matching the processed emission signal is configured to execute at least two algorithms.

Another exemplary embodiment is configured to operate in a manner further including at least two algorithms operating in parallel to each other.

Another exemplary embodiment is configured to operate in a manner further including each of the at least two algorithms operating in parallel to each other processes an independent characteristic of the at least one emission of the at least one device.

Another exemplary embodiment is configured to operate in a manner further including wherein at least two algorithms are orthogonal algorithms.

Another exemplary embodiment is configured to operate in a manner further wherein each of the at least two algorithms operable based on a physically collected data.

Another exemplary embodiment is configured to operate in a manner further including means for weighting output of each of the least two algorithms so as to enhance probability of detection of the at least one device.

Another exemplary embodiment is configured to operate in a manner further wherein the means for weighting output includes another algorithm.

Another exemplary embodiment is configured to operate in a manner further including means for outputting a final score.

Another exemplary embodiment is configured to operate in a manner further including a threshold defined by a probability of a detection of the at least one device containing malicious software, malicious firmware and malicious circuitry, wherein the final score is compared with the threshold.

Another exemplary embodiment is configured to operate in a manner wherein the final score derived from at least one of the time domain processing, the frequency domain processing, a plurality of time domain algorithms and a plurality of frequency domain algorithms is combined to enhance overall scoring for the detection, identification and geolocation of electronics.

Another exemplary embodiment is configured to operate in a manner further including further including data storage.

Another exemplary embodiment is further includes a display.

Another exemplary embodiment is configured to detect emissions of at least one other device located in close proximity to the at least one device.

Another exemplary embodiment further includes means for identifying the at least one other device.

Another exemplary embodiment is disclosed wherein the system is configured to stream a preselected information to the at least one device connected to the network, wherein the preselected information is dependent on a type of the at least one other identified device.

Another exemplary embodiment is envisioned wherein the system is configured to enhance information about a user of the at least one device based on a type of the at least one other identified device.

Another exemplary embodiment is envisioned wherein the at least one device is a plurality of devices and wherein the first means is configured to detect emissions from the plurality of devices.

Another exemplary embodiment is envisioned wherein at least some of the plurality of devices are connected to the network when the first means is operable to detect the at least one emission.

Another exemplary embodiment is envisioned wherein all of the plurality of devices were connected to the network prior to the first means being operable to detect the at least one emission.

Another exemplary embodiment is envisioned wherein the system is configured to detect a device that is at least one of beginning to display signs of degradation and show signs of imminent failure.

Another exemplary embodiment is envisioned wherein the at least one device is employed in a manufacturing environment and wherein the system is configured to detect at least a component of the at least one device.

Another exemplary embodiment is envisioned wherein the system includes at least one health monitoring device and wherein the system is configured to interface with the at least one health monitoring device so as to enhance at least one of health monitoring and status monitoring of electronic devices.

Another exemplary embodiment is envisioned wherein the system includes at least one health monitoring device and at least one backup device and wherein the system is configured to interface with each of the at least one health monitoring device and the at least one back up device so as to facilitate prompt switchover thereto.

Another exemplary embodiment is envisioned wherein the data storage includes a library of signatures identifying at least one of the at least one device and at least one other device and wherein the signatures were generated by at least one of the first and second means.

Another exemplary embodiment is envisioned wherein the system is configured to detect unauthorized users of the network.

Another exemplary embodiment is envisioned wherein the system is configured as a turnkey system.

Another exemplary embodiment is envisioned wherein the system is configured to perform diagnostics on at least one electronic device containing Malicious Software, Malicious Firmware and Malicious Circuitry.

Another exemplary embodiment is envisioned wherein the first means includes software configured to specifically detect physical characteristics of the at least one device connected to the network.

Another exemplary embodiment is envisioned wherein the system includes the network and wherein the network is one of an internet, an intranet, a Global System for Mobile communications, a Code Division Multiple Access, a Time Division Multiple Access, point to point network and a general cellular based network.

Another exemplary embodiment is envisioned wherein the system includes a database of emission data derived from free field emission data of at least two devices that have been pre-measured.

Another exemplary embodiment is envisioned wherein the second means is a computer, wherein the system includes a connection between the computer and the network and wherein the computer is configured to provide automated identification of the at least one device.

Another exemplary embodiment is envisioned wherein the second means is a computer, wherein the system includes a connection between the computer and the network and wherein the computer is configured to provide automated generation of a signature template for detection of the at least one device.

Another exemplary embodiment is envisioned, wherein the second means includes at least one cookie.

Another exemplary embodiment is envisioned wherein the second means includes a digital fingerprinting.

Another exemplary embodiment is envisioned, wherein the second means includes a deep packet inspection.

Another exemplary embodiment is envisioned, wherein the second means includes a predetermined logic configured to detect physical characteristics of the device connected to the network.

Another exemplary embodiment is envisioned wherein the second means include a predetermined logic configured to detect non-physical (software settings) characteristics of the at least one device connectable to network so as to derive physical characteristics of the at least one device.

Another exemplary embodiment is envisioned, wherein the third means includes a pair of signatures, one of the pair of signatures defining the at least one emission and another one of the pair of signatures defining the set of parameters.

Another exemplary embodiment is envisioned wherein the third means includes a signature template of the at least one device.

Another exemplary embodiment is envisioned wherein the signature template includes data from indirect emission measurement from the at least one device.

Another exemplary embodiment is envisioned, wherein the signature template includes the set of parameters collected from the network superimposed onto a frequency spectrum on top of one another so as to define an expected signature of the at least one emission.

Another exemplary embodiment is envisioned wherein the set of parameters includes at least one of: (a) a clock; (b) a processor type; (c) a transmission frequency; (d) power supply switching frequencies; (e) a transmission speed of data; (f) a microcontroller type; (g) timing protocols of the at least one device; and (h) a configuration of the at least one device.

Another exemplary embodiment is envisioned wherein the signature template includes at least one of: (a) single peak characteristics; (b) multiple peak characteristics; (c) harmonically correlated characteristics; (d) non-harmonically correlated characteristics; (e) time correlated characteristics; (f) phase correlated characteristics; and (g) duty cycle characteristics.

Another exemplary embodiment is envisioned, wherein the first means at least one of: (a) a peak detection algorithm; (b) multiple peak detection algorithm; (c) harmonic correlation algorithm; (d) non-harmonic correlation algorithm; (e) time correlation algorithm; (f) phase correlation algorithm; and (g) duty cycle timing correlation algorithm.

Another exemplary embodiment is envisioned, wherein the signature template includes pre-measured parameters of the at least one device.

Another exemplary embodiment is envisioned, wherein only the pre-measured parameters are used to detect the at least one device.

Another exemplary embodiment is envisioned, wherein the system is operable to detect electronics over a broad geographical range.

Another exemplary embodiment is envisioned, wherein the system is configured to perform diagnostics.

Another exemplary embodiment is envisioned, wherein the system is configured to perform health monitoring.

Another exemplary embodiment is envisioned wherein the first means is positioned in a first location, wherein the second means is positioned in a second location, wherein the third means is positioned in a third location, the first, second and third locations being independent from each other.

Another exemplary embodiment is envisioned as a measurement system that measures the frequency translation of at least one signature element to detect at least one of a Trojan, malware or contaminant in at least one of software, firmware and hardware.

Another exemplary embodiment is envisioned as a measurement system that used the absence of at least one signature element to detect at least one of a Trojan, malware or contaminant in at least one of software, firmware and hardware.

Another exemplary embodiment is envisioned as a measurement system that used the presence of at least one unexpected signature element to detect at least one of a Trojan, malware or contaminant in at least one of software, firmware and hardware.

Another exemplary embodiment provides a system comprising: (a) means for injecting a preselected digital signal input into an electrically powered device; and (b) means for determining at least one of a modified condition and unmodified condition of the electrically powered device, the condition defined by an unintended emission of RF energy in response to the preselected input.

Another exemplary embodiment provides a system wherein the device is at least one of a discrete component, integrated circuit, circuit board, circuit board assembly, subsystem, system, electronic device and electrical device employing electronic components for operation.

Another exemplary embodiment is envisioned wherein the modified condition defines a device executing at least one of malware, Trojans, virus, worms, modified software, modified hardware, and malicious software.

Another exemplary embodiment is envisioned, wherein the device is at least one of a semiconductor, and integrated circuit and wherein the preselected input injecting means includes a zero insertion force socket, whereby the at least one of semiconductor and integrated circuit is inserted into the zero insertion force socket.

Another exemplary embodiment is envisioned, wherein the preselected input is at least one of power and oscillator input and wherein the zero insertion force socket is preconfigured with the at least one of the power and the oscillator input.

Another exemplary embodiment is envisioned wherein the preselected signal inputting means further includes source for generating the oscillator input.

Another exemplary embodiment is envisioned wherein the source is a small atomic frequency standard oscillator such as a Rubidium clock or Cesium clock.

Another exemplary embodiment is envisioned wherein the means for determining the condition of the electrically powered device includes: (a) a first means for collecting RF energy emitted from the electrically powered device; (b) a second means for matching collected RF energy to a set of predetermined parameters; and (c) a third means for determining if a match to the predetermined set of parameters is sufficient.

Another exemplary embodiment is envisioned, wherein the first means includes an automated mechanism for collecting the RF energy from at least one of a board on an automated manufacturing line, a circuit board component mounted on an apparatus that allows for at least one of input, output and power connections.

Another exemplary embodiment is envisioned, wherein the first means includes an automated mechanism for collecting the RF energy from the device.

Another exemplary embodiment is envisioned where the automated mechanism includes a robotic arm.

Another exemplary embodiment is envisioned, wherein the automated mechanism includes an antenna array positioned a predetermined distance above the device, and wherein the device and the antenna array are mounted for movement relative to one another.

Another exemplary embodiment is envisioned, wherein the antenna array includes an integrated Low Noise Amplifier.

Another exemplary embodiment is envisioned, wherein the antenna array is an electronically steered antenna array.

Another exemplary embodiment is envisioned, wherein the predetermined distance is between about one micrometer and about one centimeter and wherein the automatic mechanism includes an automatic sensor aiding in setting the predetermined distance.

Another exemplary embodiment is envisioned as a system for inspecting or screening electrically powered device, the system comprising: (a) means for inputting a preselected signal into the electrically powered device; (b) an antenna array; (c) means for positioning the antenna array at a pre-determined distance above the electrically powered device; (d) means for collecting RF energy emitted by the electrically powered device in response to injection of the preselected input; (e) means for comparing a signature of the emitted RF energy with an RF energy signature of a modified or unmodified part; and (f) means for determining one of a modified or an unmodified condition of the electrically powered device.

Another exemplary embodiment is envisioned wherein the means for comparing the signature includes at least one of Harmonic Analysis, Matched Filter, Artificial Neural Networks (ANN), specifically multilayer perception (MLP) feed-forward ANN with back propagation (BP), Wavelet Decomposition, Autocorrelation, Spectral Feature Measurements or Statistics, Clustering or Phase Detrending.

Another exemplary embodiment is envisioned, wherein the means for processing digitized RF emissions to extract device signatures includes at least one of Discrete Fourier Transform, Fast Fourier Transform, Discrete Cosine Transform, Laplace Transform, Z Transform, Star Transform, Short-Time Fourier Transform, Cepstrum, Infinite Impulse Response Filter, Finite Impulse Response Filter, Cascaded integrator-comb filter, Elliptical Filter, Chebyshev Filter, Butterworth Filter, or Bessel Filter.

Another exemplary embodiment provides a system for inspecting or screening for modified devices of at least one of an integrated circuit, a system, a peripheral, a sub-system, and a device employing the integrated circuit, the system comprising: (a) a precision input generation source configured for driving at least one of a signal input and clock input of the integrated circuit; (b) means for collecting RF energy emitted by the integrated circuit in response to the precision signal generation source; and (c) means for determining one of a modified or an unmodified condition of the at least one of the integrated circuit and device employing the integrated circuit.

Another exemplary embodiment provides an apparatus for detecting at least one of modified integrated circuit, unmodified integrated circuit, modified system, unmodified system, modified sub-system, unmodified sub-system, modified board, unmodified board, modified peripheral, unmodified peripheral, modified device and an unmodified device employing the integrated circuit, the apparatus comprising: (a) a high precision input source configured to generate a high precision input for driving at least one of a signal input and a clock input of a powered at least one of the integrated circuit and device employing the integrated circuit, the high precision signal having a frequency thereof being consistent with input requirements of the at least one of the integrated circuit and device employing the integrated circuit; (b) an RF collection means positioned in close proximity to the semiconductor, the RF collection means configured to receive emissions radiated by the at least one of the integrated circuit and device employing the integrated circuit driven with the precision signal; and (c) a processor coupled to the RF collection means, the processor configured to process a signature of the radiated emission and compare the radiated emission signature against at least one emission signature predetermined for the semiconductor, whereby a resulting match of the comparison defines at least one of a modified or unmodified integrated circuit and a modified or unmodified device employing the integrated circuit.

Another exemplary embodiment is envisioned, wherein the apparatus includes an antenna array and wherein the RF collection means is coupled to the antenna array.

Another exemplary embodiment is envisioned, wherein the RF collection means is mounted in close proximity to the at least one of a modified or unmodified integrated circuit and a modified or unmodified device employing the integrated circuit.

Another exemplary embodiment is envisioned, wherein the RF collection means has a sensitivity of better than −152 dBm.

Another exemplary embodiment provides a method for differentiating between a modified and unmodified semiconductor based device, the method comprising the steps of: (a) generating, with a high precision input source, a high precision input; (b) injecting the input into a semiconductor in at least one of a clock input and a signal input; (c) collecting, with an RF collection means, emissions given off by the semiconductor based device in response to the signal injected in step (b); (d) comparing characteristics of the RF emissions, collected in step (c), against baseline RF characteristics of a modified or unmodified semiconductor based device; and (e) determining, based on the comparison, the one of the modified and unmodified semiconductor based device.

Another exemplary embodiment provides a method, further including the step of repeating steps (a) through (c) with different frequency settings on the high precision input injected into the semiconductor based device and the step of comparing RF data collections of at least two measured responses to improve modification inspection.

Another exemplary embodiment provides a method, further including the step of repeating steps (a) through (c) with different frequency amplitude settings on the input injected into the semiconductor based device and the step of comparing RF data collections of at least two measured responses to improve modification inspection.

Another exemplary embodiment provides a method, further including the step of repeating steps (a) through (c) with different relative phases between two or more inputs injected into the semiconductor based device and the step of comparing RF data collections of at least two measured responses to improve modification inspection.

Another exemplary embodiment provides a method, further including the step of repeating steps (a) through (c) with different frequency settings on the input injected into at least two inputs on the semiconductor based device and comparing RF collection data for each input injected individually to expected signature and injection into all inputs simultaneously.

Another exemplary embodiment provides a method, wherein the step of determining the modified or unmodified semiconductor based device includes the step of analyzing at least one of frequency locations of emissions components, phases of emissions, cross-modulation and inter-modulation components generated by the internal circuitry, shape of any individual emission, quality factors of any individual emissions or timing characteristics of emissions.

Another exemplary embodiment provides a method which includes the step of using at least one automated algorithm.

Another exemplary embodiment provides a method, further including the step of establishing the baseline RF characteristics representative of the modified or unmodified semiconductor based device.

Another exemplary embodiment provides a method, wherein the step of establishing the baseline RF characteristics includes the step of large scale comparison of spectral emissions and the step of reducing the large scale comparison to a single scalar value.

Another exemplary embodiment provides a method, wherein the step of establishing the baseline RF characteristics includes the step of obtaining local spectral power density statistics.

Another exemplary embodiment provides a method, wherein the step of obtaining local spectral power density statistics includes the step of sampling a plurality of semiconductor based devices and discriminating the plurality of semiconductor based devices based on localized statistical feature measured on each of emissions common between sampled semiconductor based devices.

Another exemplary embodiment provides a method, wherein the statistical features includes at least one of Emission Frequency Location, Emission Peak Magnitude, Emission Phase Noise, Emission Symmetry, Skewness, and Emission Local Noise Floor.

Another exemplary embodiment provides a method, wherein the step of comparing the characteristics of the RF emissions includes the step of obtaining discrete wavelet transform coefficient statistics.

Another exemplary embodiment provides a method, wherein the step of comparing the characteristics of the RF emissions includes the step of obtaining relative phase measurement.

Another exemplary embodiment provides a method, wherein the step of comparing the characteristics of the RF emissions includes the step of performing clustering analysis.

Another exemplary embodiment provides a method, wherein the step of performing the clustering analysis includes the step of using a Hierarchical Agglomerative Clustering (HAC) algorithm.

Another exemplary embodiment provides a method, wherein the step of performing the clustering analysis includes the step of using at least one of a clustering algorithm and a Hierarchical Agglomerative Clustering (HAC) algorithm.

Another exemplary embodiment provides a method, wherein the step of comparing the characteristics of the RF emissions includes the step of obtaining discrete wavelet transform coefficient statistics.

Another exemplary embodiment provides a method, wherein the step of comparing the characteristics of the RF emissions includes the step of at least one of obtaining relative phase measurement and comparing phase measurement to anticipated phase measurements.

Another exemplary provides a method, further including the step of repeating steps (a) through (c) with identical settings on the high precision input injected into the semiconductor based device and the step of combining, through averaging or other mathematical transform, RF data collections of at least two measured responses to improve modification inspection.

Another exemplary provides a method, further including the step of repeating steps (a) through (c) with identical settings on the high precision input injected into the semiconductor based device and the step of integrating RF energy across a bandwidth of at least 10 kHz.

Another exemplary embodiment provides a method, further including the step of repeating steps (a) through (c) with identical settings on the high precision input injected into the semiconductor based device and the step of using wideband RF emissions to inform further inspection and comparison of RF emission signatures observed in narrow-band RF emission responses.

Another exemplary embodiment provides a method, further including the step of repeating steps (a) through (c) with identical settings on the high precision input injected into the semiconductor based device and the step of using narrow-band RF emissions to inform further inspection and comparison of RF emission signatures observed in wideband RF emission responses.

Another exemplary embodiment provides a method for at least one of inspecting and screening at least one of an integrated circuit and a device employing the integrated circuit for unmodified or modified condition thereof, the method comprising the steps of: (a) providing at least an RF energy collection means; (b) positioning the RF energy collection means in close proximity to the integrated circuit; (c) providing a precision signal source; (d) injecting, with the precision signal source, a signal of a first frequency into the integrated circuit; (e) collecting, with the RF energy collection means, first emissions radiated by the integrated circuit in response to the signal of the first frequency injected in step (d); (f) injecting, with the precision signal source, a signal of a second frequency into the integrated circuit; (g) collecting, with the RF energy collection means, a second emissions radiated by the integrated circuit in response to the signal of the second frequency generated in step (f); (h) generating representative signatures of the first and second emissions; (i) determining deviation between the first emission signature and at least one of predetermined emission signature for the integrated circuit; (j) determining deviation between the second emission signature and at least one of predetermined emission signature for the integrated circuit; and (k) detecting, based on the deviation of at least one of first emission signature and second emission signature, the one of the modified and unmodified condition of the integrated circuit.

Another exemplary embodiment provides a method, An apparatus for at least one of inspecting or screening semiconductor devices for a modified or unmodified condition comprising a precision signal source and an RF collection apparatus including an antenna, a receiver, and a processor, wherein the apparatus is configured to characterize any semiconductor in a powered state and responsive to a signal generated by the precision signal source and injected into the semiconductor devices.

Another exemplary embodiment provides an apparatus for at least one of detecting, inspecting and screening at least one modified or unmodified semiconductor based device installed on a printed circuit board assembly, the apparatus comprising: (a) a robotic arm; (b) a mechanism for a precision manipulation of the robotic arm over different locations of a printed circuit board; (c) a high precision signal source generating a high precision input for injection into the printed circuit board assembly; (d) an antenna array including a low noise amplifier integrated therewithin; (e) an RF collection means connected to the antenna array, the RF collection means providing sensitivity being sufficient to receive emission radiated by the at least one powered semiconductor based device with at least one the precision input; and (f) a computational means coupled to the RF collection means and configured to at least one of inspect or screen at least one semiconductor based device on at least one printed circuit board.

Another exemplary embodiment provides an apparatus, further including an active illumination source configured to illuminate the semiconductor based device that is at least one of detected, inspected or screened with free field RF energy to further enhance the emissions signature of the semiconductor based device.

Another exemplary embodiment provides a method, wherein the antenna array, the RF collection means and the computational means are mounted on a semiconducting die substrate and being mounted on a tip of the robotic arm.

Another exemplary embodiment is envisioned wherein the high precision input is a multi-tone input injection configured for aiding in developing cross-modulated and intermodulated responses that translate into unique signatures for modified versus unmodified devices.

Another exemplary embodiment is envisioned wherein the signature is acquired from at least one of a disk drive and a USB stick while inputs to the at least one of a disk drive and a USB stick exercise its normal operation to induce the drive to emit Unintended emissions characteristic of a possible malware infection if it is so infected.

Another exemplary embodiment provides a system for inspecting or screening for a modified or unmodified condition of an electrical or electronic device, the system comprising: (a) a precision signal generation source configured for inputting one and only one oscillating signal into the electrical or electronic device; (b) means for collecting RF energy emitted by the integrated circuit in response to the oscillating signal; and (c) means for determining one of a modified or an unmodified condition of the electrical or electronic device.

Another exemplary embodiment provides an apparatus for electronically steering detection of a modified or unmodified condition including an antenna and low noise amplifier mounted within an integrated circuit.

Another exemplary embodiment provides a method for at least one of inspecting and screening at least one of an integrated circuit and a device employing the integrated circuit for modifications or unmodified condition thereof, the method comprising the steps of: (a) providing at least an RF energy collection means; (b) positioning the RF energy collection means in close proximity to the integrated circuit; (c) providing a precision signal source; (d) injecting, with the precision signal source, a signal of a first frequency into the integrated circuit; (e) collecting, with the RF energy collection means, first emissions radiated by the integrated circuit in response to the signal of the first frequency injected in step (d); (f) injecting, with the precision signal source, a signal of a second frequency into the integrated circuit; (g) collecting, with the RF energy collection means, a second emissions radiated by the integrated circuit in response to the signal of the second frequency generated in step (f); (h) generating representative signatures of the first and second emissions; (i) determining deviation between the first emission signature and at least one of predetermined emission signature for the integrated circuit; (j) determining deviation between the second emission signature and at least one of predetermined emission signature for the integrated circuit; and (k) detecting, based on the deviation of at least one of first emission signature and second emission signature, the device containing malicious software, malicious firmware and malicious circuitry.

Another exemplary embodiment provides a method for at least one of inspecting and screening at least one of an integrated circuit and a device employing the integrated circuit for unmodified or modified condition thereof, the method comprising the steps of: (a) providing at least an RF energy collection means; (b) positioning the RF energy collection means in close proximity to the integrated circuit; (c) providing a precision signal source; (d) injecting, with the precision signal source, a signal of a first frequency into the integrated circuit; (e) collecting, with the RF energy collection means, first emissions radiated by the integrated circuit in response to the signal of the first frequency injected in step (d); (f) injecting, with the precision signal source, a signal of a second frequency into the integrated circuit; (g) collecting, with the RF energy collection means, a second emissions radiated by the integrated circuit in response to the signal of the second frequency generated in step (f); (h) generating representative signatures of the first and second emissions; (i) determining deviation between the first emission signature and at least one of predetermined emission signature for the integrated circuit; (j) determining deviation between the second emission signature and at least one of predetermined emission signature for the integrated circuit; and (k) detecting, based on the deviation of at least one of first emission signature and second emission signature, the one of the modified and unmodified condition of the integrated circuit.

Another exemplary embodiment provides an apparatus comprising: a receiver configured to at least one of detect and locate an electronic device containing at least one of Malicious Software, Malicious Firmware, modified software, unmodified software, Trojans, Virus, Worms, Adware, improper software versioning, scareware, and Malicious Circuitry by passively measuring without active illumination at least one unintended RF emission given off by the at least one electronic device, wherein the apparatus is then used to apply a method for at least one of calculating a Remaining Useful Life and detecting a condition of reduction in Remaining Useful Life of at least one of the electronic device containing at least one of an integrated circuit and a device employing the integrated circuit with unmodified or modified condition thereof, the method comprising the steps of: (a) providing at least an RF energy collection means; (b) positioning the RF energy collection means in close proximity to the electronic device; (c) collecting, with the RF energy collection means, first emissions radiated by the electronic device; (d) previously collecting, with the RF energy collection means, a plurality of emissions radiated by the electronic device or a device substantially equivalent to the electronic device, the plurality of emissions taken at known recorded operational durations from the beginning of usage of the representative electronic device; (e) generating representative signatures of the first and the plurality of emissions; (f) determining differences between the first emission signature the plurality of emission signatures; (g) comparing previously collected plurality of emissions from related the at least one of an integrated circuit and a device employing the integrated circuit with an unmodified or modified condition, with the first emissions; (h) finding the emission signature from one of the plurality of emissions which most closely matches the first emission; (i) finding the recorded duration associated with the emission signature which most closely matches the first emission; (j) determining deviation between the first emission signature and emission signature which most closely matches the first emission; and (k) calculating, based on the difference between the first emission signature and emission signature which most closely matches the first emission, at least one of a Remaining Useful Life (RUL), and the amount of RUL which will be lost, of the electronic device.

Another exemplary embodiment provides an apparatus comprising: a receiver, wherein the receiver is configured to at least one of detect and locate an electronic device containing at least one of an unwanted software capable of means to modify DRAM memory contents by deliberately excessively accessing, reading or writing to those registers, adjacent register addresses or those nearby, detecting attempts at repetitive access to change bit contents or damage memory, detecting attempts to inject code which when ran will attempt to perform the exploit, detect successful exploit condition, and detect use of exploit during system operation.

The chosen exemplary embodiments of the claimed invention have been described and illustrated for practical purposes so as to enable any person skilled in the art to which it pertains to make and use the same. It is therefore intended that all matters in the foregoing description and shown in the accompanying drawings be interpreted as illustrative and not in a limiting sense. It will be understood that variations, modifications, equivalents and substitutions for components of the specifically described exemplary embodiments of the invention may be made by those skilled in the art without departing from the spirit and scope of the invention as set forth in the appended claims.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Furthermore, the Abstract is not intended to be limiting as to the scope of the claimed invention and is for the purpose of quickly determining the nature of the claimed invention.

What is claimed is:

1. An apparatus comprising:
   a sensor comprising a hollow enclosure with an access to an interior thereof, said access configured to allow insertion of one or more electrical devices therethrough, one or more antennas, low noise amplifier(s) coupled to said one or more antennas, RF tuner(s) and analog to digital converter(s), said sensor configured, to capture unintended emitted electromagnetic energy and/or unintended conducted energy from one or more electrical devices inserted into said interior through said access and disposed, during operation of said apparatus, within said interior;

one or more processors or logic devices; and a computational medium comprising executable instructions that, when executed by said one or more processors or logic devices, cause said one or more processors or logic devices to perform the following steps on said captured unintended emitted electromagnetic energy and/or said unintended conducted energy:

measuring a feature value in at least one spectral frequency region of said captured unintended emitted electromagnetic energy and/or unintended conducted energy from said one or more electrical devices, calculating a difference value between said measured feature value and a baseline feature value, verifying, based on said calculated difference value, whether at least one of sub-threshold and super-threshold values have been exceeded in one or more of amplitude, frequency, phase and time domains of signature(s) elements of said captured unintended emitted electromagnetic energy and/or unintended conducted energy, and determining, based on said calculated difference value, a presence or an absence of at least one of malicious software, anomalous software, modified software, malicious firmware, anomalous firmware, modified firmware, malicious circuitry, anomalous circuitry and modified circuitry within the one or more electrical devices.

2. The apparatus of claim 1, further comprising fixture(s) positionable within said hollow enclosure, said fixture(s) being sized and shaped to receive the one or more electrical devices and configured to stimulate the one or more electrical devices being tested into an operating state wherein unintended emissions are generated.

3. The apparatus of claim 2, wherein at least one of a stimuli used to stimulate the one or more electrical devices is configured to sweep across at least one of a frequency span, a voltage range, a duty cycle, a pulse duration, a time interval, a power amplitude and an electromagnetic illumination range.

4. The apparatus of claim 1, wherein said baseline feature value is obtained from captured unintended emissions being given off by a baseline electrical device and wherein said one or more electrical devices are determined and/or validated to be at least one of constructed, coded, programmed, loaded, burned-in and functioning identically to said baseline electrical device.

5. The apparatus of claim 4, wherein said baseline electrical device is located, during said operation of said apparatus, within said hollow enclosure having said antenna being integrated therewithin.

6. The apparatus of claim 1, wherein said one or more electrical devices is at least one of a wafer, a die, an electronic part, a circuit board, system, sub-system, and a circuit board assembly and wherein two are serially, concurrently or simultaneously tested using apparatus.

7. The apparatus of claim 1, wherein said one or more electrical devices is a circuit board or a circuit assembly, each including plurality of electronic components and wherein said plurality of electronic components are being simultaneously determined to have said presence or said absence of said at least one of malicious software, anomalous software, modified software, unmodified software, malicious firmware, anomalous firmware, modified firmware, unmodified firmware, malicious circuitry, anomalous circuitry and modified circuitry, unmodified circuitry during operation of said apparatus.

8. The apparatus of claim 1, wherein said step of measuring said feature value is performed serially or concurrently with a step of measuring said baseline feature value.

9. The apparatus of claim 1, wherein said executable instructions, when executed by said one or more processors or logic devices, cause said one or more processors or logic devices to perform an additional step of electromagnetic emissions analysis including at least one of a spectrographic analysis, a time-frequency analysis, an electromagnetic emission radiation response analysis related to input signal variations, a phase analysis, an informatics analysis, and a statistical analysis.

10. The apparatus of claim 1, wherein said one or more electrical devices is at least one of a wafer, a die, an electronic part, a circuit board, circuit board assembly, a subsystem, a system and a network and wherein said executable instructions, when executed by said one or more processors or logic devices, further cause said one or more processors or logic devices to determine an authenticity or an unmodified state of at least one of a software, a firmware and a circuitry present in said at least one of wafer, die, electronic part, circuit board, circuit board assembly, subsystem, system and network.

11. The apparatus of claim 1, wherein at least one of said at least one of malicious software, anomalous software, modified software, malicious firmware, anomalous firmware, modified firmware, malicious circuitry, anomalous circuitry and modified circuitry includes at least one of tainted, bug, malware, tampered, subversively altered, worm, zombie, Trojan, Trojan horse, Rootkit, virus, spyware, adware, checksum exploit, scareware, incorrect software, exploit, SQL injection attack, privacy-invasive software, backdoor, Rowhammer exploit, update, tainted part, tampered with, counterfeit, and denial of service.

12. An apparatus for analyzing at least one electrical device being at least one of a wafer, a die, an electronic part, a circuit board, system or sub-system or a circuit board assembly, said apparatus comprising:

an integrated antenna enclosure including a hollow enclosure with a door selectively opening and closing an access to an interior thereof and one or more antennas being at least one of integrated into, inserted into or configured in an array within said enclosure, said one or more antennas receiving unintended emissions of electromagnetic energy given off by one or more electrical devices inserted into said hollow interior through said access and disposed, during operation of said apparatus, within said interior, said one or more antennas disposed external to the one or more electrical devices;

an electromagnetic pattern sensor, configured, in a combination with said integrated antenna enclosure, to capture said unintended emissions of electromagnetic energy being given off by the at least one electrical device;

one or more processors or logic devices; and a computational medium comprising executable instructions that, when executed by said one or more processors or logic devices, cause said one or more processors or logic devices to perform the following steps on said captured unintended emissions of said electromagnetic energy:

quantifying a feature value in at least one spectral frequency region of said unintended emissions for at least two different physical electrical devices that are determined and/or validated to be at least one of constructed, coded, programmed, loaded, burned-in and functioning identically to each other, wherein said at least two different physical electrical devices are serially or concurrently emplaced and measured in said integrated antenna enclosure, identifying differences between at least one corresponding quantified feature of said spectral frequency region in said unintended emission for each of said at least two different physical electrical devices, calculating a value based on a comparison of said two corresponding quantified features forming at least one parameter of said spectral frequency region in said unintended emission, and determining, based on said calculated difference value, a presence or an absence of at least one of malicious software, anomalous software, modified software, malicious firmware, anomalous firmware, modified firmware, malicious circuitry, anomalous circuitry and modified circuitry within the one or more electrical devices.

13. The apparatus of claim 12, wherein said at least two different physical electrical devices includes at least one of a baseline electrical device and an unexamined device, at least two different baseline electrical devices of a different type, at least two unexamined devices of the same type, at least two different baseline electrical devices of the same type, and at least two unexamined devices of a different type.

14. An apparatus comprising:
a hollow enclosure with a door selectively opening and closing an access to an interior of said enclosure, said enclosure is being a radio frequency (RF) shielded enclosure when said door is closing said access;
an antenna integrated into said hollow enclosure;
an emissions acquisition assembly, configured, to receive, from said antenna, in an analog form, unintended emissions of electromagnetic energy being given off by an electrical device inserted into said interior through said access and disposed, during operation of said apparatus, within said interior, amplify said unintended emissions and to convert said amplified unintended emissions into a digitized data;
one or more processors; and
a computational medium comprising executable instructions that, when executed by said one or more processors, cause said one or more processors to perform the steps of:
identifying a spectral frequency region within a sample unintended emission,
measuring a value of a parameter of said spectral frequency region in said sample unintended emission,
measuring value(s) of said parameter in one or more of subsequent unintended emissions, and
determining, based on distinct changes in said values of said parameter, at least one of anomalous software, anomalous firmware and anomalous circuitry of the electrical device.

15. The apparatus of claim 14, wherein said value of said parameter changes over time.

16. The apparatus of claim 14, wherein said value of said parameter differs across frequency ranges.

17. The apparatus of claim 14, wherein said executable instructions, when executed by said one or more processors, further cause said one or more processors to at least one of locate or geolocate said electrical device.

18. The apparatus of claim 14, wherein said executable instructions, when executed by said one or more processors, further cause said one or more processors to determine location(s) of said unintended emissions within said electrical device and/or associate said emissions to a distinct electronic component within said electronic device.

19. The apparatus of claim 14, wherein the emissions of distinct electronic components on a circuit board are associated with the corresponding distinct physical electronic components on the circuit board.

20. The apparatus of claim 14, wherein said executable instructions, when executed by said one or more processors, further cause said one or more processors to determine a type of and/or classify said electrical device.

21. The apparatus of claim 14, wherein digital representations of electromagnetic emissions are compared and contrasted with a specific focus on at least one of emission homogeneity, consistency, and uniformity.

22. A computer-implemented method for analyzing plurality of wafers, dies, electronic parts, circuit boards, circuit board assemblies, sub-systems and systems for presence or absence of at least one of anomalous circuitry, anomalous firmware or anomalous software, said method comprising the steps of:
providing a hollow enclosure with a door selectively opening and closing an access to an interior of said enclosure and with one or more antenna integrated therewithin, said enclosure is being a radio frequency (RF) shielded enclosure when said door is closing said access;
capturing, with an electromagnetic pattern sensor, emissions of electromagnetic energy radiating from said at least one of wafers, dies, electronic parts, circuit boards, circuit board assemblies, sub-systems and systems placed within said interior;
analyzing, with one or more processors and a computational medium comprising executable instructions, signature(s) of said captured emissions by at least one of a spectrographic analysis, an amplitude analysis, a time-frequency analysis, a frequency analysis, an electromagnetic emission radiation response analysis, input signal variations, a phase analysis, an informatics analysis, and a statistical analysis; and
verifying, with said one or more processors and said computational medium comprising executable instructions, whether at least one of sub-threshold and super-threshold values have been exceeded in one or more of amplitude, frequency, phase and time domains of signature(s) elements of said captured emissions.

23. The method of claim 22, further comprising the step of providing a calibration specimen, the step of capturing emissions radiating from said calibration specimen and the step of defining a calibrating emission signature.

24. The method of claim 23, further comprising the step of analyzing at least one of said captured emissions radiating from said calibration specimen and said calibrated emission signature using at least one of manual or automatic means to define, select or enhance the at least one calibrating emission signature to find more discriminating comparison characteristics of said calibration specimen.

25. The method of claim 22, further comprising the step of assuring by way of comparing signature of said captured emissions with said calibrating emission signature, a proper operation of said at least one of wafers, dies, electronic parts, circuit boards, circuit board assemblies, sub-systems and systems.

26. The method of claim 22, further comprising the step of analyzing operation of said calibration specimen at different time instances during analysis of said wafers, dies, electronic parts, circuit boards, circuit board assemblies, sub-systems and systems.

27. The method of claim 22, further comprising the step of comparing a signature of captured emissions from baseline wafers, dies, electronic parts, circuit boards, circuit board assemblies, sub-systems and systems at different time instances to wafers, dies, electronic parts, circuit boards, circuit board assemblies, sub-systems and systems under test, inspection and/or examination.

28. The method of claim 22, further comprising the step of combining results of at least one of spectrographic analysis, frequency analysis, time-frequency analysis, electromagnetic emission radiation response analysis, input signal variations, phase analysis, informatics analysis, and statistical analysis for at least one of said feature values with results of at least one of spectrographic analysis, frequency analysis, time-frequency analysis, electromagnetic emission radiation response analysis, input signal variations, phase analysis, informatics analysis, and statistical analysis for at least one of another feature value in at least one frequency region from at least one time interval.

29. The apparatus of claim 1, wherein said change of said second measured location relative to said first measured location is a symmetrical shift towards or away from a central peak in said at least one spectral frequency region.

* * * * *